US012807126B2

(12) United States Patent
Shively et al.

(10) Patent No.: US 12,807,126 B2
(45) Date of Patent: Nov. 24, 2026

(54) ELECTRIFIED FIRE FIGHTING VEHICLE

(71) Applicant: Oshkosh Corporation, Oshkosh, WI (US)

(72) Inventors: Jason Shively, Oshkosh, WI (US); Seth Newlin, Appleton, WI (US); David Kay, Appleton, WI (US); Jack Bermingham, Oshkosh, WI (US); Jon Morrow, Neenah, WI (US); David Steinberger, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 28 days.

(21) Appl. No.: 18/976,579

(22) Filed: Dec. 11, 2024

(65) Prior Publication Data

US 2025/0100535 A1 Mar. 27, 2025

Related U.S. Application Data

(63) Continuation of application No. 18/918,732, filed on Oct. 17, 2024, which is a continuation of application
(Continued)

(51) Int. Cl.
*B60W 10/26* (2006.01)
*A62C 27/00* (2006.01)
(Continued)

(52) U.S. Cl.
CPC ............ *B60W 10/26* (2013.01); *A62C 27/00* (2013.01); *B60K 6/24* (2013.01); *B60K 6/26* (2013.01);
(Continued)

(58) Field of Classification Search
CPC .... B60W 20/13; B60Y 2200/92; B62D 21/02; B60L 1/003; B60K 25/02
See application file for complete search history.

(56) References Cited

U.S. PATENT DOCUMENTS 2,055,563 A 9/1936 Sorensen et al.
3,410,538 A 11/1968 Potter
(Continued)

FOREIGN PATENT DOCUMENTS

CN 203694470 U 7/2014
CN 104002813 A 8/2014
(Continued)

OTHER PUBLICATIONS

International Search Report and Written Opinion received for PCT App. No. PCT/US2020/054800, Jan. 29, 2021, 15 pages.
(Continued)

*Primary Examiner* — Tyler J Lee
(74) *Attorney, Agent, or Firm* — Foley & Lardner LLP

(57) ABSTRACT

An electrified fire fighting vehicle includes a chassis, a cab, a body, a front axle, a rear axle, an engine, a battery pack, a pump system including a water pump, an electromagnetic device, and a power divider coupling the engine to the pump system and the electromagnetic device. The electromagnetic device is electrically coupled to the battery pack. The electromagnetic device has (a) an output coupled to at least one of the front axle or the rear axle and (b) a power take-off coupled to the pump system.

20 Claims, 34 Drawing Sheets

Related U.S. Application Data

No. 18/243,393, filed on Sep. 7, 2023, now Pat. No. 12,151,667, which is a continuation of application No. 17/968,487, filed on Oct. 18, 2022, now Pat. No. 11,794,716, which is a continuation of application No. 17/204,464, filed on Mar. 17, 2021, now Pat. No. 11,639,167, which is a continuation of application No. 17/066,337, filed on Oct. 8, 2020, now Pat. No. 10,974,724.

(60) Provisional application No. 63/088,095, filed on Oct. 6, 2020, provisional application No. 62/970,758, filed on Feb. 6, 2020, provisional application No. 62/914,113, filed on Oct. 11, 2019, provisional application No. 62/914,105, filed on Oct. 11, 2019, provisional application No. 62/914,109, filed on Oct. 11, 2019, provisional application No. 62/914,385, filed on Oct. 11, 2019, provisional application No. 62/914,126, filed on Oct. 11, 2019.

(51) Int. Cl.

| | |
|---|---|
| ***B60K 6/24*** | (2007.10) |
| ***B60K 6/26*** | (2007.10) |
| ***B60K 6/38*** | (2007.10) |
| ***B60K 6/387*** | (2007.10) |
| ***B60K 6/48*** | (2007.10) |
| ***B60K 17/02*** | (2006.01) |
| ***B60K 17/12*** | (2006.01) |
| ***B60K 17/356*** | (2006.01) |
| ***B60K 25/02*** | (2006.01) |
| ***B60K 25/06*** | (2006.01) |
| ***B60L 1/00*** | (2006.01) |
| ***B60L 50/61*** | (2019.01) |
| ***B60P 3/22*** | (2006.01) |
| ***B60W 10/02*** | (2006.01) |
| ***B60W 10/06*** | (2006.01) |
| ***B60W 10/08*** | (2006.01) |
| ***B60W 10/30*** | (2006.01) |
| ***B60W 20/00*** | (2016.01) |
| ***B60W 20/13*** | (2016.01) |
| ***B60W 30/18*** | (2012.01) |
| ***B62D 21/02*** | (2006.01) |
| *F16D 21/00* | (2006.01) |

(52) U.S. Cl.

CPC ................ *B60K 6/38* (2013.01); *B60K 6/387* (2013.01); *B60K 6/48* (2013.01); *B60K 17/02* (2013.01); *B60K 17/12* (2013.01); *B60K 17/356* (2013.01); *B60K 25/02* (2013.01); *B60K 25/06* (2013.01); *B60L 1/003* (2013.01); *B60L 50/61* (2019.02); *B60P 3/225* (2013.01); *B60W 10/02* (2013.01); *B60W 10/06* (2013.01); *B60W 10/08* (2013.01); *B60W 10/30* (2013.01); *B60W 20/00* (2013.01); *B60W 20/13* (2016.01); *B60W 30/18009* (2013.01); *B62D 21/02* (2013.01); *B60W 2510/0208* (2013.01); *B60W 2510/06* (2013.01); *B60W 2510/186* (2013.01); *B60W 2510/244* (2013.01); *B60W 2530/10* (2013.01); *B60W 2710/06* (2013.01); *B60W 2710/08* (2013.01); *B60W 2710/081* (2013.01); *B60W 2710/083* (2013.01); *B60W 2710/30* (2013.01); *B60Y 2200/14* (2013.01); *B60Y 2200/92* (2013.01); *B60Y 2400/87* (2013.01); *F16D 21/00* (2013.01)

(56) References Cited

U.S. PATENT DOCUMENTS

| | | | | |
|---|---|---|---|---|
| 3,429,192 | A | 2/1969 | Allen | |
| 3,762,478 | A * | 10/1973 | Cummins | A62C 27/00 169/25 |
| 3,881,706 | A | 5/1975 | Mohrmann | |
| 4,189,005 | A | 2/1980 | McLoughlin | |
| 4,335,429 | A | 6/1982 | Kawakatsu | |
| 4,533,011 | A | 8/1985 | Heidemeyer et al. | |
| 5,171,121 | A | 12/1992 | Smith et al. | |
| 5,192,178 | A | 3/1993 | Silbernagel | |
| 5,495,912 | A | 3/1996 | Gray et al. | |
| 5,559,420 | A | 9/1996 | Kohchi | |
| 5,627,438 | A | 5/1997 | Barrett | |
| 5,635,805 | A | 6/1997 | Ibaraki et al. | |
| 5,664,416 | A | 9/1997 | Sangret | |
| 5,669,842 | A | 9/1997 | Schmidt | |
| 6,048,288 | A | 4/2000 | Tsujii et al. | |
| 6,105,984 | A | 8/2000 | Schmitz et al. | |
| 6,247,713 | B1 | 6/2001 | Konop | |
| 6,328,670 | B1 | 12/2001 | Minowa et al. | |
| 6,478,317 | B2 | 11/2002 | Konop | |
| 6,516,914 | B1 | 2/2003 | Andersen et al. | |
| 6,561,718 | B1 | 5/2003 | Archer et al. | |
| 6,666,022 | B1 | 12/2003 | Yoshimatsu et al. | |
| 6,686,724 | B2 | 2/2004 | Coates et al. | |
| 6,725,581 | B2 | 4/2004 | Naruse et al. | |
| 6,757,597 | B2 | 6/2004 | Yakes et al. | |
| 6,764,085 | B1 | 7/2004 | Anderson | |
| 6,779,806 | B1 | 8/2004 | Breitbach et al. | |
| 6,789,335 | B1 | 9/2004 | Kinugawa et al. | |
| 6,817,964 | B2 | 11/2004 | Kayukawa et al. | |
| 6,852,063 | B2 | 2/2005 | Takahashi et al. | |
| 6,882,917 | B2 | 4/2005 | Pillar et al. | |
| 6,883,815 | B2 | 4/2005 | Archer | |
| 6,885,920 | B2 | 4/2005 | Yakes et al. | |
| 6,952,057 | B2 | 10/2005 | Tajima et al. | |
| 6,976,688 | B2 | 12/2005 | Archer et al. | |
| 6,988,974 | B2 | 1/2006 | Kobayashi et al. | |
| 7,055,880 | B2 | 6/2006 | Archer | |
| 7,069,673 | B2 | 7/2006 | Kagoshima et al. | |
| 7,073,847 | B2 | 7/2006 | Morrow et al. | |
| 7,111,858 | B2 | 9/2006 | Manser et al. | |
| 7,117,963 | B2 | 10/2006 | Saito et al. | |
| 7,140,461 | B2 | 11/2006 | Morrow | |
| 7,164,977 | B2 | 1/2007 | Yakes et al. | |
| 7,198,130 | B2 | 4/2007 | Schimke | |
| 7,207,582 | B2 | 4/2007 | Siebers et al. | |
| 7,226,080 | B2 | 6/2007 | Humphries | |
| 7,237,634 | B2 | 7/2007 | Severinsky et al. | |
| 7,270,346 | B2 | 9/2007 | Rowe et al. | |
| 7,277,782 | B2 | 10/2007 | Yakes et al. | |
| 7,302,320 | B2 | 11/2007 | Nasr et al. | |
| 7,343,992 | B2 | 3/2008 | Shingo et al. | |
| 7,349,797 | B2 | 3/2008 | Donnelly et al. | |
| 7,357,203 | B2 | 4/2008 | Morrow et al. | |
| 7,379,797 | B2 | 5/2008 | Nasr et al. | |
| 7,380,620 | B2 | 6/2008 | Suzuki | |
| 7,388,301 | B2 | 6/2008 | Komiyama et al. | |
| 7,389,826 | B2 | 6/2008 | Linsmeier et al. | |
| 7,392,122 | B2 | 6/2008 | Pillar et al. | |
| 7,419,021 | B2 | 9/2008 | Morrow et al. | |
| 7,439,711 | B2 | 10/2008 | Bolton | |
| 7,448,460 | B2 | 11/2008 | Morrow et al. | |
| 7,451,028 | B2 | 11/2008 | Pillar et al. | |
| 7,461,710 | B2 | 12/2008 | Egen et al. | |
| 7,472,914 | B2 | 1/2009 | Anderson et al. | |
| 7,520,354 | B2 | 4/2009 | Morrow et al. | |
| 7,521,814 | B2 | 4/2009 | Nasr | |
| 7,525,206 | B2 | 4/2009 | Kagoshima et al. | |
| 7,597,172 | B1 | 10/2009 | Kovach et al. | |
| 7,669,413 | B2 | 3/2010 | Komiyama et al. | |
| 7,689,332 | B2 | 3/2010 | Yakes et al. | |
| 7,695,400 | B2 | 4/2010 | McGee | |
| 7,711,460 | B2 | 5/2010 | Yakes et al. | |
| 7,748,482 | B2 | 7/2010 | Holmes et al. | |
| 7,756,621 | B2 | 7/2010 | Pillar et al. | |

(56) References Cited

U.S. PATENT DOCUMENTS

| | | | | |
|---|---|---|---|---|
| 7,784,554 | B2 * | 8/2010 | Grady | A62C 27/00 169/62 |
| 7,848,857 | B2 | 12/2010 | Nasr et al. | |
| 7,874,373 | B2 | 1/2011 | Morrow et al. | |
| 7,878,750 | B2 | 2/2011 | Zhou et al. | |
| 7,931,103 | B2 | 4/2011 | Morrow et al. | |
| 7,937,194 | B2 | 5/2011 | Nasr et al. | |
| 8,000,850 | B2 | 8/2011 | Nasr et al. | |
| 8,056,661 | B2 | 11/2011 | Bissontz | |
| 8,139,109 | B2 | 3/2012 | Schmiedel et al. | |
| 8,190,320 | B2 | 5/2012 | Kelty et al. | |
| 8,276,831 | B2 | 10/2012 | Rutherford | |
| 8,287,425 | B2 | 10/2012 | Omote et al. | |
| 8,333,390 | B2 | 12/2012 | Linsmeier et al. | |
| 8,337,352 | B2 | 12/2012 | Morrow et al. | |
| 8,376,077 | B2 | 2/2013 | Venton-Walters | |
| 8,395,355 | B2 | 3/2013 | Kaita et al. | |
| 8,408,341 | B2 | 4/2013 | Dalum et al. | |
| 8,421,415 | B2 | 4/2013 | Kagoshima | |
| 8,429,924 | B2 | 4/2013 | Ratliff et al. | |
| 8,448,731 | B2 | 5/2013 | Heap et al. | |
| 8,465,025 | B2 | 6/2013 | Venton-Walters et al. | |
| 8,490,739 | B2 | 7/2013 | Kovach et al. | |
| 8,550,196 | B2 | 10/2013 | Ross | |
| 8,561,735 | B2 | 10/2013 | Morrow et al. | |
| 8,596,648 | B2 | 12/2013 | Venton-Walters et al. | |
| 8,606,448 | B2 | 12/2013 | Anders et al. | |
| 8,606,450 | B2 | 12/2013 | Holmes et al. | |
| 8,638,070 | B2 | 1/2014 | Maluf et al. | |
| 8,662,220 | B2 | 3/2014 | Burkholder | |
| 8,669,855 | B2 | 3/2014 | Suzuki et al. | |
| 8,714,287 | B2 | 5/2014 | Kim et al. | |
| 8,739,892 | B2 * | 6/2014 | Moore | B60K 11/04 165/41 |
| 8,739,906 | B2 | 6/2014 | Kawashima | |
| 8,764,029 | B2 | 7/2014 | Venton-Walters et al. | |
| 8,791,669 | B2 | 7/2014 | Ghantous et al. | |
| 8,801,017 | B2 | 8/2014 | Ellifson et al. | |
| 8,808,124 | B2 | 8/2014 | Major et al. | |
| 8,818,588 | B2 | 8/2014 | Ambrosio et al. | |
| 8,820,444 | B2 | 9/2014 | Nguyen | |
| 8,839,876 | B2 | 9/2014 | Mcloughlin et al. | |
| 8,864,613 | B2 | 10/2014 | Morrow et al. | |
| 8,876,133 | B2 | 11/2014 | Ellifson | |
| 8,905,166 | B2 | 12/2014 | Dalum et al. | |
| 8,909,434 | B2 | 12/2014 | Anders et al. | |
| 8,939,240 | B2 | 1/2015 | Wehrwein et al. | |
| 8,947,531 | B2 | 2/2015 | Fischer et al. | |
| 8,950,529 | B2 | 2/2015 | Ross | |
| 8,955,859 | B1 | 2/2015 | Richmond et al. | |
| 8,955,880 | B2 | 2/2015 | Malcolm et al. | |
| 8,970,178 | B2 | 3/2015 | Berkowitz et al. | |
| 8,974,108 | B2 | 3/2015 | Ruf | |
| 8,978,798 | B2 | 3/2015 | Dalum et al. | |
| 8,991,834 | B2 | 3/2015 | Venton-Walters et al. | |
| 8,991,840 | B2 | 3/2015 | Zuleger et al. | |
| 9,000,718 | B2 | 4/2015 | Park | |
| 9,008,913 | B1 | 4/2015 | Sears et al. | |
| 9,016,703 | B2 | 4/2015 | Rowe et al. | |
| 9,045,014 | B1 | 6/2015 | Verhoff et al. | |
| 9,061,169 | B2 | 6/2015 | Linsmeier | |
| 9,061,680 | B2 | 6/2015 | Dalum | |
| 9,114,804 | B1 | 8/2015 | Shukla et al. | |
| 9,132,736 | B1 | 9/2015 | Shukla et al. | |
| 9,145,905 | B2 | 9/2015 | Hou | |
| 9,157,347 | B2 | 10/2015 | Jerwick et al. | |
| 9,174,686 | B1 | 11/2015 | Messina et al. | |
| 9,205,832 | B2 | 12/2015 | Tsutsumi et al. | |
| 9,291,230 | B2 | 3/2016 | Ellifson et al. | |
| 9,302,129 | B1 * | 4/2016 | Betz | A62C 27/00 |
| 9,315,187 | B2 | 4/2016 | Stenson | |
| 9,315,210 | B2 | 4/2016 | Sears et al. | |
| 9,327,150 | B2 * | 5/2016 | Moore | B60K 11/04 |
| 9,327,576 | B2 | 5/2016 | Ellifson | |
| 9,328,986 | B1 | 5/2016 | Pennau et al. | |
| 9,329,000 | B1 | 5/2016 | Richmond et al. | |
| 9,376,102 | B1 | 6/2016 | Shukla et al. | |
| 9,420,203 | B2 | 8/2016 | Broggi et al. | |
| 9,428,042 | B2 | 8/2016 | Morrow et al. | |
| 9,434,321 | B2 | 9/2016 | Perron et al. | |
| 9,452,750 | B2 | 9/2016 | Shukla et al. | |
| 9,457,666 | B2 | 10/2016 | Caldeira et al. | |
| 9,475,385 | B1 | 10/2016 | Pritchard et al. | |
| 9,492,695 | B2 | 11/2016 | Betz et al. | |
| 9,493,921 | B2 | 11/2016 | Amin et al. | |
| 9,494,170 | B2 | 11/2016 | Hou | |
| 9,573,585 | B2 | 2/2017 | Severinsky et al. | |
| 9,579,969 | B2 | 2/2017 | Crist et al. | |
| 9,597,536 | B1 | 3/2017 | Moore | |
| 9,637,890 | B2 | 5/2017 | Hirozawa | |
| 9,651,120 | B2 | 5/2017 | Morrow et al. | |
| 9,656,640 | B1 | 5/2017 | Verhoff et al. | |
| 9,657,705 | B2 | 5/2017 | Holmes et al. | |
| 9,669,679 | B2 | 6/2017 | Zuleger et al. | |
| 9,688,112 | B2 | 6/2017 | Venton-Walters et al. | |
| 9,694,671 | B2 | 7/2017 | Wildgrube et al. | |
| 9,694,776 | B2 | 7/2017 | Nelson et al. | |
| 9,707,869 | B1 | 7/2017 | Messina et al. | |
| 9,731,594 | B2 | 8/2017 | Wildgrube | |
| 9,748,548 | B2 | 8/2017 | Malcolm et al. | |
| 9,751,518 | B2 | 9/2017 | Dalum et al. | |
| 9,758,053 | B2 | 9/2017 | Kim | |
| 9,764,613 | B2 | 9/2017 | Rowe et al. | |
| 9,809,080 | B2 | 11/2017 | Ellifson et al. | |
| 9,821,789 | B2 | 11/2017 | Shukla et al. | |
| 9,878,616 | B2 | 1/2018 | Dalum | |
| 9,884,431 | B2 | 2/2018 | Pirri et al. | |
| 9,884,576 | B1 * | 2/2018 | McLoughlin | B60P 1/438 |
| 9,890,024 | B2 | 2/2018 | Hao et al. | |
| 9,906,172 | B2 | 2/2018 | Ross | |
| 9,919,695 | B2 | 3/2018 | Shimakami | |
| 9,919,702 | B1 | 3/2018 | Wang et al. | |
| 9,963,142 | B2 | 5/2018 | Takuda | |
| 9,970,515 | B2 | 5/2018 | Morrow et al. | |
| 10,029,556 | B2 | 7/2018 | Morrow et al. | |
| 10,035,648 | B2 | 7/2018 | Haddick et al. | |
| 10,077,040 | B2 | 9/2018 | Chen et al. | |
| 10,099,622 | B2 | 10/2018 | Handschke et al. | |
| 10,106,032 | B2 | 10/2018 | Crist et al. | |
| 10,144,389 | B2 | 12/2018 | Archer et al. | |
| 10,167,027 | B2 | 1/2019 | Perron et al. | |
| 10,196,205 | B2 | 2/2019 | Betz et al. | |
| 10,201,913 | B2 | 2/2019 | Mcneilus et al. | |
| 10,214,199 | B2 | 2/2019 | Dalum et al. | |
| D843,281 | S | 3/2019 | Gander et al. | |
| 10,221,055 | B2 | 3/2019 | Hao et al. | |
| 10,232,731 | B2 | 3/2019 | Kim | |
| 10,239,403 | B2 | 3/2019 | Broker et al. | |
| 10,267,390 | B2 | 4/2019 | Morrow et al. | |
| 10,286,239 | B2 | 5/2019 | Shively et al. | |
| 10,309,871 | B2 | 6/2019 | Hagan | |
| 10,315,643 | B2 | 6/2019 | Shukla et al. | |
| 10,351,340 | B2 | 7/2019 | Haddick et al. | |
| 10,369,860 | B2 | 8/2019 | Ellifson et al. | |
| 10,370,003 | B2 | 8/2019 | Linsmeier et al. | |
| 10,392,000 | B2 | 8/2019 | Shukla et al. | |
| 10,392,005 | B2 | 8/2019 | Hatsuda et al. | |
| 10,392,056 | B2 | 8/2019 | Perron et al. | |
| 10,407,288 | B2 | 9/2019 | Hao et al. | |
| 10,414,067 | B2 | 9/2019 | Datema et al. | |
| 10,414,266 | B1 | 9/2019 | Wiegand et al. | |
| 10,414,385 | B2 | 9/2019 | Linsmeier et al. | |
| 10,421,332 | B2 | 9/2019 | Venton-Walters et al. | |
| 10,421,350 | B2 | 9/2019 | Morrow et al. | |
| 10,427,520 | B2 | 10/2019 | Dalum | |
| 10,434,949 | B2 | 10/2019 | Handschke et al. | |
| 10,434,995 | B2 | 10/2019 | Verhoff et al. | |
| 10,435,026 | B2 | 10/2019 | Shively et al. | |
| 10,456,610 | B1 | 10/2019 | Betz et al. | |
| 10,457,134 | B2 | 10/2019 | Morrow et al. | |
| 10,464,389 | B2 | 11/2019 | Zuleger et al. | |
| 10,466,699 | B2 | 11/2019 | Hirata et al. | |
| 10,479,664 | B2 | 11/2019 | Linsmeier et al. | |
| D869,332 | S | 12/2019 | Gander et al. | |

(56) References Cited

U.S. PATENT DOCUMENTS

D871,283 S 12/2019 Gander et al.
10,513,392 B2 12/2019 Haddick et al.
10,525,297 B2 1/2020 Kay et al.
10,544,556 B2 1/2020 Amin et al.
10,556,622 B1 2/2020 Calliari et al.
10,578,195 B2 3/2020 Steinberger et al.
10,584,775 B2 3/2020 Steinberger et al.
10,596,913 B2 3/2020 Healy et al.
10,611,204 B1 4/2020 Zhang et al.
10,611,347 B1 4/2020 Archer et al.
10,617,900 B1 4/2020 Linsmeier et al.
10,618,405 B2 4/2020 Crist et al.
10,632,805 B1 4/2020 Rositch et al.
D888,629 S 6/2020 Gander et al.
10,685,510 B2 6/2020 Linsmeier et al.
10,723,282 B2 7/2020 Perron et al.
10,752,075 B1 8/2020 Shukla et al.
10,758,759 B2 9/2020 Shively et al.
10,759,251 B1 9/2020 Zuleger
10,766,478 B2 9/2020 Healy et al.
D899,452 S 10/2020 Klimes et al.
10,792,613 B1 10/2020 Drake et al.
10,792,993 B2 10/2020 Dalum et al.
10,843,017 B2 11/2020 Shively et al.
D905,713 S 12/2020 Linsmeier et al.
10,933,743 B2 3/2021 Singh et al.
11,007,894 B2 5/2021 Zenner et al.
11,185,728 B2 11/2021 Fieber et al.
11,220,167 B2 1/2022 Li et al.
11,541,863 B2 1/2023 Shively et al.
11,794,716 B2 10/2023 Shively et al.
11,919,502 B2 3/2024 Shively et al.
12,128,868 B2 10/2024 Shively et al.
2002/0071336 A1 6/2002 Smith et al.
2002/0092687 A1 7/2002 Forster
2002/0103055 A1 8/2002 Tani et al.
2003/0037978 A1 2/2003 Hofbauer
2003/0158638 A1 8/2003 Yakes et al.
2004/0002794 A1 1/2004 Pillar et al.
2004/0112171 A1 6/2004 Kuhstrebe et al.
2005/0284672 A1 12/2005 Egen et al.
2006/0091730 A1 5/2006 Chiao
2006/0207659 A1 9/2006 Shaefer et al.
2007/0108805 A1 5/2007 Manning
2007/0284163 A1 12/2007 Heap et al.
2008/0215700 A1 9/2008 Pillar et al.
2008/0275624 A1 11/2008 Snyder
2009/0095549 A1 4/2009 Dalum et al.
2009/0101465 A1 4/2009 Hart et al.
2009/0118971 A1 5/2009 Heap et al.
2009/0260836 A1 10/2009 Laskaris et al.
2010/0033132 A1 2/2010 Nishi et al.
2010/0065344 A1 3/2010 Collings
2010/0219007 A1 9/2010 Dalum et al.
2011/0061954 A1 3/2011 Singh et al.
2012/0013132 A1 1/2012 Lebeau et al.
2012/0116624 A1 5/2012 Reith
2012/0138318 A1 6/2012 Weisz et al.
2012/0193109 A1* 8/2012 Moore .................. B60K 11/04 180/54.1
2012/0207620 A1 8/2012 Dalum et al.
2012/0266701 A1 10/2012 Yamada et al.
2013/0211665 A1 8/2013 Deimel et al.
2014/0091736 A1 4/2014 Chen
2014/0238704 A1* 8/2014 Moore .................. B60K 11/04 296/190.05
2014/0334169 A1 11/2014 Ewert
2015/0120152 A1 4/2015 Lauterjung et al.
2015/0246331 A1 9/2015 Broker et al.
2015/0246649 A1 9/2015 Brunbauer
2015/0273252 A1 10/2015 Lenz et al.
2015/0273253 A1 10/2015 Lenz et al.
2015/0291060 A1* 10/2015 Zhao ....................... B60L 58/12 903/906
2015/0367300 A1 12/2015 Mcneilus et al.
2016/0082824 A1 3/2016 Inoue
2016/0199999 A1 7/2016 Pirri et al.
2016/0238110 A1 8/2016 Morrow et al.
2016/0288780 A1 10/2016 Shukla et al.
2017/0028837 A1 2/2017 Welschoff
2017/0050063 A1 2/2017 Shively et al.
2017/0092023 A1 3/2017 Ishii et al.
2017/0108085 A1 4/2017 Morrow et al.
2017/0361491 A1 12/2017 Datema et al.
2017/0361492 A1 12/2017 Datema et al.
2017/0363180 A1 12/2017 Steinberger et al.
2017/0370446 A1 12/2017 Steinberger et al.
2018/0022338 A1 1/2018 Dalum et al.
2018/0031085 A1 2/2018 Steinberger et al.
2018/0086215 A1 3/2018 Yoo et al.
2018/0215597 A1 8/2018 Linsmeier et al.
2018/0257637 A1 9/2018 Fukuchi et al.
2018/0319389 A1 11/2018 Felsch et al.
2018/0334072 A1* 11/2018 McLoughlin ........... B60P 1/438
2019/0001805 A1 1/2019 Colavincenzo et al.
2019/0015692 A1 1/2019 Fieber et al.
2019/0032586 A1 1/2019 Fracchia
2019/0039407 A1 2/2019 Smith
2019/0039448 A1 2/2019 Korner et al.
2019/0047541 A1 2/2019 Dockter et al.
2019/0047542 A1 2/2019 Siuchta
2019/0077259 A1 3/2019 Singh et al.
2019/0078666 A1 3/2019 Duhaime et al.
2019/0106083 A1 4/2019 Archer et al.
2019/0143957 A1 5/2019 Dalum et al.
2019/0157869 A1 5/2019 Gadh et al.
2019/0161272 A1 5/2019 Betz et al.
2019/0178350 A1 6/2019 Steinberger et al.
2019/0185077 A1 6/2019 Smith et al.
2019/0185301 A1 6/2019 Hao et al.
2019/0217698 A1 7/2019 Broker et al.
2019/0225071 A1 7/2019 Klucsarits et al.
2019/0242460 A1 8/2019 Morrow et al.
2019/0262643 A1 8/2019 Shively et al.
2019/0262646 A1 8/2019 Linsmeier et al.
2019/0263408 A1 8/2019 Linsmeier et al.
2019/0276102 A1 9/2019 Zuleger et al.
2019/0291711 A1 9/2019 Shukla et al.
2019/0292975 A1 9/2019 Hou et al.
2019/0322321 A1 10/2019 Schwartz et al.
2019/0337348 A1 11/2019 Venton-Walters et al.
2019/0337350 A1 11/2019 Ellifson et al.
2019/0344475 A1 11/2019 Datema et al.
2019/0344838 A1 11/2019 Perron et al.
2019/0351758 A1 11/2019 Wiegand et al.
2019/0351883 A1 11/2019 Verhoff et al.
2019/0352157 A1 11/2019 Hao et al.
2019/0359184 A1 11/2019 Linsmeier et al.
2019/0359460 A1 11/2019 Linsmeier et al.
2019/0366828 A1 12/2019 Morrow et al.
2019/0381990 A1 12/2019 Shukla et al.
2020/0038700 A1 2/2020 Betz et al.
2020/0039341 A1 2/2020 Morrow et al.
2020/0065071 A1 2/2020 Brabender et al.
2020/0087063 A1 3/2020 Haddick et al.
2020/0094671 A1 3/2020 Wildgrube et al.
2020/0108285 A1 4/2020 Kay et al.
2020/0130746 A1 4/2020 Calliari et al.
2020/0139804 A1 5/2020 Holmes et al.
2020/0200237 A1 6/2020 Steinberger et al.
2020/0200238 A1 6/2020 Steinberger et al.
2020/0223277 A1 7/2020 Zhang et al.
2020/0230841 A1 7/2020 Datema et al.
2020/0230842 A1 7/2020 Datema et al.
2020/0231035 A1 7/2020 Crist et al.
2020/0238115 A1 7/2020 Linsmeier et al.
2020/0254840 A1 8/2020 Rositch et al.
2020/0279444 A1 9/2020 Linsmeier et al.
2020/0290236 A1 9/2020 Bjornstad et al.
2020/0290237 A1 9/2020 Steffens et al.
2020/0290238 A1 9/2020 Andringa et al.
2020/0307017 A1 10/2020 Schubart et al.
2020/0308854 A1 10/2020 Schubart et al.
2020/0316816 A1 10/2020 Messina et al.

(56) References Cited

U.S. PATENT DOCUMENTS

| | | | |
|---|---|---|---|
| 2020/0317083 A1 | 10/2020 | Messina et al. |
| 2020/0384823 A1 | 12/2020 | Shukla et al. |
| 2020/0391569 A1 | 12/2020 | Zuleger |
| 2020/0398697 A1 | 12/2020 | Rocholl et al. |
| 2021/0031770 A1 | 2/2021 | Knorr |
| 2021/0229583 A1 | 7/2021 | Li et al. |

FOREIGN PATENT DOCUMENTS

| | | | |
|---|---|---|---|
| CN | 206719010 | U | 12/2017 |
| CN | 110182038 | A | 8/2019 |
| CN | 110270036 | A | 9/2019 |
| DE | 10 2004 017 115 | | 10/2005 |
| EP | 2 055 563 | A2 | 5/2009 |
| EP | 2 055 587 | A2 | 5/2009 |
| GB | 2 470 478 | A | 11/2010 |
| JP | 2006-233843 | A | 9/2006 |
| JP | 2010-221946 | A | 10/2010 |
| JP | 2013-005932 | | 1/2013 |
| JP | 2013-068313 | A | 4/2013 |
| WO | WO-2007/108805 | A1 | 9/2007 |
| WO | WO-2019/046758 | A1 | 3/2019 |
| WO | WO-2019/160957 | A1 | 8/2019 |

OTHER PUBLICATIONS

International Search Report and Written Opinion received for PCT App. No. PCT/US2020/054845, Feb. 11, 2021, 18 pages.
International Search Report and Written Opinion received for PCT App. No. PCT/US2020/054847, Feb. 16, 2021, 21 pages.
International Search Report and Written Opinion Received for PCT Application No. PCT/US2020/054843, Feb. 12, 2021, 18 pages.
Oshkosh Corporation, Striker, Airport Fire Trucks, ARFF, site accessed Oct. 7, 2020, 4 pages, https://www.oshkoshairport.com/arfftrucks/newstriker.
Rosenbauer America, Aircraft Rescue Fire Fighting, site accesse Oct. 7, 2020, 3 pages. https://www.rosenbaueramerica.com/fire-trucks/aircraft-rescue-fire-fighting.
Striker 4x4 brochure (Year: 2012).
Striker 6x6 brochure (Year: 2011).
European Search Report issued in EP Appl. No. 25172036.3 dated Oct. 10, 2025.

* cited by examiner

ELECTRIFIED FIRE FIGHTING VEHICLE

CROSS-REFERENCE TO RELATED PATENT APPLICATIONS

This application is a continuation of U.S. patent application Ser. No. 18/918,732, filed Oct. 17, 2024, which is a continuation of U.S. patent application Ser. No. 18/243,393, filed Sep. 7, 2023, which is a continuation of U.S. patent application Ser. No. 17/968,487, filed Oct. 18, 2022, which is a continuation of U.S. patent application Ser. No. 17/204,464, filed Mar. 17, 2021, which is a continuation of U.S. patent application Ser. No. 17/066,337, filed Oct. 8, 2020, which claims the benefit of and priority to (a) U.S. Provisional Patent Application No. 62/914,105, filed Oct. 11, 2019, (b) U.S. Provisional Patent Application No. 62/914,109, filed Oct. 11, 2019, (c) U.S. Provisional Patent Application No. 62/914,113, filed Oct. 11, 2019, (d) U.S. Provisional Patent Application No. 62/914,126, filed Oct. 11, 2019, (e) U.S. Provisional Patent Application No. 62/914,385, filed Oct. 11, 2019, (f) U.S. Provisional Patent Application No. 62/970,758, filed Feb. 6, 2020, and (g) U.S. Provisional Patent Application No. 63/088,095, filed Oct. 6, 2020, all of which are incorporated herein by reference in their entireties.

BACKGROUND

Fire fighting vehicles such as Aircraft Rescue Fire Fighting ("ARFF") vehicles are specially designed to respond to airport ground emergencies (e.g., involving an aircraft). Airport ground emergencies may occur anywhere on or near airport property. Water and other agents (e.g., foam fire suppressants) are transported to the emergency site to be applied and facilitate extinguishment.

SUMMARY

One embodiment relates to an electrified fire fighting vehicle. The electrified fire fighting vehicle includes a chassis, a cab, a body, a front axle, a rear axle, an engine, a battery pack, a pump system including a water pump, an electromagnetic device, and a power divider coupling the engine to the pump system and the electromagnetic device. The electromagnetic device is electrically coupled to the battery pack. The electromagnetic device has (a) an output coupled to at least one of the front axle or the rear axle and (b) a power take-off coupled to the pump system.

Another embodiment relates to an electrified driveline of a fire fighting vehicle. The electrified driveline includes an engine, an electromagnetic device, and a power divider. The electromagnetic device is configured to electrically couple to a battery pack of the fire fighting vehicle. The electromagnetic device has (a) an output configured to couple to an axle of the fire fighting vehicle and (b) a power take-off configured to couple to a pump system of the fire fighting vehicle. The power divider couples the engine to the pump system and the electromagnetic device.

Still another embodiment relates to an electrified airport rescue fire fighting vehicle. The electrified airport rescue fire fighting vehicle includes a chassis, a cab, a body, an axle, a battery pack, a water tank having a capacity of at least 1,500 gallons, a pump system including a water pump, and an electromagnetic device. The electromagnetic device is electrically coupled to the battery pack. The electromagnetic device has (a) an output coupled to the axle and (b) a power take-off coupled to the pump system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
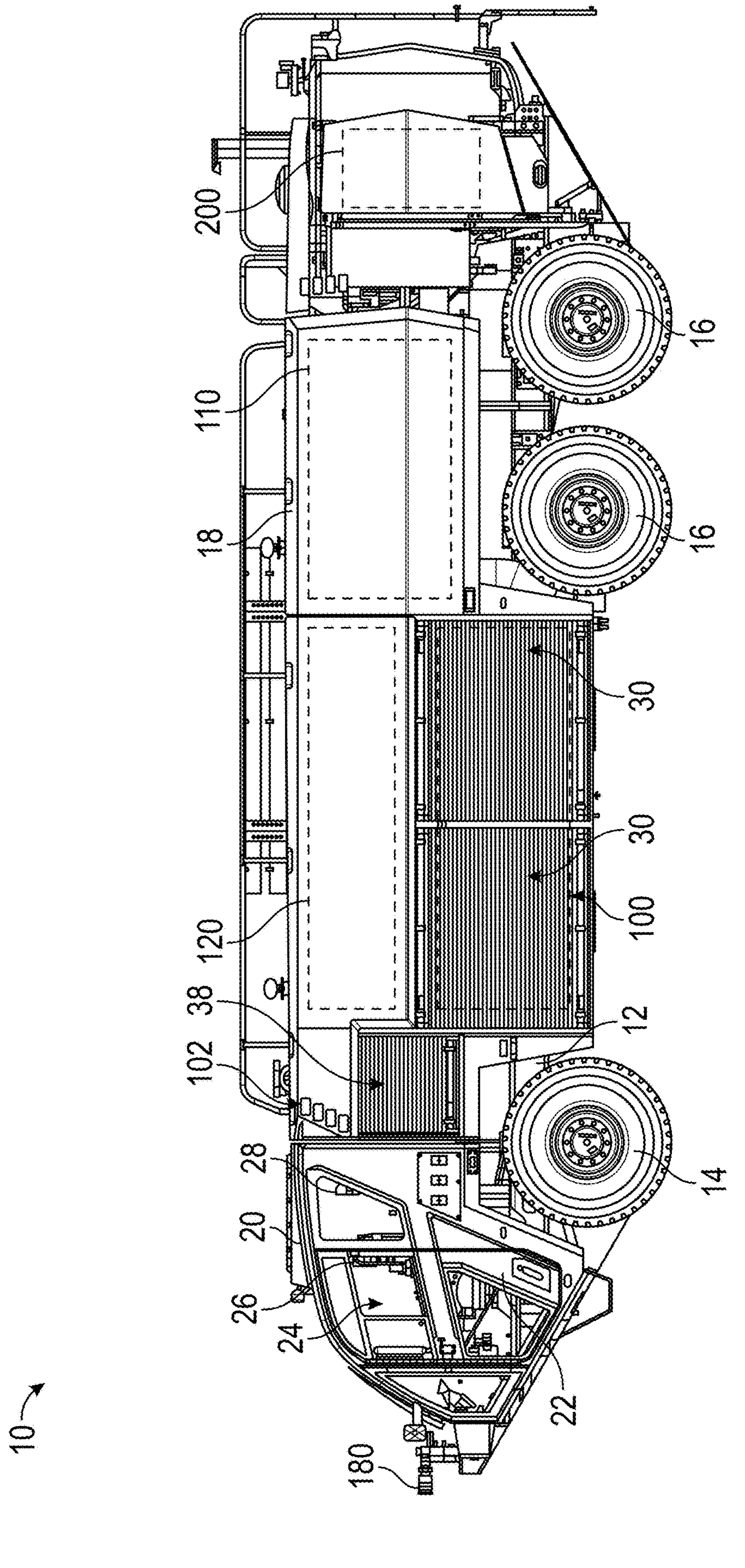
FIG. 1 is a left side view of a fire fighting vehicle having a hybrid powertrain, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, various embodiments of a hybrid powertrain for fire fighting vehicles are shown and described. Fire fighting vehicles, for example ARFF vehicles, are specialized vehicles that carry water and foam with them to the scene of an emergency. Although the present disclosure specifically references ARFF vehicles, it should be understood that the scope of the present disclosure encompasses any fire fighting vehicle (e.g., a municipal fire fighting vehicle, a quint fire fighting vehicle, a mid-mount fire fighting vehicle, etc.) having a hybrid powertrain. Most commonly, ARFF vehicles are commissioned for use at an airfield, where the location of an emergency (e.g., an airplane crash, a fire, etc.) can widely vary, thereby prompting the transport of fire fighting materials to the emergency site. ARFF vehicles are heavy duty vehicles in nature and are able to respond at high speeds to reach even remote areas of an airfield quickly. However, traditional internal combustion driven powertrains are limited in their response times. A hybrid powertrain (e.g., an at least partially electrified powertrain, etc.), on the other hand, can provide improved acceleration and/or top speeds, thereby reducing response times and improving fire fighting responsiveness, all while providing a more fuel efficient and eco-friendly solution. As used herein, "hybrid powertrain" means that two separate and distinct power/energy sources are used for generating power/energy to operate components of a vehicle. However, "hybrid powertrain" should not be understood to exclusively require an internal combustion engine and an on-board electric power source (e.g., a genset, a battery, etc.).

Overall Vehicle

According to the exemplary embodiment shown in FIGS. 1-10, a fire apparatus, shown as fire fighting vehicle 10, includes a fluid delivery assembly, shown as fluid delivery system 100, and a powertrain, shown as hybrid powertrain 200. In one embodiment, the hybrid powertrain 200 is configured as a diesel/electric hybrid powertrain. In other embodiments, the hybrid powertrain 200 is configured as another type of hybrid powertrain (e.g., gasoline/electric, natural gas/electric, etc.). In still other embodiments, the fire fighting vehicle 10 does not include the hybrid powertrain, but rather includes a fully electric powertrain. According to the exemplary embodiment shown in FIGS. 1-5, the fire fighting vehicle 10 is an ARFF vehicle. According to alternative embodiments, the fire fighting vehicle 10 is a municipal fire fighting vehicle, a quint fire truck, a mid-mount fire truck, an aerial truck, a rescue truck, a tanker, or still another type of fire fighting vehicle. According to still other embodiments, the vehicle is another type of vehicle (e.g., a military vehicle, a commercial vehicle, a refuse truck, a concrete mixer truck, etc.).

As shown in FIGS. 1-5, the fire fighting vehicle 10 includes a chassis, shown as a frame 12. The frame 12 supports a plurality of tractive elements, shown as front wheels 14 and rear wheels 16, a body assembly, shown as a rear section 18, and a cab, shown as front cabin 20. In one embodiment, the fire fighting vehicle 10 is a Striker® 6×6 manufactured by Oshkosh Corporation® with one front axle to support the front wheels 14 and two rear axles to support the rear wheels 16. In other embodiments, the fire fighting vehicle 10 is a Striker® 4×4, a Striker® 1500, a Striker® 3000, or a Striker® 4500 model manufactured by Oshkosh Corporation®. Thus, the fire fighting vehicle 10 may include a different number of front axles and/or rear axles to support the front wheels 14 and the rear wheels 16 based on the application or model of the fire fighting vehicle 10. In an alternative embodiment, the tractive elements are otherwise structured (e.g., tracks, etc.).

Figure 2:
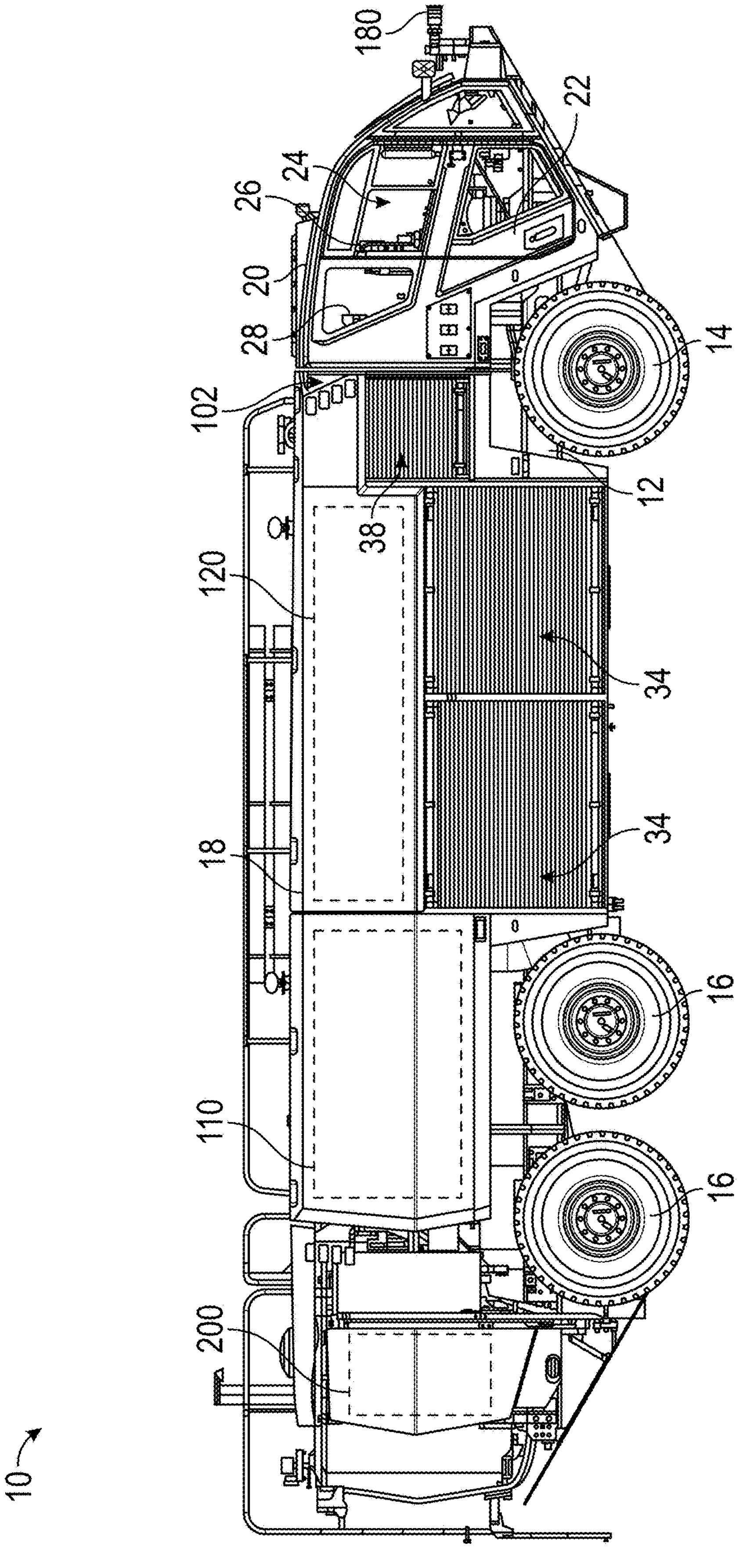
FIG. 2 is a right side view of the fire fighting vehicle of FIG. 1, according to an exemplary embodiment.
Figure 3:
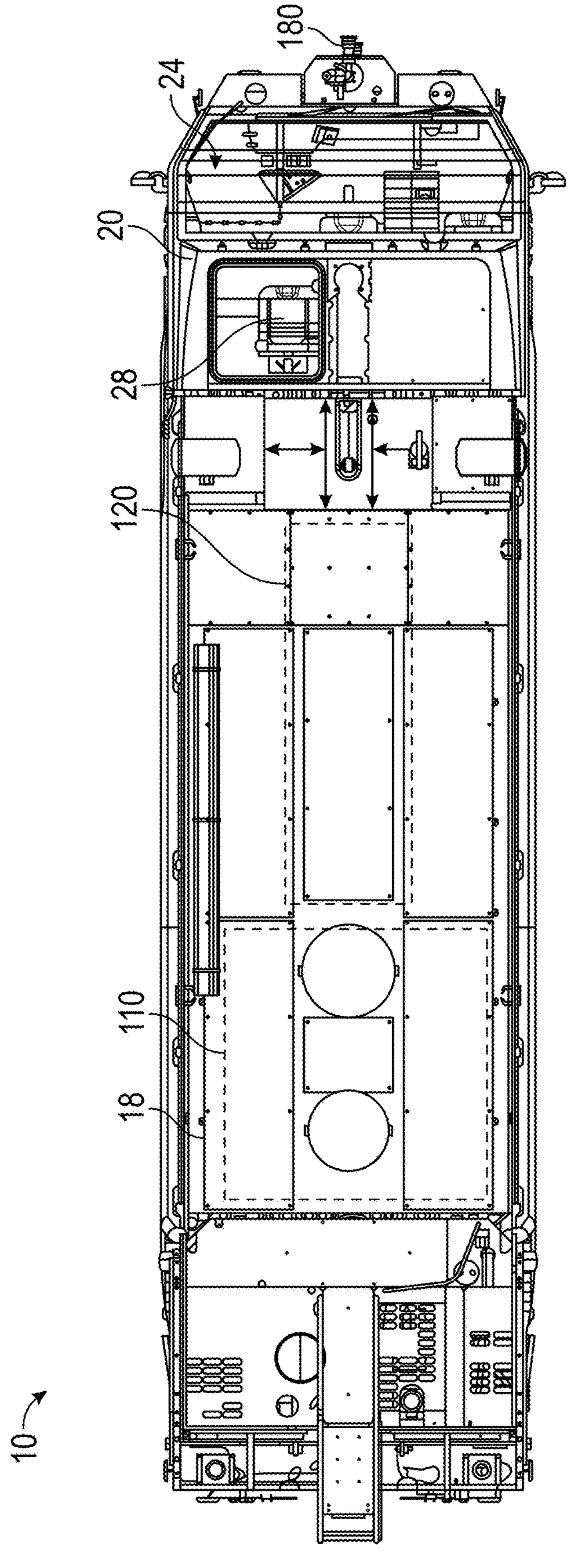
FIG. 3 is a top view of the fire fighting vehicle of FIG. 1, according to an exemplary embodiment.

As shown in FIGS. 1-3, the front cabin 20 is positioned forward of the rear section 18 (e.g., with respect to a forward direction of travel for the vehicle, etc.). According to an alternative embodiment, the front cabin 20 is positioned behind the rear section 18 (e.g., with respect to a forward direction of travel for the vehicle, etc.). According to an exemplary embodiment, the front cabin 20 includes a plurality of body panels coupled to a support (e.g., a structural frame assembly, etc.). The body panels may define a plurality of openings through which an operator accesses (e.g., for ingress, for egress, to retrieve components from within, etc.) an interior 24 of the front cabin 20. As shown in FIGS. 1 and 2, the front cabin 20 includes a pair of doors 22 positioned over the plurality of openings defined by the plurality of body panels. The doors 22 may provide access to the interior 24 of the front cabin 20 for a driver (or passengers) of the fire fighting vehicle 10. The doors 22 may be hinged, sliding, or bus-style folding doors.

Figure 4:
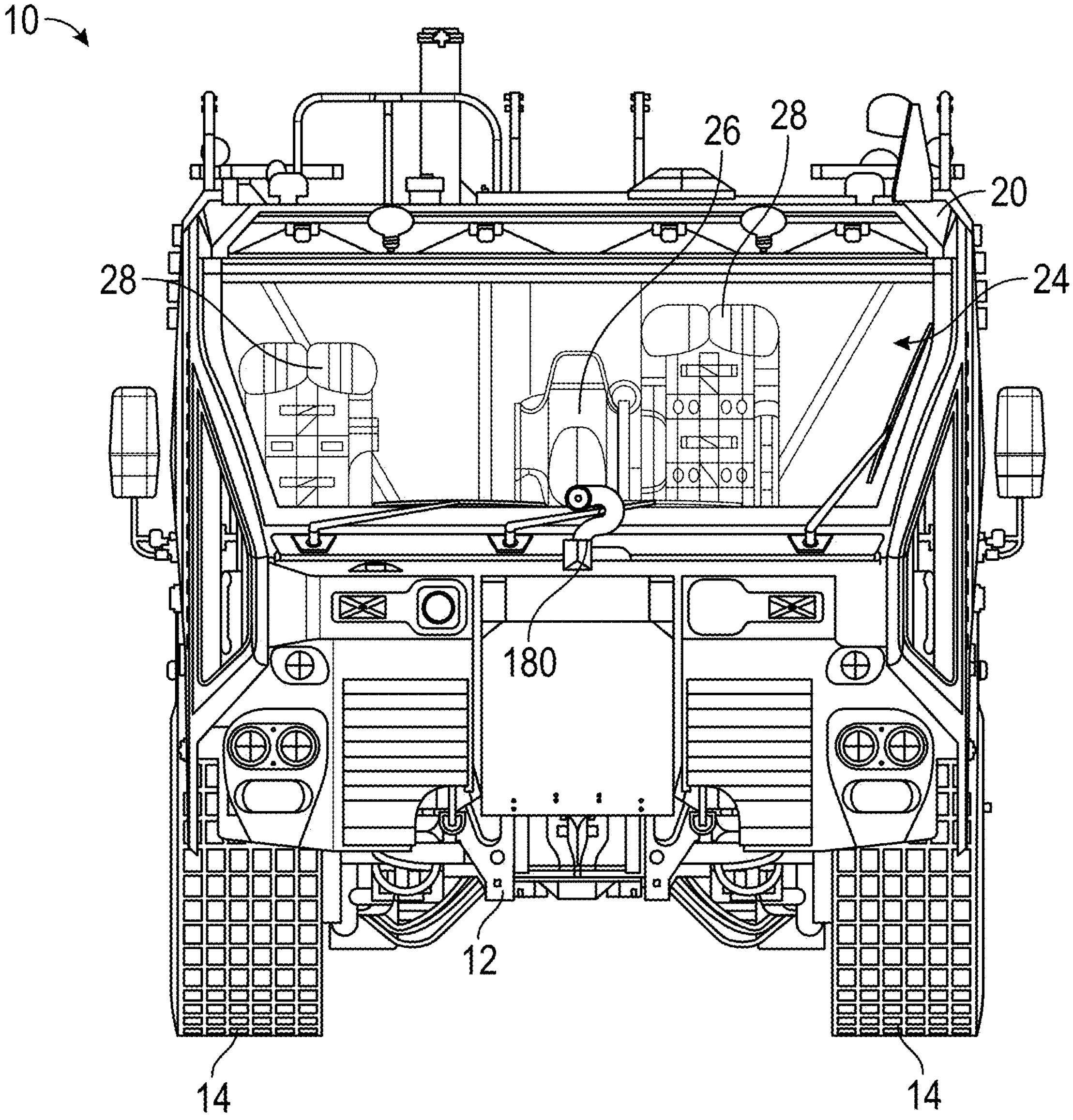
FIG. 4 is a front view of the fire fighting vehicle of FIG. 1, according to an exemplary embodiment.
Figure 5:
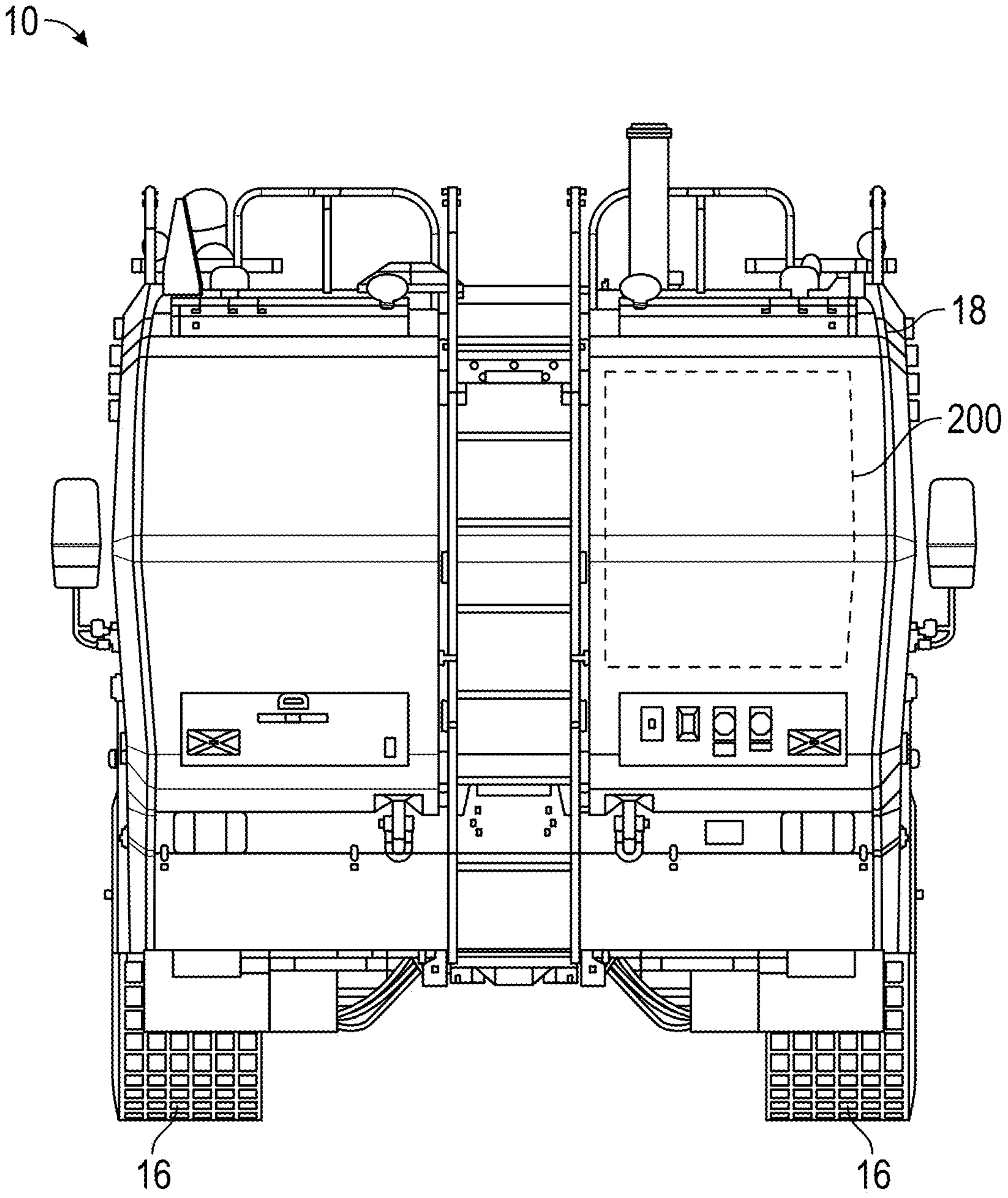
FIG. 5 is a rear view of the fire fighting vehicle of FIG. 1, according to an exemplary embodiment.

The front cabin 20 may include components arranged in various configurations. Such configurations may vary based on the particular application of the fire fighting vehicle 10, customer requirements, or still other factors. The front cabin 20 may be configured to contain or otherwise support at least one of a number of occupants, storage units, and equipment. As shown in FIGS. 1, 2, and 4, the front cabin 20 is configured to provide seating for an operator (e.g., a driver, etc.) of the fire fighting vehicle 10 with a seat, shown as driver seat 26. In some embodiments, as shown in FIGS. 1-4, the front cabin 20 is configured to provide seating for one or more passengers of the fire fighting vehicle 10 with one or more seats, shown as passenger seats 28. The front cabin 20 may include one or more storage areas for providing compartmental storage for various articles (e.g., supplies, instrumentation, equipment, etc.). The interior 24 of the front cabin 20 may further include a user interface. The user interface may include a cabin display, a user input device such as a turret joystick, and various controls (e.g., buttons, switches, knobs, levers, etc.). In some embodiments, the user interface within the interior 24 of the front cabin 20 further includes touchscreens, a steering wheel, an accelerator pedal, a brake pedal, among other components. The user interface may provide the operator with control capabilities over the fire fighting vehicle 10 (e.g., direction of travel, speed, etc.), one or more components of hybrid powertrain 200, and/or still other components of the fire fighting vehicle 10 from within the front cabin 20.

Figure 6:
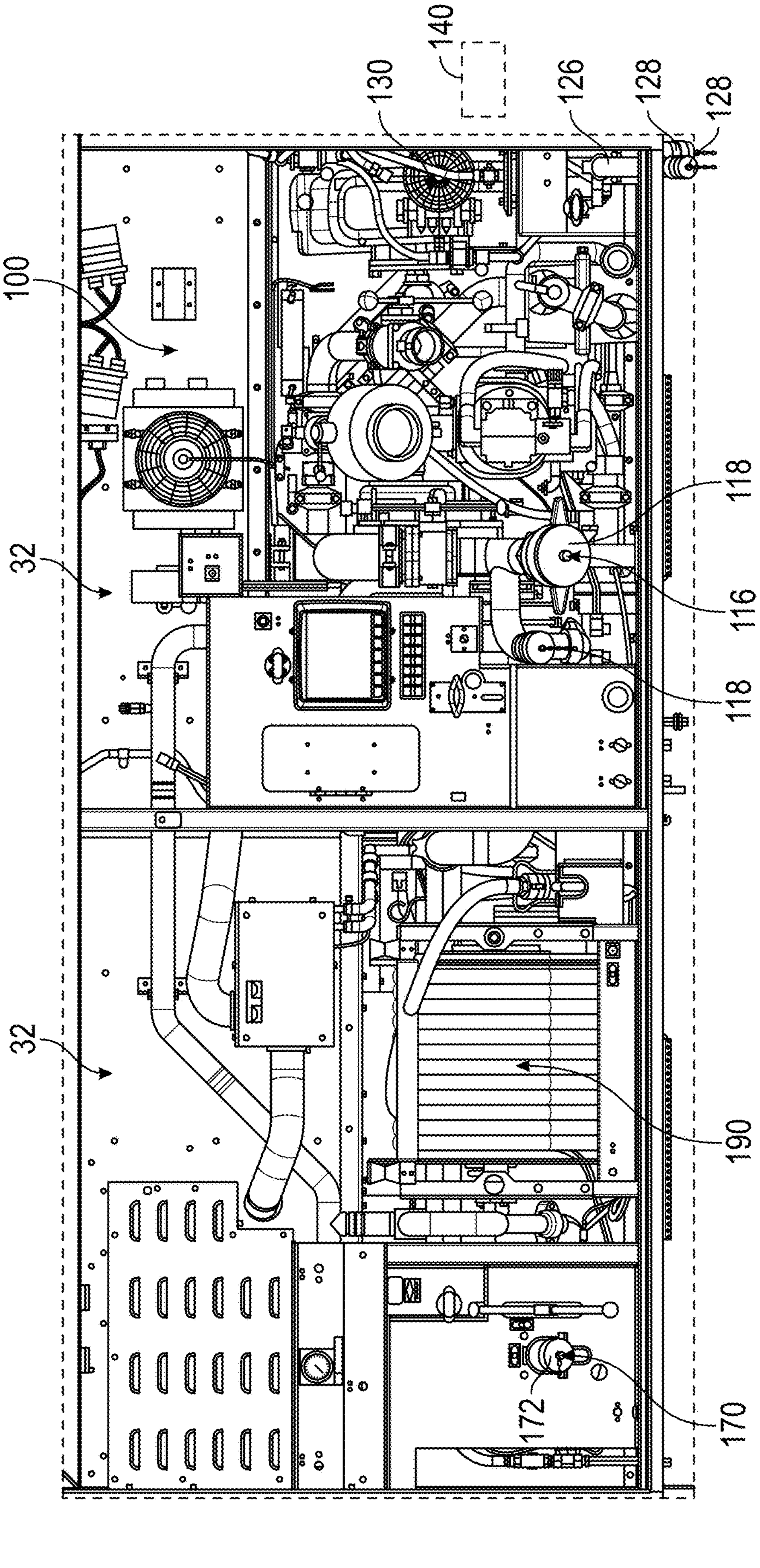
FIG. 6 is a detailed view of various components of a fluid delivery system in a left side storage compartment of the fire fighting vehicle of FIG. 1, according to an exemplary embodiment.

As shown in FIGS. 1 and 6, the rear section 18 includes a first plurality of compartments, shown as left compartments 32, with corresponding doors, shown as doors 30, disposed along a side (e.g., a left side, etc.) of the fire fighting vehicle 10. As shown in FIG. 6, the doors 30 may be selectively opened to gain access to various components of the fire fighting vehicle 10 within the left compartments 32, including one or more components of the fluid delivery system 100. In other embodiments, the left compartments 32 define a cavity with various storage apparatuses (e.g., shelving, hooks, racks, etc.) for equipment (e.g., hoses, extinguishers, ladders, fire fighting gear, etc.).

Figure 7:
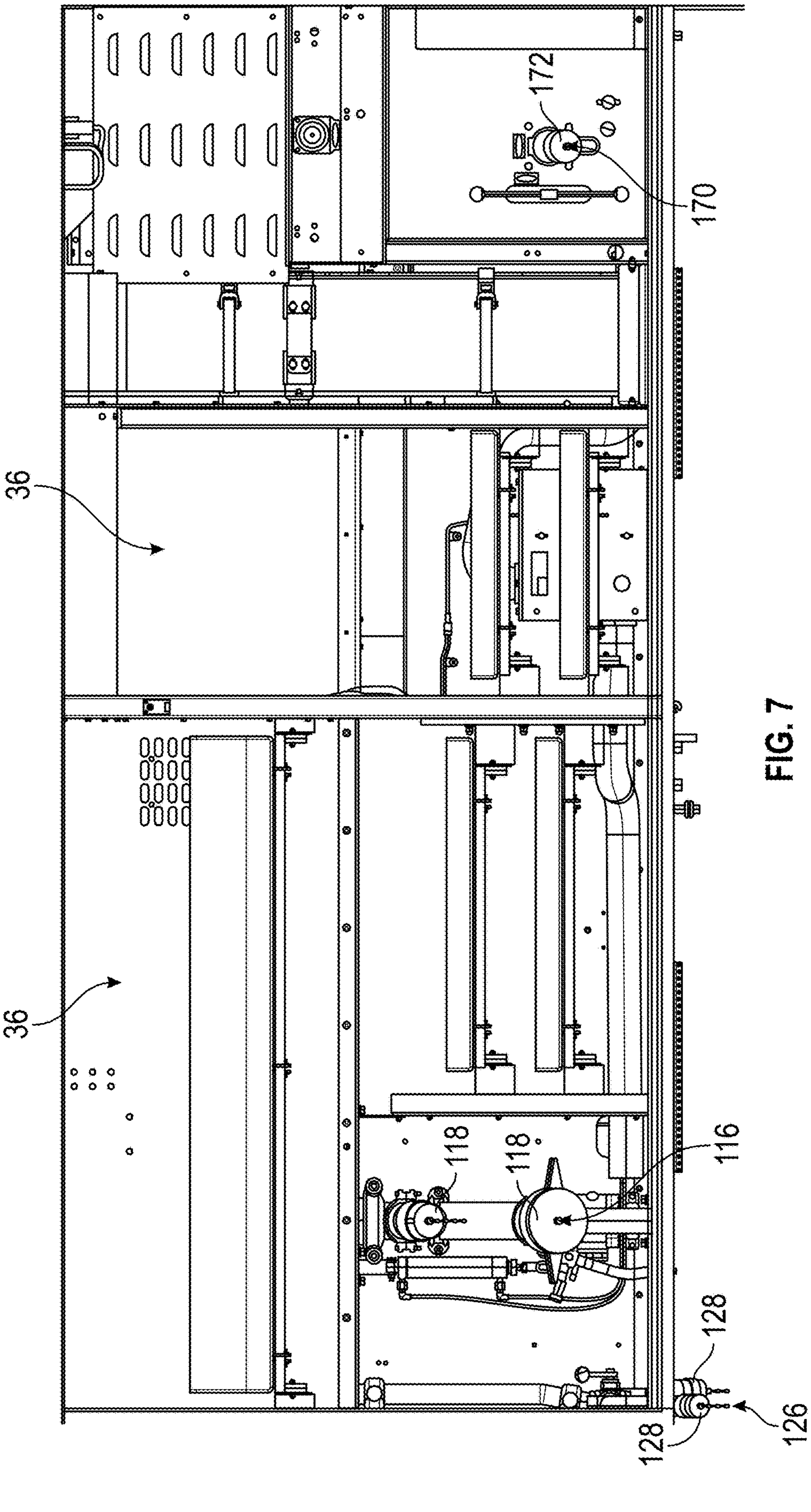
FIG. 7 is a detailed view of various components of the fluid delivery system of FIG. 6 in a right side storage compartment of the fire fighting vehicle of FIG. 1, according to an exemplary embodiment.

As shown in FIGS. 2 and 7, the rear section 18 includes a second plurality of compartments, shown as right compartments 36, with corresponding doors, shown as doors 34, disposed along a side (e.g., a right side, etc.) of the fire fighting vehicle 10. As shown in FIGS. 2 and 7, the doors 34 may be selectively opened to gain access to various components of the fire fighting vehicle 10 within the right compartments 36, including one or more components of the fluid delivery system 100, racks, shelving, and/or other storage apparatuses for storing fire fighting equipment. As shown in FIGS. 1 and 2, the rear section 18 includes additional compartments with corresponding doors, shown as doors 38. The doors 38 may be selectively opened to gain access to and/or store various equipment of the fire fighting vehicle 10 (e.g., hoses, fire fighting gear, etc.) within the additional compartments.

Fluid Delivery System

As shown in FIGS. 1-3, the fluid delivery system 100 includes a first tank, shown as water tank 110, and a second tank, shown as agent tank 120. The water tank 110 and the agent tank 120 are disposed within the rear section 18 of the fire fighting vehicle 10, with the water tank 110 positioned above the rear wheels 16 and the agent tank 120 positioned forward of the water tank 110. In other embodiments, the water tank 110 and/or the agent tank 120 are otherwise positioned (e.g., disposed along a rear, front, roof, side, etc. of the fire fighting vehicle 10, etc.). In an alternative embodiment, the fluid delivery system 100 does not include at least one of the water tank 110 or the agent tank 120 (e.g., a municipal fire truck without water storage capabilities that pumps water from a fire hydrant, etc.). By way of example, the fluid delivery system 100 may be configured to utilize an off-vehicle water source (e.g., a fire hydrant, an open body of water, etc.). According to an exemplary embodiment, the water tank 110 and/or the agent tank 120 are corrosion and UV resistant polypropylene tanks.

According to an exemplary embodiment, the water tank 110 is configured to store a fluid, such as water or another liquid. In one embodiment (e.g., a 6×6 embodiment, etc.), the water tank 110 is approximately a 3,000 gallon capacity tank (e.g., 12,000 liters; 3,170 gallons; 11,350 liters; 2,700 gallons; 10,300 liters; at most 3,500 gallons and a least 2,500 gallons; etc.). In another embodiment (e.g., a 4×4 embodiment, etc.), the water tank 110 is approximately a 1,500 gallon capacity tank (e.g., 6,000 liters; 1,585 gallons; etc.). In still another embodiment (e.g., an 8×8 embodiment, etc.), the water tank 110 is approximately a 4,500 gallon capacity tank (e.g., 17,029 liters; etc.). In other embodiments, the water tank 110 has another capacity (e.g., a municipal fire truck with a water tank having at least a 200 gallon capacity and approximately between a 200 and a 400 gallon capacity, such as, for example, 300 gallons, etc.). In some embodiments, multiple water tanks 110 are disposed within and/or along the rear section 18 of the fire fighting vehicle 10.

According to an exemplary embodiment, the agent tank 120 is configured to store an agent, such as a foam fire suppressant. According to an exemplary embodiment, the agent is an aqueous film forming foam ("AFFF"). AFFF is water-based and frequently includes hydrocarbon-based surfactant (e.g., sodium alkyl sulfate, etc.) and a fluorosurfactant (e.g., fluorotelomers, perfluorooctanoic acid, perfluorooctanesulfonic acid, etc.). AFFF has a low viscosity and spreads rapidly across the surface of hydrocarbon fuel fires. An aqueous film forms beneath the foam on the fuel surface that cools burning fuel and prevents evaporation of flammable vapors and re-ignition of fuel once it has been extinguished. The film also has a self-healing capability whereby holes in the film layer are rapidly resealed. In alternative embodiments, another agent is stored with the agent tank 120 (e.g., low-expansion foams, medium-expansion foams, high-expansion foams, alcohol-resistant foams, synthetic foams, protein-based foams, foams to be developed, fluorine-free foams, film-forming fluoro protein ("FFFP") foams, alcohol resistant aqueous film forming foam ("AR-AFFF"), etc.). In one embodiment, the agent tank 120 is approximately a 420 gallon capacity tank. In another embodiment, the agent tank 120 is approximately a 210 gallon capacity tank. In still another embodiment, the agent tank 120 is approximately a 540 gallon capacity tank. In other embodiments, the agent tank 120 has another capacity. In some embodiments, multiple agent tanks 120 are disposed within or along the rear section 18 of the fire fighting vehicle 10. The capacity of the water tank 110 and/or the agent tank 120 may be specified by a customer. It should be understood that water tank 110 and the agent tank 120 configurations are highly customizable, and the scope of the present disclosure is not limited to particular size or configuration of the water tank 110 and the agent tank 120. As shown in FIGS. 1 and 2, the fire fighting vehicle 10 includes one or more indicators, shown as fluid level indicators 102. The fluid level indicators 102 may be configured to provide an indication of the amount of water and/or agent within the water tanks 110 and/or the agent tank 120, respectively.

As shown is FIGS. 6 and 7, the water tank 110 includes a plurality of conduits, shown as water fill lines 116, that extend therefrom to a plurality of inlets, shown as water inlets 118. The water fill lines 116 fluidly couple the water inlets 118 to the water tank 110 such that the water tank 110 may be refilled with water (e.g., from a pumping station, from a fire hydrant, from a water truck, etc.) with the water inlets 118. As shown in FIGS. 6 and 7, the water inlets 118 are positioned within the left compartments 32 and the right compartments 36. In other embodiments, the water inlets 118 are otherwise positioned (e.g., extend outward from the rear section 18, disposed along an exterior of the fire fighting vehicle 10, etc.). According to an exemplary embodiment, the water inlets 118 include a 2.5 inch diameter inlet and a 4.5 inch diameter inlet (e.g., to facilitate various connections between a water source, etc.). In other embodiments, one or more of the water inlets 118 are differently sized.

As shown is FIGS. 6 and 7, the agent tank 120 includes a plurality of conduits, shown as agent fill lines 126, that extend therefrom to a plurality of inlets, shown as agent inlets 128. The agent fill lines 126 fluidly couple the agent inlets 128 to the agent tank 120 such that the agent tank 120 may be refilled with agent (e.g., from a pumping station, etc.) with the agent inlets 128. As shown in FIGS. 6 and 7, the agent inlets 128 are positioned along a bottom edge of the rear section 18 on each lateral side of the fire fighting vehicle 10. In other embodiments, the agent inlets 128 are otherwise positioned (e.g., within the left compartments 32 and/or the right compartments 36, etc.). According to an exemplary embodiment, the agent inlets 128 include a 1.5 inch diameter inlet. In other embodiments, one or more of the agent inlets 128 are differently sized (e.g., a 2.5 inch diameter inlet, etc.).

As shown in FIGS. 6 and 8-10, the fluid delivery system 100 includes a fluid driving system, shown as pump system 140. According to an exemplary embodiment, the pump system 140 includes a single, high pressure pump. In one embodiment, the high pressure pump is approximately a 400 horsepower ("hp") pump (e.g., between 350 hp and 450 hp, etc.). In another embodiment, the pump system 140 includes a lower pressure pump (e.g., operates at less than 400 hp (e.g., 50 hp, 100 hp, 150 hp, 200 hp, 250 hp, 300 hp, etc.). In other embodiments, the pump system 140 includes a first, low pressure pump arranged in a series configuration with a second, high pressure pump. According to an exemplary embodiment, providing pre-pressurized fluid to the second pump from the first pump reduces (e.g., eliminates, etc.) priming issues of the second pump, increases the output pressure capabilities of the second pump, reduces the power output and/or torque output needed from the hybrid powertrain 200 or other pump driver to drive the second pump to reach higher pressures, reduces (e.g., eliminates, etc.) cavitation at the inlet of the second pump, and/or decreases the overall size of the second pump (e.g., increasing available space and serviceability of the fluid delivery system 100, etc.). Further details regarding such a two pump system may be found in U.S. Patent Publication No. 2017/0050063, filed Aug. 17, 2016, which is incorporated herein by reference in its entirety.

As shown in FIGS. 1-4, 6, and 7, the fluid delivery system 100 includes a first discharge, shown as structural discharge 170, a second discharge, shown as turret 180, and a third discharge, shown as hose reel 190. In some embodiments, the fluid delivery system 100 includes a second turret. In some embodiments, the fluid delivery system 100 additionally or alternatively includes a high reach extendible turret ("HRET"). According to an exemplary embodiment, the pump system 140 is configured to pump the water from the water tank 110 and/or the agent from the agent tank 120, pressurize the water, mix the agent with the water (if agent is being used), and provide the pressurized water and/or water-agent mixture to one or more of the structural discharge 170, the turret 180, and the hose reel 190. In some embodiments, the pump system 140 is additionally or alternatively configured to pump water from an external, off-vehicle source (e.g., a fire hydrant, an open body of water, etc.). In some embodiments, (i) the structural discharge 170 receives pressurized water and/or pressure water-agent mixture from the pump system 140 at a first pressure (e.g., 170 psi, etc.) and (ii) the turret 180 and/or the hose reel 190 receive pressurized water and/or pressurized water-agent mixture from the pump system 140 at a second pressure (e.g., between 1000 psi and 1500 psi, etc.) that is greater than the first pressure. According to an exemplary embodiment, the substantially higher pressure causes the turret 180 and/or the hose reel 190 to create smaller water and/or agent droplets, thereby increasing the surface area of the fluid being expelled by the fluid delivery system 100 relative to traditional systems. Increased surface area of the fluid may thereby increase the rate at which heat transfer occurs such that the fluid delivery system 100 has a higher fire fighting capability (e.g., relative to traditional systems, etc.).

As shown in FIGS. 6 and 7, the structural discharge 170 includes a plurality of outlets, shown as low pressure outlets 172. As shown in FIGS. 6 and 7, the low pressure outlets 172 are positioned within the left compartments 32 and the right compartments 36. In other embodiments, the low pressure outlets 172 are otherwise positioned (e.g., extend outward from the rear section 18, disposed along an exterior of the fire fighting vehicle 10, etc.). According to an exemplary embodiment, the low pressure outlets 172 include a 2.5 inch diameter outlet. In other embodiments, one or more of the low pressure outlets 172 are differently sized. According to an exemplary embodiment, the low pressure outlets 172 are configured to engage a hose during a structural mode of operation (e.g., low pressure mode, etc.) of the fluid delivery system 100 such that the fluid (e.g., water and/or agent, etc.) pumped via the pump system 140 to the structural discharge 170 may be applied to a fire at a low pressure (e.g., 170 psi, etc.).

As shown in FIGS. 1-4, the turret 180 is positioned on a front bumper of the fire fighting vehicle 10. In other embodiments, the turret 180 is otherwise positioned (e.g., attached to a boom, on the roof, on the rear section 18, etc.). In some embodiments, the fire fighting vehicle 10 includes a plurality of turrets 180 (e.g., a bumper turret and a roof turret, etc.). According to an exemplary embodiment, the turret 180 is controlled via a user interface (e.g., a joystick, etc.) located within the interior of the front cabin 20. In some embodiments, the turret 180 can be manually operated (e.g., during a fault condition, etc.). According to an exemplary embodiment, the pump system 140 is configured to provide the fluid (e.g., water, water-agent mixture, etc.) to the turret 180 at a target pressure of approximately 1250 psi and a target flow rate of at least 300 gpm. In some embodiments, the pump system 140 provides the fluid to the turret 180 at a different pressure and/or flow rate (e.g., 315 gpm, 310 gpm, 1300 psi, based on the use of the hose reel 190, etc.).

As shown in FIG. 6, the hose reel 190 is positioned within one of the left compartments 32. In other embodiments, the hose reel 190 is otherwise positioned (e.g., within the right compartments 36, on the roof of the fire fighting vehicle 10, etc.). In some embodiments, the fire fighting vehicle 10 includes a plurality of hose reels 190 (e.g., one on each lateral side of the fire fighting vehicle 10, etc.). According to an exemplary embodiment, the pump system 140 is configured to provide the fluid (e.g., water, water-agent mixture, etc.) to the hose reel 190 at a target pressure of 1100 psi and a target flow rate of 20 gpm. In some embodiments, the pump system 140 provides the fluid to the hose reel 190 at a different pressure and/or flow rate (e.g., 25 gpm, 1000 psi, etc.).

Hybrid Powertrain

Figure 8:
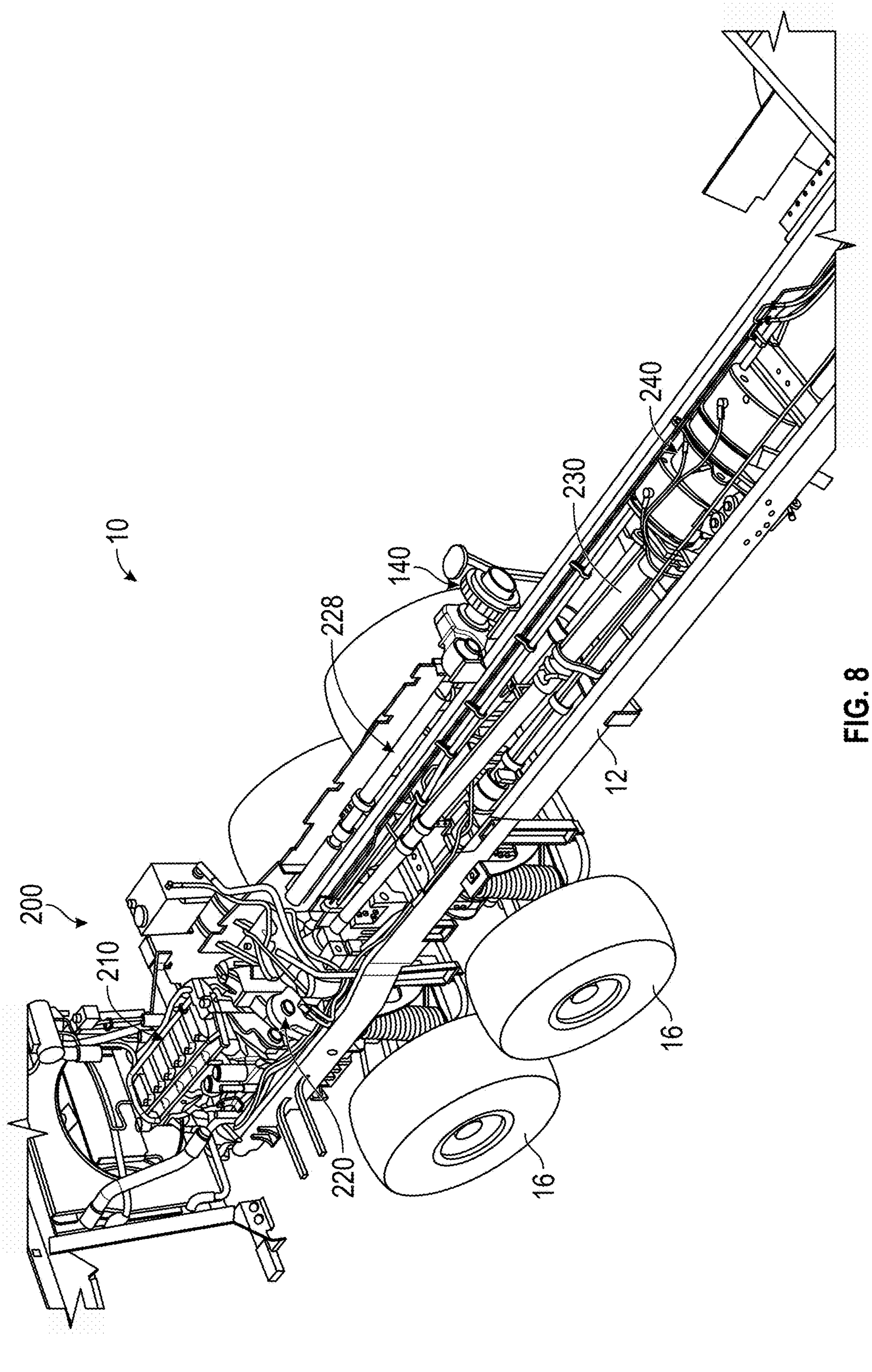
FIG. 8 is a perspective view of the hybrid powertrain of the fire fighting vehicle of FIG. 1, according to an exemplary embodiment.
Figure 9:
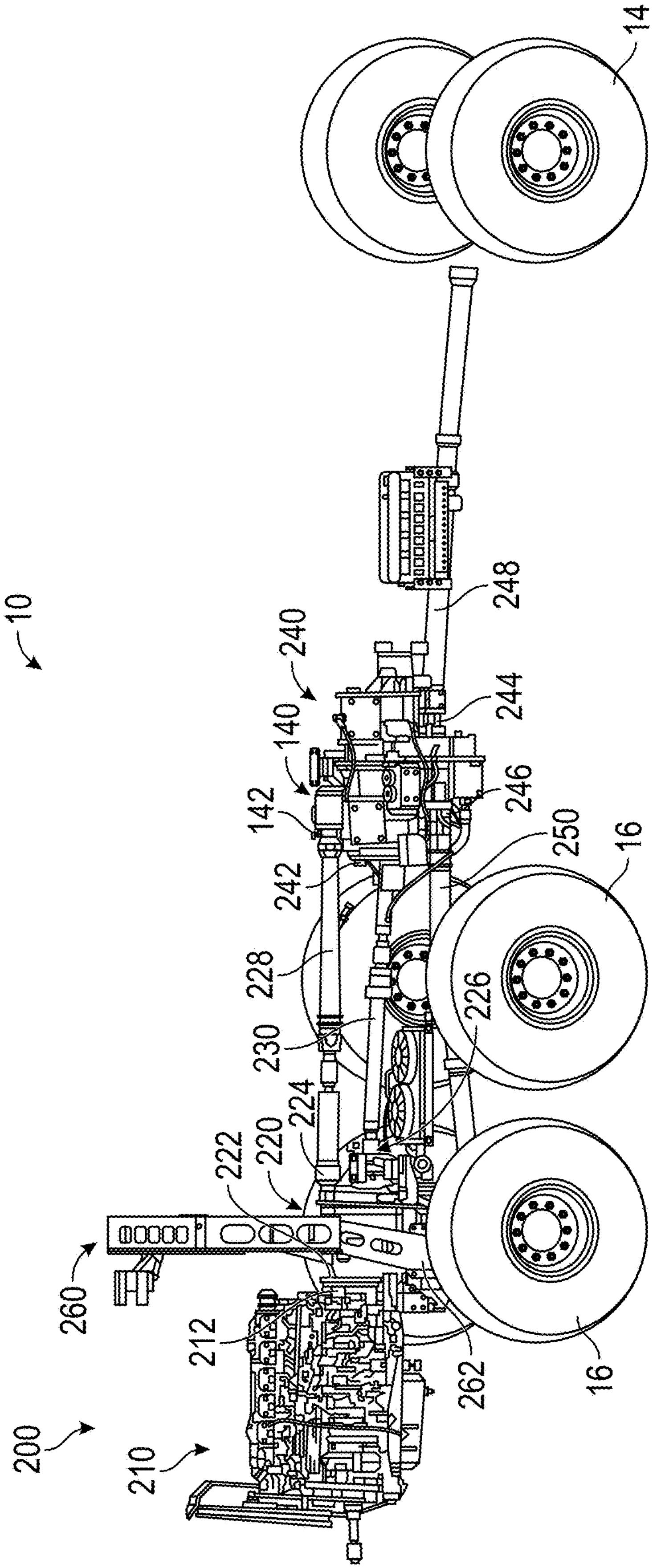
FIG. 9 is a side view of the hybrid powertrain of FIG. 8, according to an exemplary embodiment.
Figure 10:
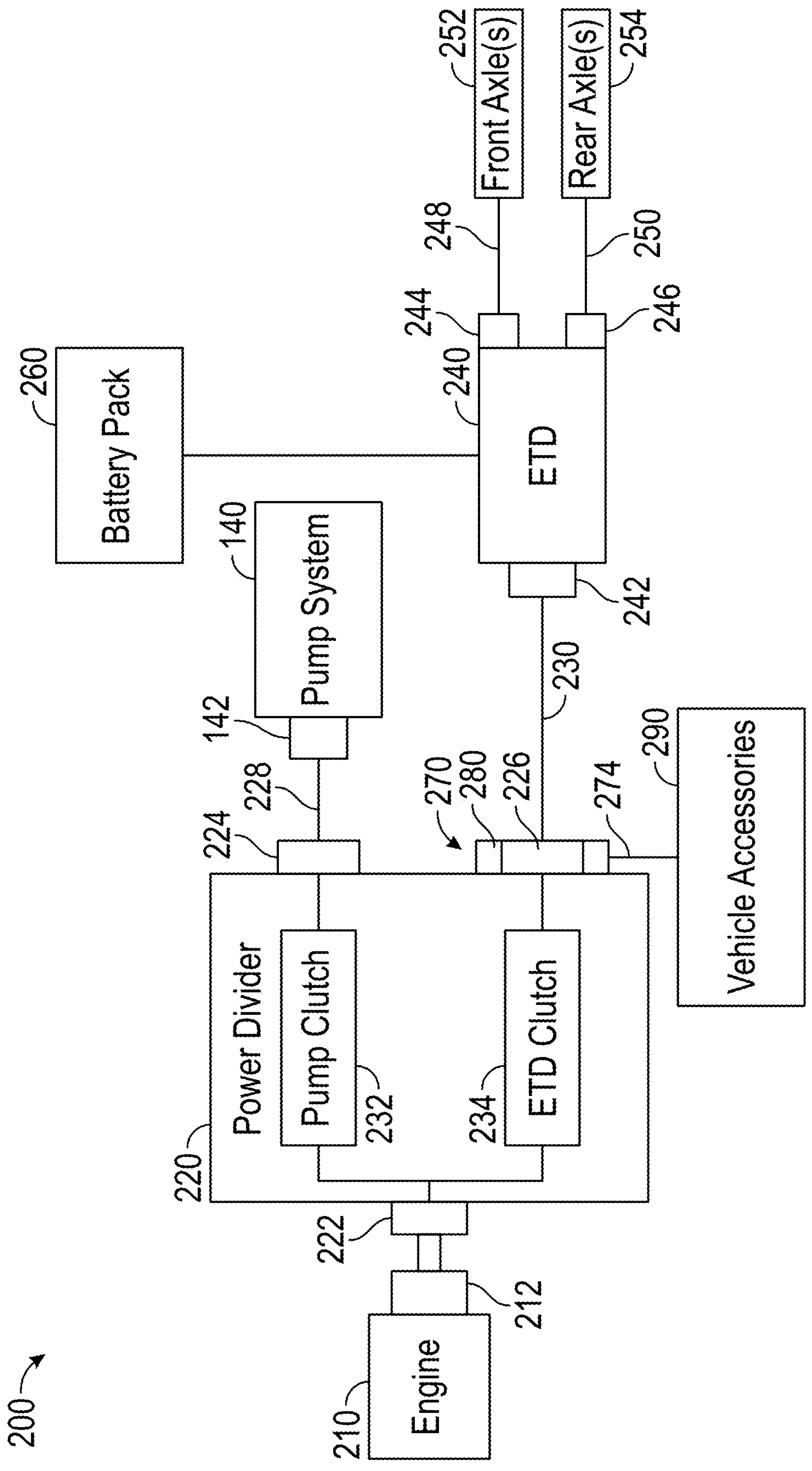
FIG. 10 is a schematic diagram of the hybrid powertrain of FIG. 8, according to an exemplary embodiment.

As shown in FIGS. 8-10, the hybrid powertrain 200 of the fire fighting vehicle 10 includes (i) a first driver, shown as engine 210, having a first interface, shown as power divider interface 212; (ii) a power splitting mechanism, shown as power divider 220, having (a) a second interface, shown engine interface 222, (b) a third interface, shown as pump interface 224, and (c) a fourth interface, shown as electromechanical transfer device ("ETD") interface 226; (iii) a second driver (e.g., an electromechanical transmission, etc.), shown as ETD 240, having (a) a fifth interface, shown as power divider interface 242, (b) a sixth interface, shown as front axle interface 244, and (c) a seventh interface, shown as rear axle interface 246; (iv) an on-board electric power source, shown as battery pack 260; and (v) an auxiliary drive, shown as accessory drive 270.

As shown in FIGS. 8 and 9, the engine 210 is coupled to the frame 12 at a rear end thereof and at least partially behind the rear wheels 16 (i.e., the rear axle(s)). In other embodiments, the engine 210 is otherwise positioned (e.g., at a front end of the frame 12, forward of the front axle, between the front axle(s) and the rear axle(s), etc.). According to an exemplary embodiment, the engine 210 is a compression-ignition internal combustion engine that utilizes diesel fuel. In alternative embodiments, the engine 210 is another type of driver (e.g., spark-ignition engine, fuel cell, electric motor, etc.) that is otherwise powered (e.g., with gasoline, compressed natural gas, propane, hydrogen, electricity, etc.). According to an exemplary embodiment, the engine 210 is capable of outputting approximately 400 kilowatts ("kW") or 550 hp. In other embodiments, the engine 210 is a smaller or a larger engine that provides lesser or greater power output (e.g., less than 900 hp, less than 800 hp, less than 750 hp, less than 700 hp, less than less than 650 hp, between 500 and 600 hp, etc.) depending on the sizing of other components in the hybrid powertrain 200 and/or customer specifications.

As shown in FIG. 9, the battery pack 260 is coupled to the frame 12 via a bracket/housing, shown as battery housing 262. According to the exemplary embodiment shown in FIG. 9, the battery housing 262 positions the battery pack 260 forward of the engine 210, above the power divider 220, and rearward of at least one (e.g., both, only one, etc.) rear axle (and rearward of the water tank 110). In other embodiments, the battery pack 260 is otherwise positioned (e.g., at the front end of the frame 12, above or proximate the ETD 240, behind the engine 210, forward of the water tank 110, etc.).

As shown in FIG. 10, the battery pack 260 is electrically coupled to the ETD 240. According to an exemplary embodiment, the battery pack 260 is configured to provide electrical energy to the ETD 240 to facilitate or supplement operation thereof and/or receive electrical energy generated by the ETD 240 to charge the battery pack 260 (e.g., based on a mode of operation of the fire fighting vehicle 10, etc.). Accordingly, the battery pack 260 may be charged from an external power station or input, the ETD 240, a regenerative braking system, and/or other suitable electrical energy sources. According to an exemplary embodiment, the battery pack 260 includes a plurality of battery cells that provide a battery capacity capable of providing approximately 28 kilowatt hours ("kWh") of energy. In other embodiments, the battery pack 260 is less or more battery capacity to provide a lesser or a greater amount of energy (e.g., between 20 and 40 kWh, less than 60 kWh, less than 50 kWh, between 12 kWh and 60 kWh, etc.). In some embodiments, the battery pack 260 has a larger capacity (e.g., 80 hWh, 100 kWh, 150 kWh, 200 kWh, etc.) and the size and power output of the engine 210 may be reduced. Alternatively, in a fully electric powertrain, the battery pack 260 may provide a battery capacity capable of providing up to or exceeding 330 kWh. In such an embodiment, the battery pack 260 may replace and be positioned in the location of the engine 210. In some embodiments, the battery pack 260 includes a set of two or more batteries in a series or parallel arrangement depending on electrical needs of the hybrid powertrain 200. The battery pack 260 can be located in various locations of the fire fighting vehicle 10 to achieve a desired packaging, weight balance, or cost performance of the hybrid powertrain 200 and the fire fighting vehicle 10.

As shown in FIGS. 8-10, the power divider 220 is coupled to the frame 12 and positioned between the engine 210, the pump system 140, and the ETD 240. As shown in FIG. 9, the power divider interface 212 of the engine 210 and the engine interface 222 of the power divider 220 are in direct engagement such that the power divider 220 is directly driven by the engine 210. In other embodiments, the power divider interface 212 of the engine 210 and engine interface 222 of the power divider 220 are coupled together by an intermediate member (e.g., a connecting shaft, a gearbox, a clutch, a continuous variable transmission, a pulley, etc.).

As shown in FIGS. 8-10, the pump interface 224 of the power divider 220 is mechanically coupled to an eighth interface, shown as power divider interface 142, of the pump system 140 via a first connecting shaft, shown as pump shaft 228. In other embodiments, the pump interface 224 of the power divider 220 and the power divider interface 142 of the pump system 140 are in direct engagement. In still other embodiments, the pump interface 224 of the power divider 220 and the power divider interface 142 of the pump system 140 are otherwise coupled (e.g., via a gearbox, a pulley, etc.).

As shown in FIGS. 8-10, the ETD interface 226 of the power divider 220 is mechanically coupled to the power divider interface 242 of the ETD 240 via a second connecting shaft, shown as ETD shaft 230. In other embodiments, the ETD interface 226 of the power divider 220 and the power divider interface 242 of the ETD 240 are in direct engagement. In still other embodiments, the ETD interface 226 of the power divider 220 and the power divider interface 242 of the ETD 240 are otherwise coupled (e.g., via a pulley, etc.).

According to an exemplary embodiment, the power divider 220 is configured to facilitate selectively, mechanically coupling (i) the engine 210 to the pump system 140 and (ii) the engine 210 to the ETD 240. As shown in FIG. 10, the power divider 220 includes a first clutch, shown as pump clutch 232, positioned between the engine interface 222 and the pump interface 224. According to an exemplary embodiment, the pump clutch 232 is positioned to facilitate selectively, mechanically coupling the engine 210 to the pump system 140 (e.g., based on the mode of operation of the fire fighting vehicle 10, etc.) to facilitate pumping fluid from the water tank 110, the agent tank 120, and/or an off-vehicle water source to a fluid outlet of the fire fighting vehicle 10 (e.g., the structural discharge 170, the turret 180, the hose reel 190, etc.). According to an exemplary embodiment, the engine 210 drives the pump system 140 through the power divider 220 and the pump shaft 228 at a certain (e.g., fixed, etc.) ratio. In an alternative embodiment, the pump system 140 or the pump shaft 228 are directly coupled to a power-take-off ("PTO") of the engine 210. In another alternative embodiment, the pump system 140 or the pump shaft 228 are directly coupled to a PTO of the ETD 240.

As shown in FIG. 10, the power divider 220 includes a second clutch, shown as ETD clutch 234, positioned between the engine interface 222 and the ETD interface 226. According to an exemplary embodiment, the ETD clutch 234 is positioned to facilitate selectively, mechanically coupling the engine 210 to the ETD 240 (e.g., based on the mode of operation of the fire fighting vehicle 10, etc.) to facilitate driving components of the ETD 240, as described in further detail herein. In an alternative embodiment, the power divider 220 does not include the ETD clutch 234. By way of example, the power divider 220 may alternatively have a through-shaft design such that an output of the engine 210 connects to an input of the ETD 240 without a clutch positioned therebetween. In such an embodiment, the power divider 220 may include a gear train assembly coupled between the output of the engine 210 and the pump clutch 232. In some embodiments, a clutch is positioned between (i) the engine 210 and (ii) the power divider 220 and the ETD 240 such that the engine 210 can be selectively decoupled from the rest of the hybrid powertrain 200. In some embodiments, a clutch is positioned between (i) the power divider 220 and (ii) the ETD 240 such that the ETD 240 can be selectively decoupled from the engine 210 and the power divider 220.

As shown in FIGS. 8 and 9, the ETD 240 is coupled to the frame 12 and positioned (i) forward of the engine 210, the power divider 220, and the rear wheels 16 (i.e., the rear axle(s)) and (ii) rearward of the front wheels 14 (i.e., the front axle(s)). In other embodiments, the ETD 240 is otherwise positioned (e.g., rearward of the engine 210 and the power divider 220, etc.). As shown in FIGS. 9 and 10, the front axle interface 244 of the ETD 240 is mechanically coupled to a first or front differential of a first axle, shown as front axle 252, to which the front wheels 14 are connected, via a third connecting shaft, shows as front drive shaft 248. In some embodiments, the front axle 252 is a tandem front axle. As shown in FIGS. 9 and 10, the rear axle interface 246 of the ETD 240 is mechanically coupled to a second or rear differential of one or more rear axles (e.g., a single rear axle, a tandem rear axle, etc.), shown as rear axles 254, to which the rear wheels 16 are connected, via a fourth connecting shaft, shown as rear drive shaft 250. In some embodiments, the hybrid powertrain 200 does not include one of the front drive shaft 248 or the rear drive shaft 250 and/or the ETD 240 does not include one of the front axle interface 244 or the rear axle interface 246. (e.g., a rear wheel drive embodiment, a front wheel drive embodiment, etc.). In some embodiments, the ETD 240 does not include either of the front axle interface 244 or the rear axle interface 246. Rather, the hybrid powertrain 200 may include a transfer case positioned externally relative to and coupled to the ETD 240 (e.g., the ETD 240 has a single, transfer case output, etc.), and the transfer case may include the front axle interface 244 and the rear axle interface 246. According to an exemplary embodiment, the ETD 240 is (i) selectively, mechanically coupled to the engine 210 by the power divider 220 and (ii) electrically coupled to battery pack 260 to facilitate (a) selectively driving the front axle(s) 252 and/or the rear axle(s) 254 (e.g., directly, indirectly through the external transfer case, etc.) and (b) selectively charging the battery pack 260. In an alternative embodiment, the ETD 240 in not configured to charge the battery pack 260 (e.g., the battery pack 260 is chargeable through a charging station, regenerative braking, etc.).

According to an exemplary embodiment, the ETD 240 is an electromechanical infinitely variable transmission ("EMIVT") that includes a first electromagnetic device (e.g., a first motor/generator, etc.) and a second electromagnetic device (e.g. a second motor/generator, etc.) coupled to each other via a plurality of gear sets (e.g., planetary gear sets, etc.). The EMIVT also includes one or more brakes and one or more clutches to facilitate operation of the EMIVT in various modes (e.g., a drive mode, a battery charging mode, a low-range speed mode, a high-range speed mode, a reverse mode, an ultra-low mode, etc.). In some implementations, all of such components may be efficiently packaged in a single housing with only the inputs and outputs exposed. By way of example, the first electromagnetic device may be driven by the engine 210 to generate electricity. The electricity generated by the first electromagnetic device may be used (i) to charge the battery pack 260 and/or (ii) to power the second electromagnetic device to drive the front axle(s) 252 and/or the rear axle(s) 254. By way of another example, the second electromagnetic device may be driven by the engine 210 to generate electricity. The electricity generated by the second electromagnetic device may be used (i) to charge the battery pack 260 and/or (ii) to power the first electromagnetic device to drive the front axle(s) 252 and/or the rear axle(s) 254. By way of another example, the first electromagnetic device and/or the second electromagnetic device may be powered by the battery pack 260 to (i) back-start the engine 210 (e.g., such that an engine starter is not necessary, etc.), (ii) drive the accessory drive 270 (e.g., when the engine 210 is off, when the ETD clutch 234 is disengaged, etc.), and/or (iii) drive the front axle(s) 252 and/or the rear axle(s) 254. By way of yet another example, the first electromagnetic device may be driven by the engine 210 to generate electricity and the second electromagnetic device may receive both the generated electricity from the first electromagnetic device and the stored energy in the battery pack 260 to drive the front axle(s) 252 and/or the rear axle(s) 254. By way of yet still another example, the second electromagnetic device may be driven by the engine 210 to generate electricity and the first electromagnetic device may receive both the generated electricity from the second electromagnetic device and the stored energy in the battery pack 260 to drive the front axle(s) 252 and/or the rear axle(s) 254. Further details regarding the components of the EMIVT and the structure, arrangement, and functionality thereof may be found in (i) U.S. Pat. No. 8,337,352, filed Jun. 22, 2010, (ii) U.S. Pat. No. 9,651,120, filed Feb. 17, 2015, (iii) U.S. Pat. No. 10,421,350, filed Oct. 20, 2015, (iv) U.S. Patent Publication No. 2017/0363180, filed Aug. 31, 2017, (v) U.S. Patent Publication No. 2017/0370446, filed Sep. 7, 2017, (vi) U.S. Pat. No. 10,578,195, filed Oct. 4, 2017, and (vii) U.S. Patent Publication No. 2019/0178350, filed Feb. 17, 2019, all of which are incorporated herein by reference in their entireties. In other embodiments, the ETD 240 includes a device or devices different than the EMIVT (e.g., an electronic transmission, a motor coupled to a transfercase, etc.).

Figure 11:
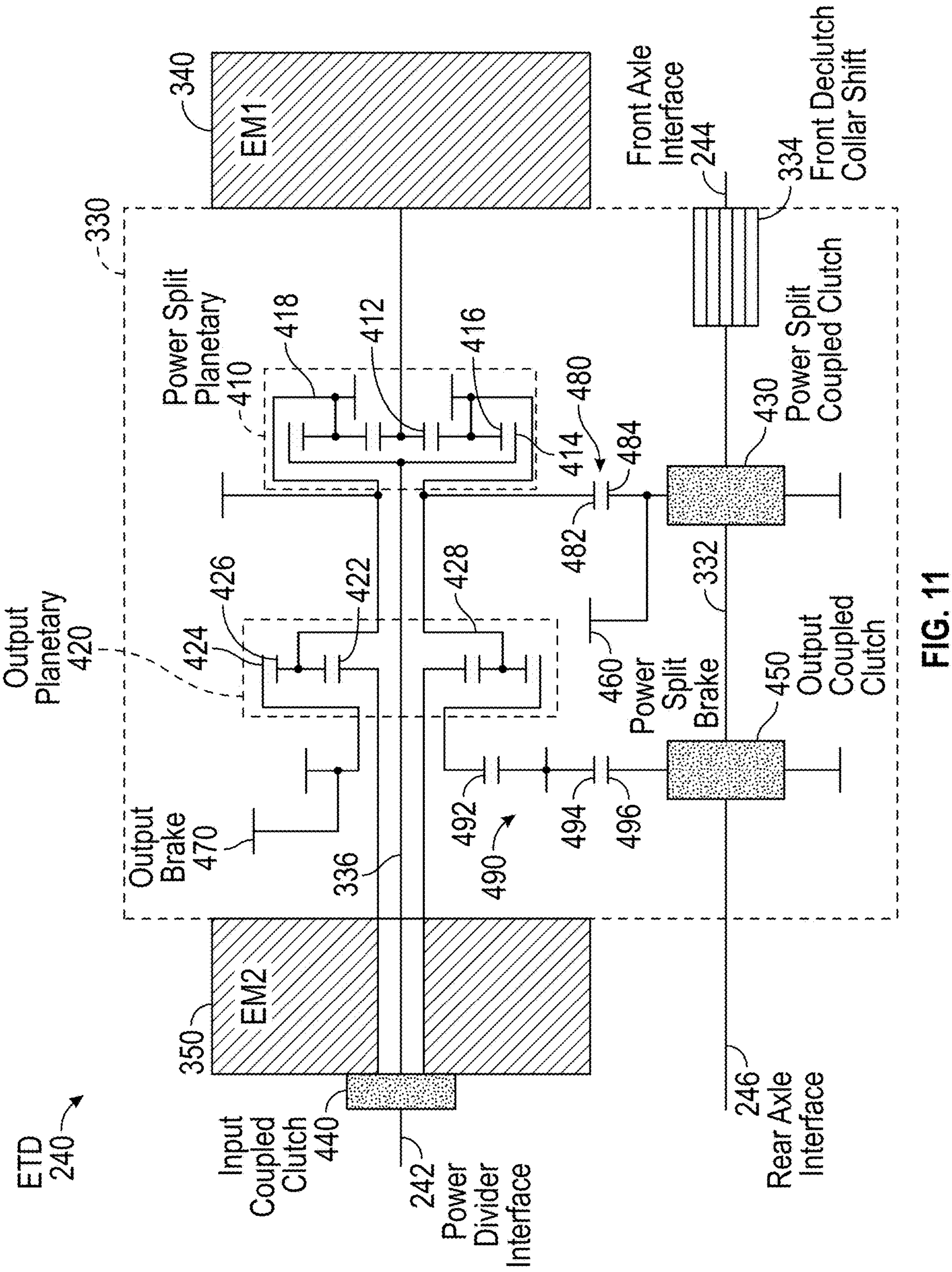
FIG. 11 is a detailed schematic diagram an electromechanical transfer device of the hybrid powertrain of FIG. 8, according to an exemplary embodiment.

Referring to FIG. 11, an example of the ETD 240 is shown according to an exemplary embodiment. In this embodiment, the ETD 240 is an EMIVT. As shown in FIG. 11, the ETD 240 includes a mechanical power transmission assembly (e.g., gearbox, gear set, gear train, mechanical transmission assembly, etc.), shown as transmission 330, a first electromagnetic device, shown as first motor/generator 340, a second motor/generator 350, shown as second motor/generator 350, the power divider interface 242, the front axle interface 244, and the rear axle interface 246. The transmission 330 includes a first gear set, shown as power split planetary 410, and a second gear set, shown as output planetary 420. In one embodiment, the power split planetary 410 and the output planetary 420 are disposed between the first motor/generator 340 and the second motor/generator 350. In an alternative embodiment, one or both of the power split planetary 410 and the output planetary 420 are positioned outside of (i.e., not between) the first motor/generator 340 and the second motor/generator 350. As shown in FIG. 11, the power split planetary 410 is directly coupled to the power divider interface 242.

As shown in FIG. 11, the power split planetary 410 is a planetary gear set that includes a sun gear 412, a ring gear 414, and a plurality of planetary gears 416. The plurality of planetary gears 416 couple the sun gear 412 to the ring gear 414. As shown in FIG. 11, a carrier 418 rotationally supports the plurality of planetary gears 416. In one embodiment, the first motor/generator 340 is directly coupled to the sun gear 412 such that the power split planetary 410 is coupled to the first motor/generator 340. By way of example, the first motor/generator 340 may include a shaft (e.g., a first shaft, an input shaft, an output shaft, etc.) directly coupled to the sun gear 412.

As shown in FIG. 11, the output planetary 420 is a planetary gear set that includes a sun gear 422, a ring gear 424, and a plurality of planetary gears 426. The plurality of planetary gears 426 couple the sun gear 422 to the ring gear 424. As shown in FIG. 11, a carrier 428 rotationally supports the plurality of planetary gears 426. In one embodiment, the second motor/generator 350 is directly coupled to the sun gear 422 such that the output planetary 420 is coupled to the second motor/generator 350. By way of example, the second motor/generator 350 may include a shaft (e.g., a second shaft, an input shaft, an output shaft, etc.) directly coupled to the sun gear 422. The carrier 418 is directly coupled to the carrier 428, thereby coupling the power split planetary 410 to the output planetary 420, according to the exemplary embodiment shown in FIG. 11. In one embodiment, directly coupling the carrier 418 to the carrier 428 synchronizes rotational speeds of the carrier 418 and the carrier 428.

As shown in FIG. 11, the transmission 330 includes a first clutch, shown as power split coupled clutch 430. In one embodiment, the power split coupled clutch 430 is positioned downstream of the power split planetary 410 (e.g., between the power split planetary 410 and the front axle interface 244 or the rear axle interface 246, etc.). As shown in FIG. 11, the power split coupled clutch 430 is positioned to selectively couple the power split planetary 410 and the output planetary 420 with a shaft, shown as output shaft 332. In one embodiment, the power split coupled clutch 430 allows a vehicle to be towed without spinning the gears within the transmission 330 (e.g., the power split planetary 410, the output planetary 420, etc.). The output shaft 332 may be coupled to the rear axle interface 246 and selectively coupled to front axle interface 244 with a declutch assembly, shown as the front declutch collar shift 334. The front declutch collar shift 334 may be engaged and disengaged to selectively couple the front axle interface 244 to the output shaft 332 of the transmission 330 (e.g., to facilitate operation of a vehicle in a rear-wheel-drive-only mode, an all-wheel-drive mode, a four-wheel-drive mode, etc.).

As shown in FIG. 11, the transmission 330 includes a second clutch, shown as input coupled clutch 440. The input coupled clutch 440 is positioned to selectively couple the second motor/generator 350 with the power divider interface 242, according to an exemplary embodiment. The input coupled clutch 440 may thereby selectively couple the power divider interface 242 to the output planetary 420. As shown in FIG. 11, the transmission 330 includes a shaft, shown as the connecting shaft 336. The connecting shaft 336 extends from the power divider interface 242, through the second motor/generator 350, and through the output planetary 420 to the power split planetary 410. The connecting shaft 336 couples the power divider interface 242 with the power split planetary 410, according to the exemplary embodiment shown in FIG. 11. In one embodiment, the connecting shaft 336 directly couples the power divider interface 242 with the ring gear 414 of the power split planetary 410. The input coupled clutch 440 may selectively couple the second motor/generator 350 with the connecting shaft 336. According to an exemplary embodiment, the shaft (e.g., input/output shaft, etc.) of the first motor/generator 340 and the shaft (e.g., input/output shaft, etc.) of the second motor/generator 350 are radially aligned with the power split planetary 410, the output planetary 420, and the connecting shaft 336 (e.g., centerlines thereof are aligned, etc.). As shown in FIG. 11, the transmission 330 includes a third clutch, shown as output coupled clutch 450. The output coupled clutch 450 is positioned to selectively couple the output planetary 420 with the output shaft 332. In one embodiment, the output shaft 332 is radially offset from the power split planetary 410, the output planetary 420, and the connecting shaft 336 (e.g., radially offset from centerlines thereof, etc.).

As shown in FIG. 11, the transmission 330 includes a first brake, shown as power split brake 460. The power split brake 460 is positioned to selectively inhibit the movement of at least a portion of the power split planetary 410 (e.g., the planetary gears 416, the carrier 418, etc.) and the output planetary 420 (e.g., the planetary gears 426, the carrier 428, etc.). In other embodiments, the transmission 330 does not include the power split brake 460. The power split brake 460 may thereby be an optional component of the transmission 330. As shown in FIG. 11, the transmission 330 includes a second brake (or a first brake in embodiments where the transmission 330 does not include the power split brake 460), shown as the output brake 470. The output brake 470 is positioned to selectively inhibit the movement of at least a portion of the output planetary 420 (e.g., the ring gear 424, etc.). In one embodiment, at least one of the power split brake 460 and the output brake 470 are biased into an engaged position (e.g., with a spring, etc.) and selectively disengaged (e.g., with application of pressurized hydraulic fluid, etc.). In other embodiments, the power split brake 460 and the output brake 470 are hydraulically-biased and spring released. In still other embodiments, the components of the transmission 330 are still otherwise engaged and disengaged (e.g., pneumatically, etc.). By way of example, the output brake 470 and the output coupled clutch 450 may be engaged simultaneously to function as a driveline brake (e.g., a braking mechanism to slow down a vehicle, etc.). By way of another example, the power split brake 460 and the power split coupled clutch 430 may be engaged simultaneously to function as a driveline brake. In other embodiments, one or both of the power split brake 460 and the output brake 470 are omitted from the ETD 240.

As shown in FIG. 11, the transmission 330 includes a first gear set, shown as gear set 480, that couples the carrier 418 and the carrier 428 to the output shaft 332. The gear set 480 includes a first gear, shown as gear 482, in meshing engagement with a second gear, shown as gear 484. As shown in FIG. 11, the gear 482 is rotatably coupled to the carrier 418 and the carrier 428. By way of example, the gear 482 may be fixed to a component (e.g., shaft, tube, etc.) that couples the carrier 418 and the carrier 428. As shown in FIG. 11, the power split coupled clutch 430 is positioned to selectively couple the gear 484 with the output shaft 332 when engaged. With the power split coupled clutch 430 disengaged, relative movement (e.g., rotation, etc.) may occur between the gear 484 and the output shaft 332. The power split brake 460 may be positioned to selectively limit the movement of the gear 484 when engaged to thereby limit the movement of the gear 482, the carrier 418, and the carrier 428.

As shown in FIG. 11, the transmission 330 includes a second gear set, shown as the gear set 490, that couples the output planetary 420 to the output shaft 332. The gear set 490 includes a first gear, shown as gear 492, coupled to the ring gear 424 of the output planetary 420. The gear 492 is in meshing engagement with a second gear, shown as gear 494. The gear 494 is coupled to a third gear, shown as gear 496. In other embodiments, the gear 492 is directly coupled with the gear 496. By way of example, the gear set 490 may not include the gear 494, and the gear 492 may be directly coupled to (e.g., in meshing engagement with, etc.) the gear 496. As shown in FIG. 11, the output coupled clutch 450 is positioned to selectively couple the gear 496 with the output shaft 332 when engaged. With the output coupled clutch 450 disengaged, relative movement (e.g., rotation, etc.) may occur between the gear 496 and the output shaft 332. By way of example, the output coupled clutch 450 may be engaged to couple the ring gear 424 to the output shaft 332. The output brake 470 is positioned to selectively limit the movement of the gear 492 when engaged to thereby also limit the movement of the ring gear 424, the gear 494, and the gear 496.

Figure 12:
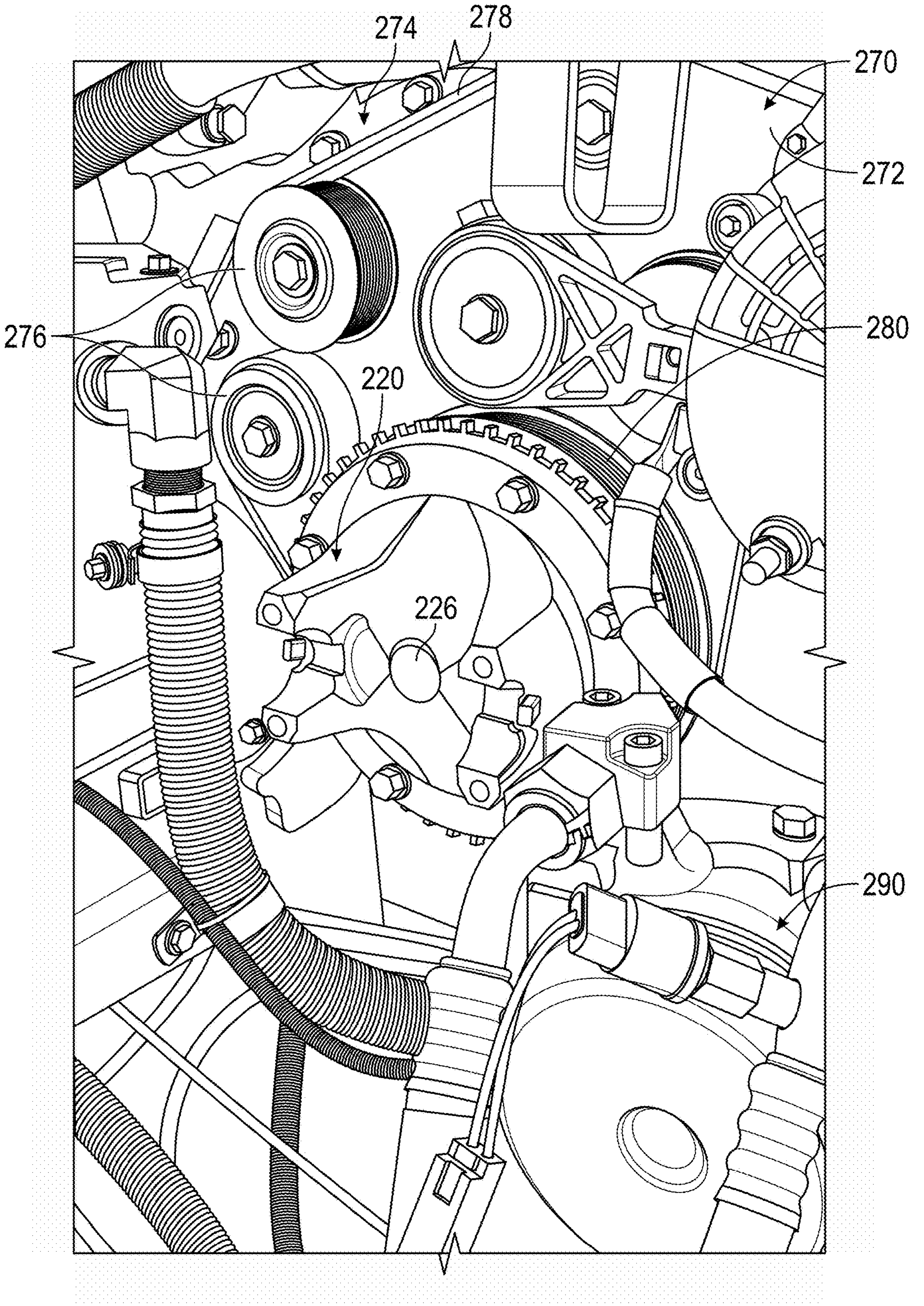
FIGS. 12-15 are various views of an accessory drive of the hybrid powertrain of FIG. 8, according to an exemplary embodiment.
Figure 13:
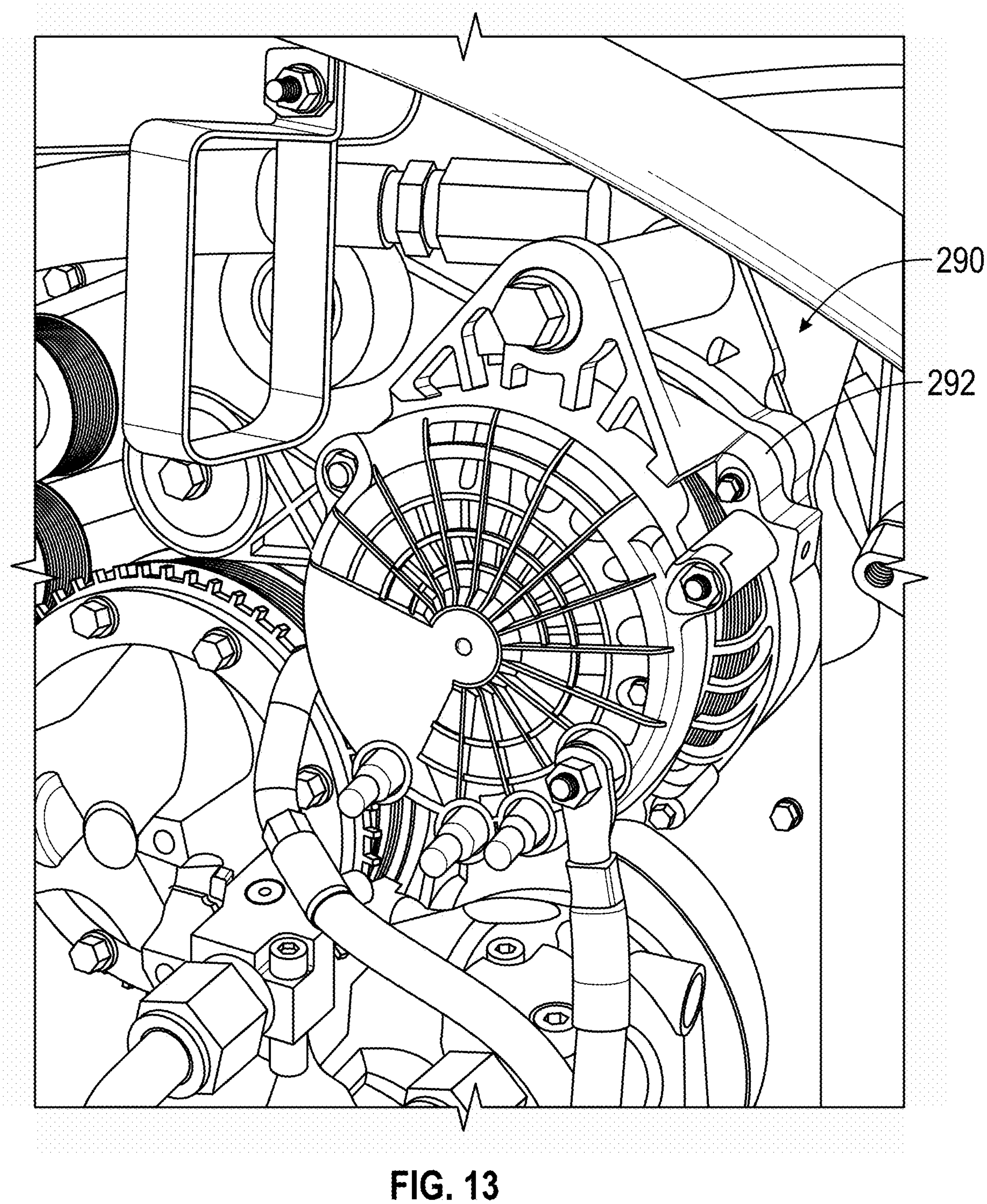
Figure 14:
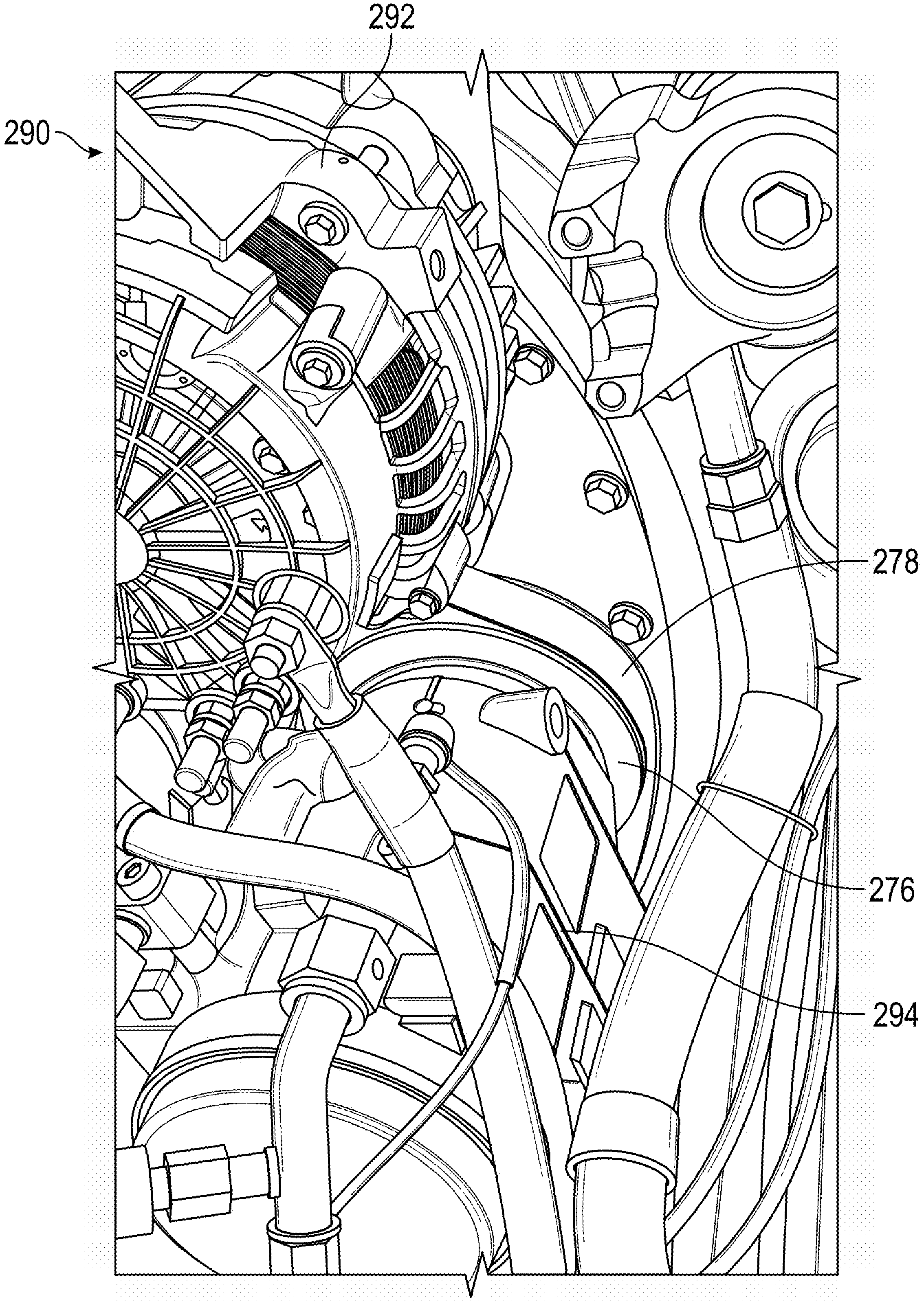
Figure 15:
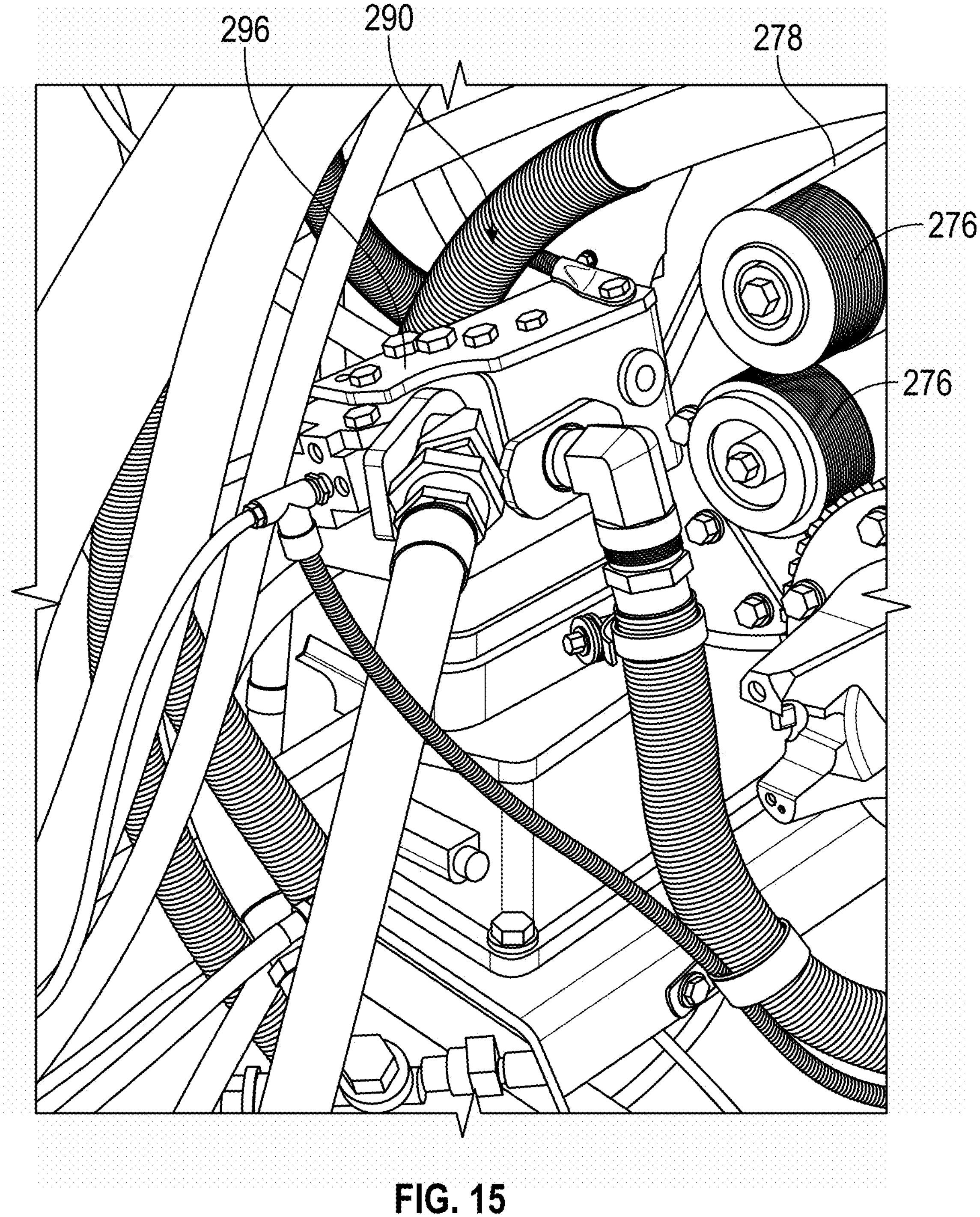

As shown in FIGS. 10 and 12, the accessory drive 270 (e.g., an accessory module) includes a base or frame, shown as accessory base 272, coupled to the power divider 220 (e.g., a housing thereof, etc.) and a pulley assembly, shown as accessory pulley assembly 274, coupled to (e.g., supported by, extending from, etc.) the accessory base 272 and driven by ETD interface 226 of the power divider 220. As shown in FIGS. 10 and 12-15, the accessory pulley assembly 274 includes a plurality of pulleys, shown as accessory pulleys 276, coupled to the accessory base 272; a belt, shown as accessory belt 278; and an input pulley, shown as drive pulley 280, coupled to (i) the ETD interface 226 of the power divider 220 and (ii) the accessory pulleys 276 by the accessory belt 278. Accordingly, the ETD interface 226 is configured (e.g., positioned, etc.) to drive the drive pulley 280 and, thereby, the accessory pulleys 276 to drive various accessories, shown as vehicle accessories 290, of the accessory drive 270. As shown in FIGS. 12-15, the vehicle accessories 290 include a first accessory, shown as alternator 292, a second accessory, shown as air conditioning compressor 294, and a third accessory, shown as chassis air compressor 296. Each of the vehicle accessories 290 is coupled to a respective one of the accessory pulleys 276. In other embodiments, more, fewer, and/or different accessories are included within the accessory drive 270.

According to an exemplary embodiment shown in FIGS. 10 and 12, the accessory drive 270 is arranged in a through-shaft configuration/arrangement where the drive pulley 280 of the accessory pulley assembly 274 is coupled to the ETD interface 226 such that the ETD shaft 230 and the ETD interface 226 extend through the drive pulley 280 (i.e., the drive pulley 280 is positioned around the ETD interface 226 such that the ETD shaft 230 appears to extends through the drive pulley 280). The accessory drive 270 may be driven by the engine 210 or the ETD 240. By way of example, the engine 210 may drive the accessory drive 270 to facilitate operating the vehicle accessories 290 when the ETD clutch 234 is engaged. By way of another example, the ETD 240 may drive the accessory drive 270 to facilitate operating the vehicle accessories 290 when the ETD clutch 234 is disengaged (e.g., the ETD 240 may drive the ETD interface 226 using power stored in the battery pack 260, etc.). In an alternative embodiment, the accessory drive 270 is driven by an independent motor and/or one or more of the accessories themselves are electrically operated/driven.

According to an exemplary embodiment, the hybrid powertrain 200 of the fire fighting vehicle 10 is configured to provide improved performance relative to a traditional, internal combustion engine driven powertrain. Specifically, commercially available ARFF vehicles include internal combustion engine driven powertrains. Such powertrains include large internal combustion engines that are not very eco-friendly and provide an acceleration from 0 to 50 miles-per-hour ("mph") or 80 kilometers-per-hour ("kph") in greater than 30 seconds (e.g., 31 seconds, 33 seconds, etc.). On the other hand, the hybrid powertrain 200 of the present disclosure provides a more eco-friendly powertrain that can provide an acceleration from 0 to 50 mph in less than 30 seconds while using a much smaller internal combustion engine. According to an exemplary embodiment, the fire fighting vehicle 10(*i*) includes an engine that is less than 750 hp (e.g., between 500 hp and 600 hp, approximately 550 hp, approximately 650 hp, approximately 700 hp, between 600 hp and 750 hp, less than 650 hp, less than 600 hp, less than 550 hp, etc.), (ii) includes battery pack with a battery capacity less than 60 kWh (e.g., 28 kWh, between 20 kWh and 40 kWh, between 12 kWh and 60 kWh, etc.), (iii) has a water capacity of at least 1,000 gallons (e.g., between 1,000 and 4,500 gallons; at least 1,250 gallons; between 2,500 gallons and 3,500 gallons; at most 4,500 gallons; at most 3,000 gallons; at most 1,500 gallons; etc.), and (iv) has an agent capacity of at least 150 gallons (e.g., between 150 gallons and 540 gallons, at most 540 gallons, at most 420 gallons, at most 210 gallons, between 350 gallons and 450 gallons, between 150 gallons and 250 gallons, etc.), all while accelerating from 0 to 50 mph in 30 seconds or less (e.g., 28 seconds or less, 25 seconds or less, 22 seconds or less, etc.) with the water and/or agent tanks full. However, it should be understood that, in other embodiments, the specifications of the engine 210, the battery pack 260, the water tank 110, and the agent tank 120 can be any of the specifications disclosed herein.

Control System

Figure 16:
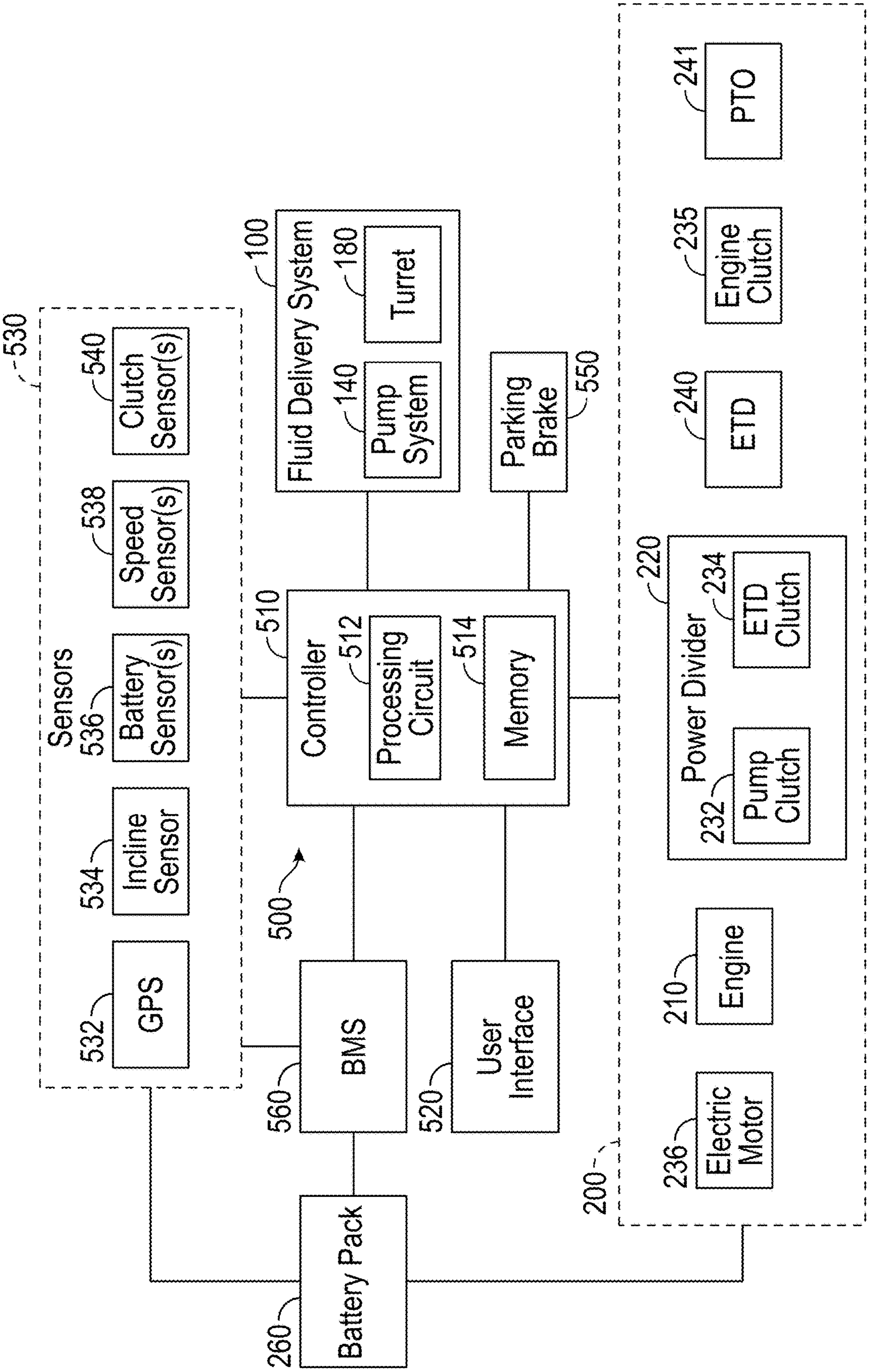
FIG. 16 is schematic diagram of a control system for the fire fighting vehicle of FIG. 1, according to an exemplary embodiment.

According to the exemplary embodiment shown in FIG. 16, a control system 500 for the fire fighting vehicle 10 includes a controller 510. In one embodiment, the controller 510 is configured to selectively engage, selectively disengage, control, or otherwise communicate with components of the fire fighting vehicle 10. As shown in FIG. 16, the controller 510 is coupled to (e.g., communicably coupled to) components of the fluid delivery system 100 (e.g., the pump system 140, the turret 180, etc.), components of the hybrid powertrain 200 (e.g., the engine 210, the power divider 220, the engine clutch 235, electric motor 236, the ETD 240, the PTO 241, etc.), a user input/output device, shown as user interface 520, various sensors, shown as sensors 530, a brake, shown as parking brake 550, and a battery management system ("BMS"), shown as BMS 560. By way of example, the controller 510 may send and receive signals (e.g., control signals) with the components of the fluid delivery system 100, the components of the hybrid powertrain 200, the user interface 520, the sensors 530, the parking brake 550, and/or the BMS 560. As example, the controller 510 may receive data from the BMS 560 regarding the battery pack 260 (e.g., battery pack voltage, etc.) or user inputs from the user interface 520 (e.g., activate pump system 140, open structural discharge 170, etc.), and may send command signals to the engine 210, the power divider 220, and/or the ETD 240 (e.g., engage ETD clutch 234, back-start the engine 210, etc.). As another example, the controller 510 may be configured to selectively control the speed of the engine 210 (e.g., interface with a throttle thereof, etc.) such that an output of engine 210 rotates at a target speed based on the mode of operation the hybrid powertrain 200 (e.g., a rollout mode, a standby mode, a normal mode, an accessory mode, etc.). As still another example, the controller 510 may provide a seamless operator experience. For example, the controller 510 may automatically engage various mode of operation (e.g., a rollout mode, standby mode, etc.) or engage various modes in response to receiving a corresponding user input/command (e.g., from the user interface 520). This seamless experience may ensure that the operator does not have to manually control one or more components (e.g., the pumps, etc.).

The controller 510 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 16, the controller 510 includes a processing circuit 512 and a memory 514. The processing circuit 512 may include an ASIC, one or more FPGAs, a DSP, circuits containing one or more processing components, circuitry for supporting a microprocessor, a group of processing components, or other suitable electronic processing components. In some embodiments, the processing circuit 512 is configured to execute computer code stored in the memory 514 to facilitate the activities described herein. The memory 514 may be any volatile or non-volatile computer-readable storage medium capable of storing data or computer code relating to the activities described herein. According to an exemplary embodiment, the memory 514 includes computer code modules (e.g., executable code, object code, source code, script code, machine code, etc.) configured for execution by the processing circuit 512. The memory 514 includes various actuation profiles corresponding to modes of operation (e.g., for the fluid delivery system 100, for the fire fighting vehicle 10, etc.), according to an exemplary embodiment. In some embodiments, the controller 510 may represent a collection of processing devices (e.g., servers, data centers, etc.). In such cases, the processing circuit 512 represents the collective processors of the devices, and the memory 514 represents the collective storage devices of the devices.

The user interface 520 includes a display and an operator input, according to one embodiment. The display may be configured to display a graphical user interface, an image, an icon, or still other information. In one embodiment, the display includes a graphical user interface configured to provide general information about the vehicle (e.g., vehicle speed, fuel level, warning lights, agent levels, water levels, etc.). The graphical user interface may also be configured to display a current mode of operation, various potential modes of operation, or still other information relating to the fire fighting vehicle 10, the fluid delivery system 100, and/or the hybrid powertrain 200. By way of example, the graphical user interface may be configured to provide specific information regarding the operation of fluid delivery system 100 (e.g., whether the pump clutch 70, the turret 180, the hose reel 190 are engaged or disengaged; whether a first mode of operation or a second mode of operation is engaged; pressure and flow data; etc.).

The operator input may be used by an operator to provide commands to the components of the fluid delivery system 100, the components of the hybrid powertrain 200, the parking brake 550, and/or still other components or systems of the fire fighting vehicle 10. The operator input may include one or more buttons, knobs, touchscreens, switches, levers, joysticks, pedals, or handles. In one embodiment, an operator may press a button and/or otherwise interface with the operator input to change a mode of operation for the fluid delivery system 100 and/or the hybrid powertrain 200. The operator may be able to manually control some or all aspects of the operation of the fluid delivery system 100, the hybrid powertrain 200, and/or other components of the fire fighting vehicle 10 using the display and the operator input. It should be understood that any type of display or input controls may be implemented with the systems and methods described herein.

In some embodiments, controller 510 is configured to generate control signals for the hybrid powertrain 200 to operate the hybrid powertrain 200. For example, the controller 510 may monitor a required horsepower (e.g., a required input power) of the pump system 140, $hp_{req}$ for a particular application. If the required horsepower, $hp_{req}$, is less than a threshold value, $hp_{threshold}$ (i.e., $hp_{req}<hp_{threshold}$) or less than or equal to the threshold value (i.e., $hp_{req}\leq hp_{threshold}$), the controller 510 may generate control signals for the hybrid powertrain 200 so that the ETD 240 drives the pump system 140 (e.g., through the power divider 220 and/or through the PTO 241). If the required horsepower $hp_{req}$ is greater than the threshold value $hp_{threshold}$ (i.e., $hp_{req}>hp_{threshold}$) or greater than or equal to the threshold value (i.e., $hp_{req}\geq$hp threshold), the controller 510 may drive the pump system 140 with the engine 210 and/or the electric motor 236 (e.g., if an electric motor is used in place of the engine 210).

As shown in FIG. 16, the sensors 530 include a global positioning system ("GPS") 532, an incline sensor 534, one or more battery sensors 536, a speed sensor 538, and one or more clutch sensors 540. In some embodiments, the fire fighting vehicle 10 includes additional or different sensors configured to measure or monitor various operational parameters of the hybrid powertrain 200, the fluid delivery system 100, and/or the fire fighting vehicle 10. For example, the sensors 530 may include speed sensors that are configured to measure an angular speed of the engine 210, the pump clutch 232, the ETD clutch 234, and/or various components of the ETD 240, etc. The sensors 530 may be integrated into various systems, subsystems, etc. of the fire fighting vehicle 10. For example, the sensors 530 can be integrated into or communicably coupled with an engine control unit ("ECU") of the fire fighting vehicle 10.

The GPS 532 may be configured to measure and provide the controller 510 with an approximate global location of the fire fighting vehicle 10. For example, the GPS 532 may be configured to measure a latitude and longitude of the fire fighting vehicle 10 and provide the controller 510 with the measured latitude and longitude. The controller 510 may receive the latitude and longitude from the GPS 532 and determine a rate of change of the latitude and/or the longitude to determine a speed of the fire fighting vehicle 10. The controller 510 may be configured to determine a rate of change of the speed of the fire fighting vehicle 10 to determine an acceleration of the fire fighting vehicle 10.

The incline sensor 534 may be any sensor configured to provide an incline of the fire fighting vehicle 10 (e.g., an indication of the grade upon which the fire fighting vehicle 10 is currently traveling, an angle of the fire fighting vehicle 10 relative to the direction of gravity, etc.). By way of example, the incline sensor 534 may be or include an inclinometer or a gyroscopic sensor. Alternatively, the GPS 532 may include the incline sensor 534. By way of example, sensor data from the GPS 532 indicating the current global location of the fire fighting vehicle 10 may be correlated to the incline at various global locations. The controller 510 or the GPS 532 may store data correlating global locations to associated inclines at those locations. Based on the current global location, the current speed and direction of travel (e.g., provided by the speed sensor 326 and/or the GPS 532), and the data correlating global locations to corresponding inclines, the controller 510 may be configured to determine a current incline and/or predict a future incline of the fire fighting vehicle 10 based on sensor data The battery sensors 536 may be or include one or more sensors coupled to the battery pack 260 and the BMS 560. In some embodiments, the battery sensors 536 may include temperature sensors, voltage sensors, current sensors, and other sensors that may be utilized to determine temperature, state-of-health ("SoH"), state-of-charge ("SoC"), and/or other metrics that affect the health and performance of the battery pack 260. For example, the battery sensors 536 may provide real-time measurements of voltage and/or current sourced or discharged by one or more cells of the battery pack 260, and real-time measurements of individual cell temperatures for each cell of the battery pack 260.

The speed sensor 538 may be any sensor that is configured to measure a velocity of the fire fighting vehicle 10. For example, the speed sensor 538 may be positioned at the front wheels 14 and/or the rear wheels 16 of the fire fighting vehicle 10. The clutch sensors 540 may be configured to (i) monitor a status (e.g., engaged, dis-engaged, etc.) of the pump clutch 232 and/or the ETD clutch 234 and (ii) provide the status of the pump clutch 232 and/or the ETD clutch 234 to the controller 510. It should be understood that the controller 510 can be communicably coupled with the ECU and/or a transmission control unit ("TCU") of the fire fighting vehicle 10 and may receive any of the information or data of any of the systems, subsystems, control units, etc. of the fire fighting vehicle 10.

The BMS 560 may control charging and discharging of the battery pack 260 by monitoring metrics such as battery temperature, SoH, SoC, etc. to maximize the health and longevity of the battery pack 260 and maintain adequate charge within the battery pack 260. Additionally, the BMS 560 may act to balance the charging and discharging of each of the cells of the battery pack 260. The BMS 560 generally operates by receiving and analyzing sensor data from the battery sensors 536 and sending control data to the controller 510 based on the analyzed data. For example, the BMS 560 may analyze data from the battery sensors 536 to determine the current SoC of the battery pack 260. If the SoC of the battery pack 260 is below a predetermined threshold, as described below with respect to FIG. 17, the BMS 560 may send data to the controller 510, indicating that the battery pack 260 needs to be charged. As mentioned above, SoC is generally a measure of the charge level of a battery, often expressed as a percentage of maximum charge. SoH is generally a measure of the remaining capacity of a battery, often expressed as a percentage of the original capacity of a battery.

In some embodiments, the BMS 560 may incorporate measurements or known values of internal resistance, capacity, age, number of charge-discharge cycles, etc. of the battery pack 260, in addition to temperature, voltage, and current measurements, and apply the data to one or more analytical methods such as current integration, Kalman filtering, known discharge curves, etc. to determine SoH and SoC of the battery pack 260. In some embodiments, the BMS 560 may monitor charge cycling (i.e., charge-discharge cycles) to determine the SoH of the battery pack 260 and to allow the controller 510 to limit the quantity of charge cycles and depth-of-discharge ("DoD") or SoC for each cycle, as further discussed below.

In some embodiments, the BMS 560 may account for battery degradation when analyzing sensor data. For example, the BMS 560 may incorporate any of the data discussed above (e.g., internal resistance, age, number of charge cycles, etc.) when determining the SoH or SoC of the battery pack 260. It is known that battery degradation affects the SoH and SoC of a battery by reducing the SoH of the battery and by limiting the maximum SoC of a battery. For example, a battery that has experienced only 10 charge cycles may reach 99% SoC with respect to a new battery, while a battery that has experienced 1,000 charge cycles may only reach 92% SoC with respect to a new battery. In some embodiments, the controller 510 may adapt control decisions in response to battery degradation, as determined by the BMS 560 and further discussed below.

Energy Management

As a general overview, the controller 510 may be configured to manage SoC, SoH, and temperature of the battery pack 260. As an example, the controller 510 may be configured to (i) prevent charging the battery pack above a maximum SoC threshold (e.g., maintain SoC at less than 100%), (ii) limit DoD during discharge events (e.g., above 50% when possible), and (iii) limit battery temperature to prevent degradation of the SoH of the battery pack. As another example, the controller 510 may be configured to control the engine 210, the ETD 240, and the battery pack 260 to consistently provide a SoC of the battery pack 260 that facilitates operating the fire fighting vehicle 10 at maximum acceleration (e.g., 0-50 mph in under 30 seconds) and top speed for a designated period of time (e.g., three minutes). As still another example, the controller 510 may be configured to adapt the control scheme as the SoH of the battery pack degrades. For example, the controller 510 may be configured to reduce the maximum SoC threshold as the battery pack 260 degrades or allow for increased DoD so that the SoC can be further depleted during operation as the battery pack 260 degrades.

Figure 17:
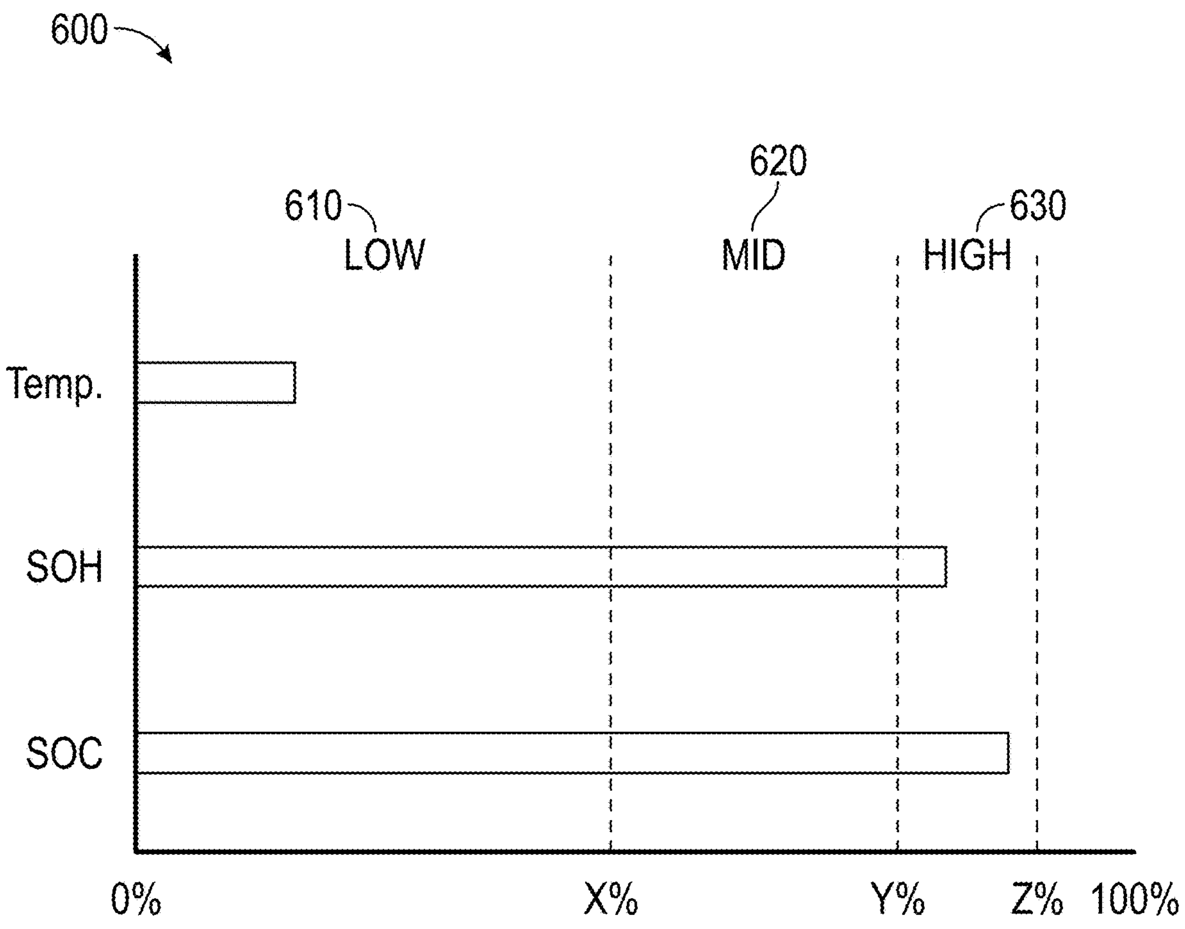
FIG. 17 is a graph presenting example temperature, state-of-health, and state-of-charge values, according to an exemplary embodiment.

Referring now to FIG. 17, a graph 600 presenting example temperature, SoH, and SoC values is shown, according to some embodiments. As discussed above, temperature, SoH, and SoC are metrics that the BMS 560 may calculate and/or analyze based on data from the battery sensors 536 to monitor the health and maintain the performance of the battery pack 260. Graph 600 is shown to include three operating zones, zone 610 ("LOW"), zone 620 ("MID"), and zone 630 ("HIGH"). Graph 600 is also shown to include three variables, X, Y, and Z, which may generally be defined as threshold values. Zone 610 is shown to include values between 0% and X %, where X % may be a value that defines an upper limit of zone 610 (e.g., 50%). Zone 620 is shown to include values between X % and Y %, where X % may be a value that defines a lower limit of zone 620 and Y % may be a value that defines an upper limit of zone 620 (e.g., 50% to 80%). Similarly, zone 630 is shown to include values between Y % and Z %, where Y % may be a value that defines a lower limit of zone 630 and Z % may be a value that defines an upper limit of zone 630 (e.g., 80% to 90%). In some embodiments, Z may be equal to 100% (e.g., 100% SoC, 100% SoH), although it may be beneficial to set Z to a lower value (e.g., 90% SoC) for at least the reasons described below.

In some embodiments, the initial values of X, Y, and Z may be set by a manufacturer of the battery pack 260 based on the battery pack 260 construction, attributes, and/or test data. In some embodiments, the initial values of X, Y, and Z may be set by a manufacturer of the fire fighting vehicle 10 based on similar or other data. In some embodiments, the threshold values (e.g., X, Y, and Z) may be dynamic, such that controller 510 may determine threshold values based on the SoH or other properties of the battery pack 260. For example, as the SoH of the battery pack 260 decreases (i.e., as the batteries degrade) over time, the controller 510 may adjust the SoC threshold values, represented by X, Y, and Z with regards to FIG. 17, to ensure that the performance of the fire fighting vehicle 10 is preserved as the battery pack 260 ages. More generally, as the battery pack 260 ages, the controller 510 may raise or lower the threshold values for at least one of X, Y, or Z to compensate. In some embodiments, the threshold values of X, Y, and Z may be adjusted by the controller 510 for other reasons. For example, the controller 510 may raise or lower the value of X, Y, and Z based on operating conditions (e.g., severe service conditions, high external temperatures, etc.) or based on the charge and discharge rates of the battery pack 260.

For at least those reasons described above, and further described below, the ability of the controller 510 to adjust threshold values based at least on the SoH of the battery pack 260, operating conditions, and/or charge/discharge rates may be advantageous in ensuring that the fire fighting vehicle 10 maintains operational readiness at all times. By adjusting threshold values, the controller 510 can ensure that the battery pack 260, even with age, can provide adequate energy for normal and emergency operations. This allows the fire fighting vehicle 10 to maintain response capabilities (e.g., response times, 0-50 mph times, operational modes, etc.) for the lifetime of the fire fighting vehicle 10. Additionally, this may reduce the need for replacement of the battery pack 260 due to age within the lifetime of the fire fighting vehicle 10.

As shown in FIG. 17, graph 600 includes an example temperature ("Temp.") value, shown within zone 610. The temperature value may represent the temperature as a percentage of a maximum operating temperature of the battery pack 260. For example, the temperature value may represent a battery temperature of 20% indicating that the battery pack 260 is at 20% of its maximum operating temperature. In some embodiments, it may be beneficial to maintain battery temperatures within zone 610, with respect to graph 600, as higher battery temperatures may lead to battery degradation, reducing the effective lifetime (i.e., reducing the SoH) of the battery pack 260. In some embodiments, it may also be beneficial to maintain battery temperatures above a threshold, such as in zone 620, to avoid decreased battery performance due to cold temperatures.

As shown in FIG. 17, graph 600 includes an example SoH value, shown within zone 630. The SoH value may represent the SoH of the battery pack 260. In some embodiments, it may be beneficial to monitor the SoH of the battery pack 260, as the battery pack 260 may become ineffective below a threshold value. For example, a healthy battery pack may have a SoH value within zone 630, while an old (i.e., approaching end-of-life ("EoL")), worn, or otherwise defective battery pack may have a SoH value within zone 620 or zone 610. In some instances, it may be beneficial to replace an old, worn, or otherwise defective battery pack to maintain operational readiness of the fire fighting vehicle 10.

Also shown in FIG. 17, graph 600 includes an example SoC value, shown within zone 630. The SoC value may represent the SoC of the battery pack 260. In some embodiments, it may be beneficial to monitor the SoC of the battery pack 260 to ensure that the battery pack 260 maintains adequate charge for normal or emergency operations of the fire fighting vehicle 10. For example, if the SoC of the battery pack 260 falls below a certain threshold (e.g., the SoC is within zone 610), the battery pack 260 may not have enough charge to meet the performance demands of the fire fighting vehicle 10 (e.g., providing energy to the ETD 240 to drive the front axle 252 and/or the rear axle 254, back-start the engine 210, drive the accessory drive 270, etc.). Additionally, monitoring the SoC of the battery pack 260 may allow the controller 510 to prevent charge cycling from fully charged to fully depleted, or to prevent the battery from being charged to 100% capacity, as both increased charge cycling and high SoC (e.g., at or near 100%) may increase battery degradation.

It may be desirable to maintain a SoC within the battery pack 260 such that the SoC of the battery pack 260 falls within zone 630, with respect to FIG. 17. As described above, zone 630 may include a lower limit and an upper limit, represented by Y % and Z % on graph 600. In some embodiments, Y % may be the lower limit of the desired SoC for the battery pack 260 (e.g., 80%). For example, the BMS 560 may facilitate charging of the battery pack 260 if the SoC of the battery pack 260 falls below or approaches Y %. In some embodiments, Z % may be the upper limit of the desired SoC for the battery pack 260 (e.g., 90%). While the upper limit of the SoC may be 100%, in some embodiments it may be desirable for the upper limit of the SoC to be lower. By preventing the SoC of the battery pack 260 from exceeding a threshold value that is below 100% SoC, the risk of overcharging the battery pack 260 is reduced. Additionally, charging the battery pack 260 to an upper threshold below 100% may increase battery life (i.e., maintain SoH), as charge cycling to and from 100% SoC is shown to significantly reduce the effective lifetime of a battery.

As described above and with respect to FIGS. 16 and 17, the controller 510 is configured to selectively engage, selectively disengage, control, or otherwise communicate with the engine 210, the power divider 220, the ETD 240, the user interface 520, and the BMS 560. According to an exemplary embodiment, the controller 510 may communicate with the BMS 560 by receiving data related to charging and discharging the battery pack 260. For example, the controller 510 may receive data from the BMS 560 indicating that the battery pack 260 is below a threshold voltage or SoC, as described above. The controller 510 may then control the power divider 220 and the ETD 240 to charge the battery pack 260, such as by engaging the ETD clutch 234 to provide engine power to the ETD 240, and engaging one or more brakes and/or clutches within the ETD 240 to cause at least one of the electromagnetic devices of the ETD 240 to generate electricity.

As further described below, by monitoring battery charge levels and controlling charge cycling, the controller 510 and the BMS 560 may ensure that the battery pack 260 maintains an adequate amount of charge to allow for full response of the fire fighting vehicle 10 at any moment. Additionally, it is known that charge cycling, deep discharge events, and/or charging a battery to near 100% capacity can lead to increased battery degradation, as discussed above. Monitoring and controlling the quantity of charge cycles, as well as the DoD and SoC of the battery pack 260, may reduce battery degradation, thereby extending the effective lifetime of the battery pack 260.

In some embodiments, the controller 510 is configured to determine that the temperature of the battery pack 260 is outside of a desired operating range (e.g., outside of zone 610). For example, the controller 510 may determine that the temperature of the battery pack 260 is currently 75% of the maximum operating temperature, based on data from the BMS 560, which falls outside of the desired operating range. In such embodiments, the controller 510 may limit battery charge cycling in an effort to reduce the temperature of the battery pack 260. For example, the controller 510 may limit the ETD 240 to operating modes that do not charge the battery pack 260, as charging increases battery temperature.

In another example, the controller 510 may limit the ETD 240 to operating modes that do not draw energy from the battery pack 260, or to operating modes that limit the amount of energy sourced from the battery pack 260. In some embodiments, the battery pack 260 or the BMS 560 may include fans that are operable to cool the battery pack 260. The controller 510 may activate such fans in an effort to further reduce battery temperatures and maintain operational readiness.

In some embodiments, the controller 510 is configured to determine that the SoC of the battery pack 260 is within an ideal range (e.g., "HIGH," zone 630, above threshold value Y). For example, the controller 510 may determine that the SoC of the battery pack 260 is currently 88% based on data from the BMS 560, which falls into a predetermined "ideal" or "high" range (e.g., from 80%-90%). When the SoC of the battery pack 260 is within an ideal range, the controller 510 may determine that the battery pack 260 is capable of providing adequate energy and performance in a plurality of operating modes. The controller 510 may then control or communicate with the engine 210, the power divider 220, and/or the ETD 240 to maximize performance of the fire fighting vehicle 10. For example, a sufficiently charged battery such as the battery pack 260 may allow the ETD 240 to operate such that one or both of the electromagnetic devices utilize energy from the battery pack 260 to perform operations such as back-starting the engine 210, driving the accessory drive 270, driving the front axle 252 and/or the rear axle(s) 254, etc. as described in greater detail herein. In another example, the controller 510 may communicate with or control the power divider 220 to engage the ETD clutch 234 so that the ETD 240 operate in unison with the engine 210 to provide hybrid power for driving the fire fighting vehicle 10.

In some embodiments, the controller 510 may determine that the SoC of the battery pack 260 is within an adequate operating range (e.g., "MID", zone 620, between threshold values X and Y). For example, the controller 510 may determine that the SoC of the battery pack 260 is currently 65% based on data from the BMS 560, which falls into a predetermined operating range (e.g., from 50%-80%). When the SoC of the battery pack 260 is within such a range, the controller 510 may determine that the battery pack 260 is capable of providing adequate energy and performance in a plurality of operating modes, however, the controller 510 may prioritize operations within modes that charge the battery pack 260. The controller 510 may then control or communicate with the engine 210, the power divider 220, and/or the ETD 240 to allow increased performance of the fire fighting vehicle 10 while providing energy to the battery pack 260. For example, a partially discharged battery, such as battery pack 260, may allow the ETD 240 to operate in any of the modes described above for a limited amount of time. The controller 510 may prioritize charging of the battery pack 260 by controlling the ETD 240 to operate in modes such that one or both of the electromagnetic devices of the ETD 240 are driven by the engine 210 to generate electricity.

In some embodiments, additional energy is required from the battery pack 260 when in a less than ideal SoC range, or charging the battery pack 260 is not feasible, such as when responding to an emergency situation. For example, when responding to an emergency, the fire fighting vehicle 10 may require immediate acceleration provided by the hybrid powertrain 200. In such embodiments, the controller 510 may limit the charging of the battery pack 260 to increase performance of the fire fighting vehicle 10. In some embodiments, the controller 510 may allow the battery pack 260 to reach a lower threshold of the operating zone (e.g., 50%, threshold value X) in severe or emergency operations, before requiring charging of the battery pack 260. In this regard, the controller 510 may prioritize performance over charging of the battery pack 260 in order to provide the range and operating speeds required for the fire fighting vehicle 10. As described above, the controller 510 may also adjust one or more threshold values based on age of the battery pack 260, operating conditions, charge/discharge rates, etc. to maintain performance of the fire fighting vehicle 10.

In some embodiments, the controller 510 is configured to determine that the SoC of the battery pack 260 is outside of an adequate operating range (e.g., "LOW", zone 610, below threshold value X). For example, the controller 510 may determine that the SoC of the battery pack 260 is currently 45% based on data from the BMS 560, which falls outside of an operating range (e.g., below a 50% lower limit of an operating zone). When the SoC of the battery pack 260 is within a low range, or outside the operating range, the controller 510 may determine that the battery pack 260 is no longer capable of providing adequate energy and performance. The controller 510 may then control or communicate with the engine 210, the power divider 220, and/or the ETD 240 to limit operating modes to modes that provide energy to the battery pack 260. For example, a discharged battery, such as the battery pack 260, may not provide enough energy to achieve immediate acceleration of the fire fighting vehicle 10, or may not provide adequate range. The controller 510 may then charge the battery pack 260 by controlling the ETD 240 to operate in modes such that one or both of the electromagnetic devices of the ETD 240 are driven by the engine 210 to generate electricity.

Operational Modes

As a general overview, the controller 510 is configured to operate the hybrid powertrain 200 in various operational modes. In some embodiments, the controller 510 generates the control signals for the various components of the hybrid powertrain 200 to transition the hybrid powertrain 200 between the various operational modes in response to receiving a user input, a command, a request, etc. from the user interface 520. In some embodiments, the controller 510 is configured to additionally or alternatively analyze sensor data received from one or more of the sensors 530 and transition the hybrid powertrain 200 between the various operational modes based on the sensor data. The various operational modes of the hybrid powertrain 200 may include a hybrid mode, a standby/accessory-drive mode, a rollout/all-electric-drive mode, an ultra-low mode, a pump-and-roll mode, and/or still other modes.

Standby Mode

The controller 510 may be configured to transition the fire fighting vehicle 10 into a standby mode of operation. The standby mode may include de-coupling the engine 210 from the accessory drive 270 so that the engine 210 can be shutdown. The accessory drive 270 can be run using energy received from the battery pack 260, without requiring an input from the engine 210 (e.g., mechanical energy input, drive input, etc.). The accessory drive 270 may be driven so that the various vehicle accessories 290 can be driven (e.g., an HVAC system of the fire fighting vehicle 10, warning lights, radios, etc.) without requiring operation of the engine 210. Advantageously, this can improve the efficiency of the fire fighting vehicle 10, while reducing emissions that may be produced by operation of the engine 210.

The controller 510 may transition the hybrid powertrain 200 into the standby mode in response to receiving a user or operator input from the user interface 520. In some embodiments, the controller 510 transitions the hybrid powertrain 200 into the standby mode automatically. For example, if the controller 510 determines, based on the sensor data, that the fire fighting vehicle 10 has been stationary for a predetermined amount of time, the controller 510 may automatically transition the hybrid powertrain 200 into the standby mode. In some embodiments, the controller 510 is selectively actuatable between the automatic and the manual mode. For example, the controller 510 can receive a user input from the user interface 520 that the hybrid powertrain 200 should be automatically transitioned between other modes of operation and the standby mode. When the controller 510 is in the automatic mode, the controller 510 automatically transitions the hybrid powertrain 200 into the standby mode without requiring user inputs (e.g., in response to the fire fighting vehicle 10 being stationary for some amount of time). When the controller 510 is in the manual mode, the controller 510 only transitions the hybrid powertrain 200 into the standby mode in response to receiving a user input from the user interface 520.

When transitioning the fire fighting vehicle 10 and/or the hybrid powertrain 200 into the standby mode, the controller 510 may first operate a parking brake 550 of the fire fighting vehicle 10 to transition the parking brake 550 into an engaged state. In some embodiments, the parking brake 550 is operated manually by a user and the controller 510 receives a brake status from parking brake 550. In some embodiments, the controller 510 operates a display device (e.g., a light, a speaker, a display screen, etc.) to prompt the user to set the parking brake 550. The controller 510 may monitor the brake status of the parking brake 550 to ensure that the parking brake 550 is set (e.g., transitioned into the engaged state) before proceeding. The parking brake 550 can be selectively actuated between the engaged state and a disengaged state. The controller 510 may then check the SOC of the battery pack 260. In some embodiments, the controller 510 only transitions into the standby mode in response to a sufficient amount of electrical energy remaining in or being present in the battery pack 260. The controller 510 can perform a process to determine the SOC of the battery pack 260.

In response to the SOC of the battery pack 260 being sufficient to transition into the standby mode, the controller 510 may generate control signals for the engine 210 to transition the engine 210 into an off-state or a standby state. In some embodiments, the controller 510 transitions the engine 210 completely into the off-state or the standby state so that the engine 210 is not running. The controller 510 can generate shut-off or shut-down control signals for the engine 210 and provide the shut-off control signals to the engine 210.

The controller 510 may also generate control signals for the ETD clutch 234 of the power divider 220 to de-couple the engine 210 from the accessory drive 270. The controller 510 may then generate control signals for the ETD 240 to draw power from the battery pack 260 to operate or drive the accessory drive 270. In this way, the controller 510 can de-couple and shut down the engine 210 from the accessory drive 270 so that the ETD 240 drives the accessory drive 270 without requiring input from the engine 210. Advantageously, this reduces fuel consumption, improves efficiency, and reduces emissions of the fire fighting vehicle 10.

In the standby mode, the controller 510 may also generate control signals for the pump clutch 232 to couple or decouple the pump system 140 from the engine 210. In some embodiments, the pump system 140 may be able to be driven by the ETD 240.

The controller 510 may transition the hybrid powertrain 200 and/or the fire fighting vehicle 10 into the standby mode at an end of a runway or a desired destination. For example, when the fire fighting vehicle 10 reaches the end of the runway or the desired destination, and the engine 210 is not required (e.g., to drive the pump system 140), the controller 510 can automatically or manually transition into the hybrid powertrain 200 and/or the fire fighting vehicle 10 into the standby mode to conserve fuel consumption. Advantageously, the fire fighting vehicle 10 can still drive the accessory drive 270 to thereby provide the functionality of the vehicle accessories 290.

Figure 19:
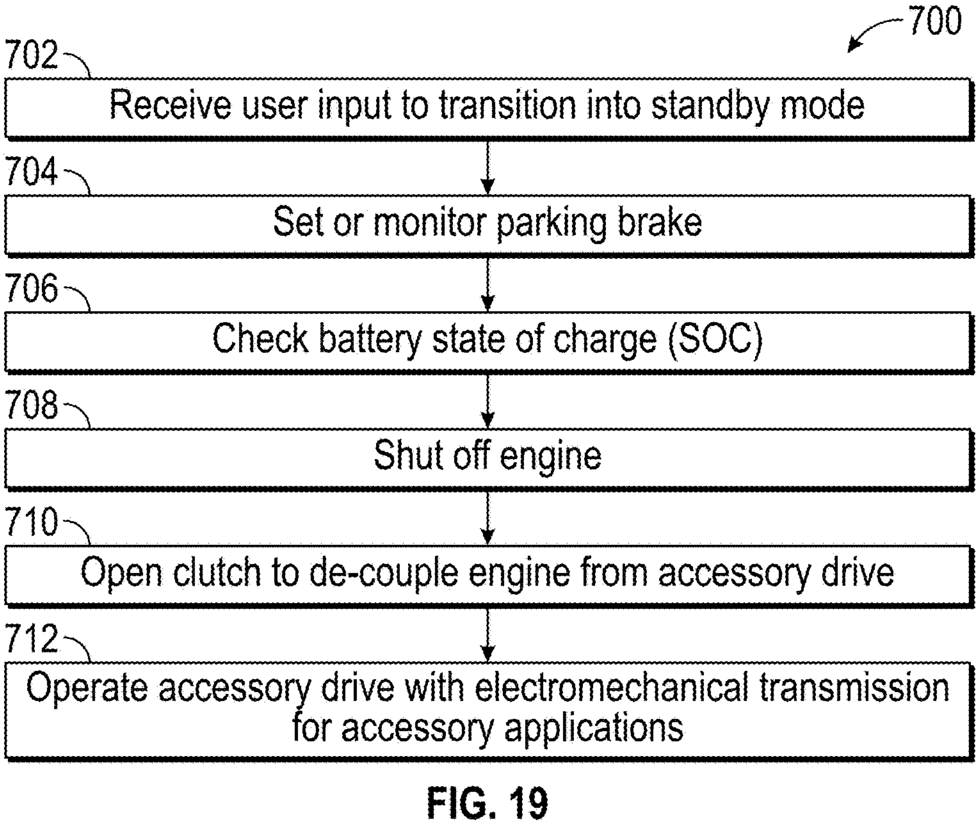
FIG. 19 is a flow diagram of a method for transitioning the hybrid powertrain of FIG. 8 and the fire fighting vehicle of FIG. 1 into and according to a standby mode of operation, according to an exemplary embodiment.

Referring now to FIG. 19, a method 700 for transitioning a fire fighting vehicle (e.g., the fire fighting vehicle 10) and/or a powertrain (e.g., the hybrid powertrain 200) into a standby mode is shown, according to some embodiments. Method 700 include steps 702-712 and can be performed by controller 510.

Method 700 includes receiving a user input to transition the fire fighting vehicle and/or the powertrain into a standby mode (step 702), according to some embodiments. In some embodiments, step 702 includes receiving the user input from a user interface (e.g., the user interface 520) or from any other user interface, human machine interface, etc. of the fire fighting vehicle that is communicably coupled with controller 510. Step 702 can initiate the transition into the standby mode. In other embodiments, the transition into the standby mode is initiated automatically (e.g., in response to the controller 510 determining that the fire fighting vehicle has been stationary for a predetermined amount of time, at a certain location for a predetermined amount of time, etc.).

Method 700 includes setting a parking brake (e.g., the parking brake 550) of the fire fighting vehicle 10 or monitoring the parking brake (step 704), according to some embodiments. The parking brake can be activated so that the fire fighting vehicle does not roll or otherwise move while in the standby mode. In some embodiments, the parking brake is transitionable between an engaged state and a disengaged state. The parking brake can be set (e.g., transitioned into the engaged state) by the controller 510 or by a user. If the parking brake is set by the user, the controller 510 may monitor a status of the parking brake and wait until the parking brake is set before proceeding to the next step. In some embodiments, step 704 is omitted.

Method 700 includes checking the SOC of a battery pack (e.g., the battery pack 260) (step 706), according to some embodiments. Step 706 can be performed by the controller 510 using a SOC process. The controller 510 can check the SOC of the battery pack, a remaining amount of charge or electrical energy in the battery pack, a voltage of the battery pack, a temperature of the battery pack, etc. The controller 510 may use the SOC of the battery pack to determine if the battery pack can sufficiently provide electrical power for the standby mode.

Method 700 includes shutting off an engine (e.g., the engine 210) of the powertrain (step 708), according to some embodiments. Step 708 can be performed by the controller 510 by generating control signals to shut down the engine and providing the control signals to the engine. Step 708 may be performed by the controller 510 concurrently with step 710 as described in greater detail below.

Method 700 includes opening a clutch (e.g., the ETD clutch 234) to de-couple the engine from an accessory drive (e.g., the accessory drive 270) (step 710), according to some embodiments. In some embodiments, step 710 includes generating and providing control signals to the clutch to de-couple the engine from the accessory drive. Step 710 can be performed by the controller 510 and may be performed prior to, or concurrently with step 708.

Method 700 includes operating the accessory drive with an electromechanical transmission (e.g., the ETD 240) for accessory applications (step 712), according to some embodiments. Step 712 can be performed by the controller 510 and the electromechanical transmission. For example, the electromechanical transmission may draw power from battery pack to drive the accessory drive, thereby driving vehicle accessories (e.g., the vehicle accessories 290) coupled to the accessory drive.

Rollout Mode

The controller 510 may be configured to transition the hybrid powertrain 200 and/or the fire fighting vehicle 10 into a rollout mode. The rollout mode may include several sub-modes between which the controller 510 transitions the hybrid powertrain 200 and/or the fire fighting vehicle 10 during operation. The rollout mode may improve the transport speed of the fire fighting vehicle 10 to a destination (e.g., the end of a runway, a plane crash site, a fire, etc.) and reduce emissions of the fire fighting vehicle 10.

When in the rollout mode, the controller 510 may generate control signals for the ETD clutch 234 to de-couple the engine 210 from the ETD 240. The controller 510 may then generate control signals for the ETD 240 and the battery pack 260 so that the ETD 240 draws electrical power from the battery pack 260 to drive the front axle 252 and/or the rear axle 254. The ETD 240 may, therefore, be used to drive the front axle 252 and/or the rear axle 254 without requiring input from the engine 210. In some embodiments, the controller 510 initially de-couples the engine 210 from the ETD 240 (by disengaging the ETD clutch 234) prior to start-up or ignition of the engine 210. Once a predetermined condition is met (e.g., after the fire fighting vehicle 10 has travelled a predetermined distance or is outside of a geofence, reached a certain speed, reached a certain location, been driven for a period of time, etc.), the controller 510 may start the engine 210 and engage the ETD clutch 234 so that the engine 210 may provide an input to the ETD 240. In some embodiments, the engine 210 is started in response to the controller 510 receiving a command from the user interface 520. The engine 210 may be started by the ETD 240 (e.g., by engaging the ETD clutch 234), or by a separate starter that is configured to start the engine 210. The controller 510 may generate control signals for (i) the ETD 240 and/or the ETD clutch 234 and/or (ii) the separate starter to start up the engine 210.

The controller 510 may, therefore, operate the ETD 240 and/or the ETD clutch 234 so that the fire fighting vehicle 10 can begin transportation (e.g., leaving a fire station, a hanger, etc.) to a desired location (e.g., the end of the runway, a plane crash site, a fire, etc.) without requiring operation of the engine 210. Once the fire fighting vehicle 10 has been transported or has travelled a certain distance or outside of a geofence, has reached a certain speed, is in a certain location (e.g., a certain location along the runway, a certain distance from the fire station/hanger, etc.), been driven for a period of time, the controller 510 may start the engine 210 so that the engine 210 can be used to provide a mechanical input to the ETD 240. The controller 510 may also start the engine 210 in response to receiving a user input from the user interface 520. After the engine 210 has been started (or before, if the ETD 240 is used to start the engine 210), the controller 510 can engage the ETD clutch 234 so that the engine 210 can provide a mechanical input to the ETD 240.

Advantageously, the rollout mode facilitates improved transportation speed, particularly when the fire fighting vehicle 10 initially leaves a location (e.g., a fire house, a hanger, etc.) to travel to a destination (e.g., the end of the runway, a plane crash site, a fire, etc.). The rollout mode may also facilitate preventing combustion emissions from filling the fire station or hanger upon startup and takeoff. For example, when in the rollout mode, the fire fighting vehicle 10 may begin transportation to the destination without requiring startup of the engine 210. This can improve a response time (e.g., an amount of time for the fire fighting vehicle 10 to leave its initial location and travel to a destination) and combustion emission output for the fire fighting vehicle 10. The engine 210 can then be started after the fire fighting vehicle 10 has already begun transportation to the destination.

Figure 20:
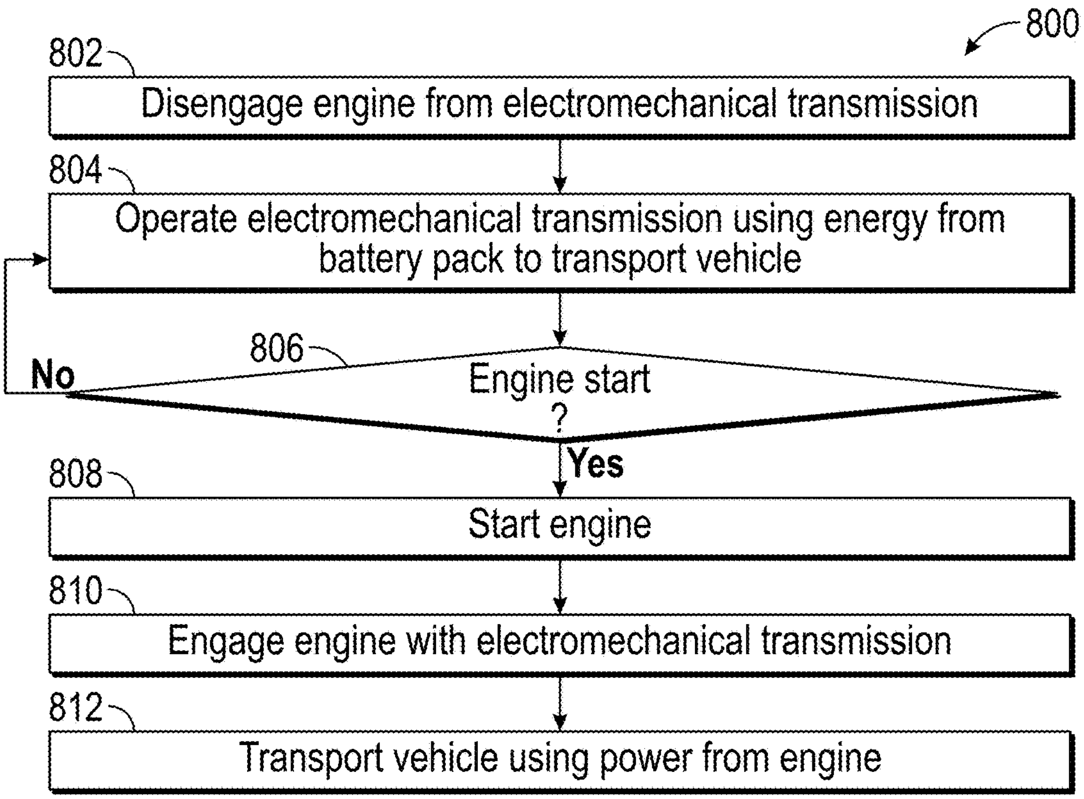
FIG. 20 is a flow diagram of a method for transitioning the hybrid powertrain of FIG. 8 and the fire fighting vehicle of FIG. 1 into and according to a rollout mode of operation, according to an exemplary embodiment.

Referring to FIG. 20, a method 800 for transitioning a fire fighting vehicle (e.g., the fire fighting vehicle 10) and/or a powertrain (e.g., the hybrid powertrain 200) into a rollout mode is shown, according to some embodiments. The rollout mode may include various sub-modes between which the powertrain and/or the fire fighting vehicle are transitioned during the rollout mode. Method 800 can include steps 802-812 and may be performed by the controller 510. The controller 510 may perform steps 802-812 when the fire fighting vehicle initially leaves a storage location (e.g., a hanger, a fire station, etc.).

Method 800 includes disengaging an engine (e.g., the engine 210) from an electromechanical transmission (e.g., the ETD 240) (step 802), according to some embodiments. Step 802 can be performed by the controller 510 and may include providing control signals to a clutch (e.g., the ETD clutch 234) to disengage or de-couple the electromechanical transmission from the engine. In some embodiments, step 802 is only performed if the electromechanical transmission is currently engaged or coupled with the engine. The electromechanical transmission may be dis-engaged or de-coupled from the engine so that the electromechanical transmission can independently drive a front axle and/or a rear axle of the fire fighting vehicle without requiring input from the engine.

Method 800 includes operating the electromechanical transmission using energy from a battery pack (e.g., the battery pack 260) to transport/propel the fire fighting vehicle (step 804), according to some embodiments. Step 804 can include drawing power from the battery pack with the electromechanical transmission and using the electrical power to drive the front axle and/or the rear axle. Step 804 can be performed by controller 510, electromechanical transmission, and the battery pack. Advantageously, step 804 can be performed without requiring operation of or mechanical input from the engine. Step 804 can be performed to transport the fire fighting vehicle when initially leaving a storage location, a hanger, a first location, etc.

Method 800 includes determining if the engine should be started (step 806), according to some embodiments. Step 806 may be performed by controller 510 based on data received from sensors (e.g., the sensors 530) and/or a user input received from a user interface (e.g., the user interface 520). In some embodiments, the controller 510 determines that the engine should be started in response to determining a predetermined condition has been met (e.g., determining that the fire fighting vehicle has achieved a predetermined speed, travelled a predetermined distance or outside of a geofence, been driven by using only electricity from the battery pack for a predetermined amount of time, reached a certain location, etc.). In other embodiments, controller 510 determines that the engine should be started in response to receiving a user input or an operator command to start the engine.

In response to determining that the engine 210 should be started (step 806, "YES"), method 800 proceeds to step 808. In response to determining that the engine 210 should not yet be started (step 806, "NO"), method 800 returns to step 804 and continues transporting the fire fighting vehicle using the power drawn from the battery pack.

Method 800 includes starting the engine (step 808), according to some embodiments. Step 808 can be performed by the electromechanical transmission or with a separate starter designated for the engine. As an example, the controller 510 may be configured to start the engine by engaging the clutch to couple the engine to the electromechanical transmission and back-starting the engine with the electromechanical transmission. As another example, the controller 510 may be configured to start the engine by operating the separate starter. The separate starter may receive electrical power from the battery pack or from other on-vehicle electrical energy storage.

Method 800 includes engaging the engine with the electromechanical transmission (step 810), according to some embodiments. Step 810 can be performed by the controller 510. The controller 510 may generate control signals for the clutch to couple the engine with the electromechanical transmission. Step 810 may be performed in response to step 808. Alternatively, step 810 may be performed prior to step 808 (e.g., step 810 is performed in order to start the engine with the electromechanical transmission as described above).

Method 800 includes transporting the fire fighting vehicle using power from the engine (step 812), according to some embodiments. Step 812 may be performed in response to the engine being started (i.e., step 808) and in response to the engine being coupled or engaged with the electromechanical transmission (i.e., step 810). Once the engine has been started and engaged with the electromechanical transmission, the engine may be used to produce mechanical power to drive the electromechanical transmission to produce electricity for (i) storage in the battery pack and/or (ii) to drive the electromechanical transmission in place of or in addition to the energy drawn from the battery pack.

Method 800 may be performed to reduce a required amount of time to start driving the fire fighting vehicle 10. Instead, the fire fighting vehicle 10 can use the ETD 240 and the battery pack 260 to initially begin transportation of the fire fighting vehicle 10. Once the fire fighting vehicle 10 has achieved the predetermined operating condition (e.g., a required speed, travelled a predetermined distance or outside of a geofence, passed a certain location, etc.), the engine 210 may be started and the fire fighting vehicle 10 can use power from the engine 210 to assist in transportation. Advantageously, this can reduce the time required for the fire fighting vehicle 10 to arrive at a destination (e.g., the end of a runway, a crash site, a fire, etc.) and reduce emissions. Additionally, the ETD 240 may be configured to or be capable of providing mechanical power to front axle 252 and/or rear axle 254 at higher torque (e.g., at low speeds) than the engine 210. Since the ETD 240 and the battery pack 260 are used in the rollout mode at low speeds, without using mechanical input from the engine 210, the higher low speed torque may improve an acceleration of the fire fighting vehicle 10, thereby reducing the response time of the fire fighting vehicle 10.

Ultra-Low Mode

Figure 18:
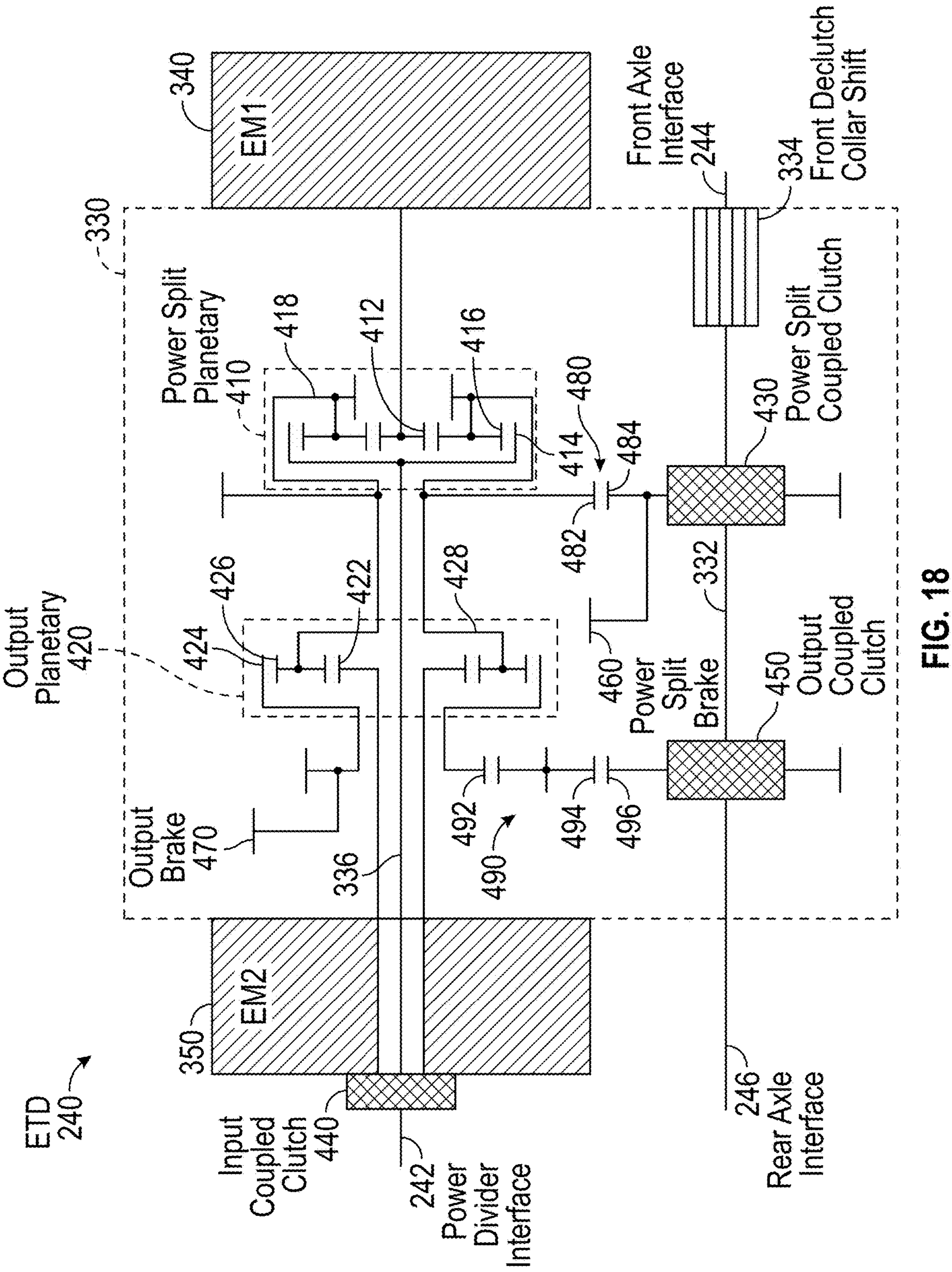
FIG. 18 is a detailed schematic diagram the electromechanical transfer device of FIG. 11 in an ultra-low mode of operation, according to an exemplary embodiment.

Referring to FIG. 18, the controller 510 may be configured to transition hybrid powertrain 200 and/or the fire fighting vehicle 10 into an ultra-low mode of operation (e.g., a high-torque mode, a slow speed mode, a low speed mode, a high grade mode, etc.). The ultra-low mode may be a sub-mode of the rollout mode, or the ultra-low mode may be a separate mode entirely. The ultra-low mode may be configured to drive the fire fighting vehicle 10 at a low speed with a large amount of available torque. The ultra-low mode may increase the gradability of the fire fighting vehicle 10 (e.g., facilitates the fire fighting vehicle 10 maintaining speed while climbing large or steep grades and transporting large loads including the weight of the fire fighting vehicle 10, the weight of water and/or fire suppressing agent, etc.). In some embodiments, the ultra-low mode permits the fire fighting vehicle to climb grades of up to or greater than a 50% grade (i.e., a 26.6 degree incline).

When in the ultra-low mode, the controller 510 may generate control signals to disengage the ETD clutch 234 to de-couple the engine 210 from the ETD 240. The controller 510 may then generate control signals for the ETD 240 to draw electrical power from the battery pack 260 to drive the front axle 252 and/or the rear axle 254. Specifically, electrical power from the battery pack 260 may be used to drive the first motor/generator 340 and/or the second motor/generator 350 to drive the front axle 252 and/or the rear axle 254. The ETD 240, therefore, can be used to drive the front axle 252 and/or the rear axle 254 without requiring input from the engine 210 and without providing a rotational mechanical energy input to the engine 210. While in the ultra-low mode, the engine 210 may be turned off (e.g., to reduce emissions), or the engine 210 may be turned on (e.g., at idle, to drive one or more components). By way of example, while in the ultra-low mode, the ETD 240 may be used to drive the front axle 252 and/or the rear axle 254 while the engine 210 is used to drive the pump system 140 (e.g., through the pump clutch 232, a pump-and-roll mode of operation).

As shown in FIG. 18, the transmission 330 of the ETD 240 is selectively reconfigured into the ultra-low mode such that rotation of the first motor/generator 340 and the second motor/generator 350 drives the output shaft 332 to drive the front axle interface 244 and/or the rear axle interface 246 (i.e., thereby driving the front axle 252 and/or the rear axle 254). Both the first motor/generator 340 and the second motor/generator 350 may draw/consume electrical power from the battery pack 260 while in the ultra-low mode.

The power split coupled clutch 430, the input coupled clutch 440, and the output coupled clutch 450 may be engaged by the controller 510 in the ultra-low mode. As shown in FIG. 18, the power split coupled clutch 430 couples the gear set 480 to the output shaft 332, thereby coupling the carrier 428 and the carrier 418 to the output shaft 332. The output coupled clutch 450 couples the gear set 490 to the output shaft 332, thereby coupling the ring gear 424 to the output shaft 332. The input coupled clutch 440 couples the second motor/generator 350 to the connecting shaft 336, thereby coupling the sun gear 422 to the ring gear 414. Accordingly, movement of the power split planetary 410 (i.e., the sun gear 412, the ring gear 414, the planetary gears 416, and the carrier 418), the output planetary 420 (i.e., the sun gear 422, the ring gear 424, the planetary gears 426, and the carrier 428), the output shaft 332, the connecting shaft 336, the first motor/generator 340, and the second motor/generator 350 may be coupled (e.g., such that each component rotates relative to each other component at a fixed ratio).

According to the exemplary embodiment shown in FIG. 18, an energy flow path for the ultra-low mode includes: the first motor/generator 340 providing a rotational mechanical energy input to the sun gear 412; the sun gear 412 causing the planetary gears 416 to rotate about the sun gear 412 such that both the carrier 418 and the ring gear 414 rotate; and the carrier 418 driving the output shaft 332 through the gear set 480 and the power split coupled clutch 430. Rotation of the ring gear 414 may drive the second motor/generator 350 through the connecting shaft 336 and the input coupled clutch 440. Additionally, because the carrier 418 and the carrier 428 are coupled to one another, rotation of the carrier 418 drives the planetary gears 426 to rotate about the sun gear 422 and vice versa. Another energy flow path for the ultra-low mode includes: the second motor/generator 350 providing a rotational mechanical energy input to the sun gear 422; the sun gear 422 causing the planetary gears 426 to rotate about the sun gear 422 such that both the carrier 428 and the ring gear 424 rotate; and the ring gear 424 driving the output shaft 332 through the gear set 490 and the output coupled clutch 450. Rotation of the output shaft 332 drives rotation of the rear axle 254 through the rear axle interface 246. The controller 510 may engage the front declutch collar shift 334 to engage the front axle interface 244 such that rotation of the output shaft 332 drives rotation of the front axle 252 through the front declutch collar shift 334 and the front axle interface 244.

The controller 510 may transition the hybrid powertrain 200 into the ultra-low mode in response to receiving a user or operator input from the user interface 520. In some embodiments, the controller 510 transitions the hybrid powertrain 200 into the ultra-low mode automatically. As an example, if the controller 510 determines, based on the sensor data, that the fire fighting vehicle 10 has a high torque demand, the controller 510 may automatically transition the hybrid powertrain 200 into the ultra-low mode. By way of example, the controller 510 may monitor a load on the engine 210 (e.g., by measuring an engine speed), the first motor/generator 340, and/or the second motor/generator 350 (e.g., by measuring a current draw) and automatically transition the hybrid powertrain 200 into the ultra-low mode in response to the load increasing above a threshold level. In such an embodiment, the controller 510 may only transition the hybrid powertrain 200 into the ultra-low mode when the fire fighting vehicle 10 is traveling at less than a threshold speed. As another example, if the controller 510 determines, based on the sensor data, that the fire fighting vehicle 10 is traveling on a steep grade or is about to travel up a steep grade, the controller 510 may automatically transition the hybrid powertrain 200 into the ultra-low mode. By way of example, the controller 510 may use sensor data from the incline sensor 534 and/or the GPS 532 to determine if the fire fighting vehicle 10 is traveling up a grade of greater than a threshold incline, and transition into the ultra-low mode in response to such a determination. By way of another example, the controller 510 may use sensor data from the incline sensor 534 and/or the GPS 532 to determine if the fire fighting vehicle 10 will be traveling up a grade of greater than a threshold incline in the near future (e.g., within a threshold time period), and transition into the ultra-low mode in response to such a determination.

The ultra-low mode may be utilized in other vehicle arrangements. By way of example, the ultra-low mode may be utilized in any vehicle including the ETD 240 where the ETD 240 can be selectively coupled to an engine. By way of example, in such a vehicle, the power divider 220 may be replaced with a single clutch (e.g., the ETD clutch 234, a clutch in a gearbox, etc.) that selectively couples an engine (e.g., the engine 210) to the ETD 240. Such an arrangement may be used in a vehicle without a pump clutch 232, the pump system 140, and/or the vehicle accessories 290.

Hybrid Mode

The controller 510 may be configured to transition the hybrid powertrain 200 and/or the fire fighting vehicle 10 into a hybrid mode and may operate the hybrid powertrain 200 and/or the fire fighting vehicle 10 according to the hybrid mode. In some embodiments, the controller 510 operates the hybrid powertrain 200 and/or the fire fighting vehicle 10 in the hybrid mode whenever the engine 210 is operating (e.g., producing mechanical energy). When the controller 510 operates the hybrid powertrain 200 and/or the fire fighting vehicle 10 according to the hybrid mode, the ETD 240 is operated (e.g., by the controller 510) to receive energy (e.g., mechanical, electrical, etc.) from the battery pack 260 and the engine 210 through the power divider 220. The ETD 240 may operate to blend or combine the energy received from the engine 210 and the battery pack 260 and operate to drive the front axle 252 and/or the rear axle 254 continuously to optimize performance and efficiency.

Other Modes

The controller 510 may also be configured to transition the hybrid powertrain 200 and/or the fire fighting vehicle 10 between various other modes of operation. For example, the controller 510 may transition the hybrid powertrain 200 and the fire fighting vehicle 10 into a pumping mode of operation. The pumping mode of operation may include decoupling or disengaging the ETD 240 from the engine 210, while engaging or coupling the engine 210 to the pump system 140. In some embodiments, the controller 510 is configured to generate and provide control signals to the pump clutch 232 and the ETD clutch 234. For example, the controller 510 may generate control signals (i) for the ETD clutch 234 to disengage the engine 210 from the ETD 240 and (ii) for the pump clutch 232 to engage the pump clutch 232, thereby coupling the pump system 140 with the engine 210. In this way, the engine 210 can be used to drive the pump system 140 (e.g., to pump water and/or agent for fire suppression) without being used to drive the ETD 240. In some instances, the pump clutch 232 and the ETD clutch 234 are both engaged such that a mechanical input provided to the power divider 220 by the engine 210 drives both the pump system 140 and the ETD 240 simultaneously.

In some embodiments, the controller 510 may also be configured to transition the hybrid powertrain 200 and/or the fire fighting vehicle 10 into a drive mode. In some embodiments, the drive mode is the same as or similar to the rollout mode. The drive mode may include engaging the ETD clutch 234 while disengaging the pump clutch 232. For example, when the fire fighting vehicle 10 is transporting or travelling to a destination (e.g., the end of a runway), the pump system 140 may not be required to be operated. In this way, all of the power produced by the engine 210 can be used to drive the ETD 240 without operation of the pump system 140.

The controller 510 may also selectively charge the battery pack 260 using electricity generated by the ETD 240. In some embodiments, the controller 510 transitions the hybrid powertrain 200 and/or the fire fighting vehicle 10 into a charging mode to charge the battery pack 260. For example, the controller 510 may generate control signals for the engine 210, the pump clutch 232, the ETD clutch 234, and the ETD 240 so that the ETD 240 is driven by the engine 210 and used to charge the battery pack 260. In some embodiments, during the charging mode, the controller 510 monitors or determines the SOC of the battery pack 260.

Alternative Configurations

Figure 21:
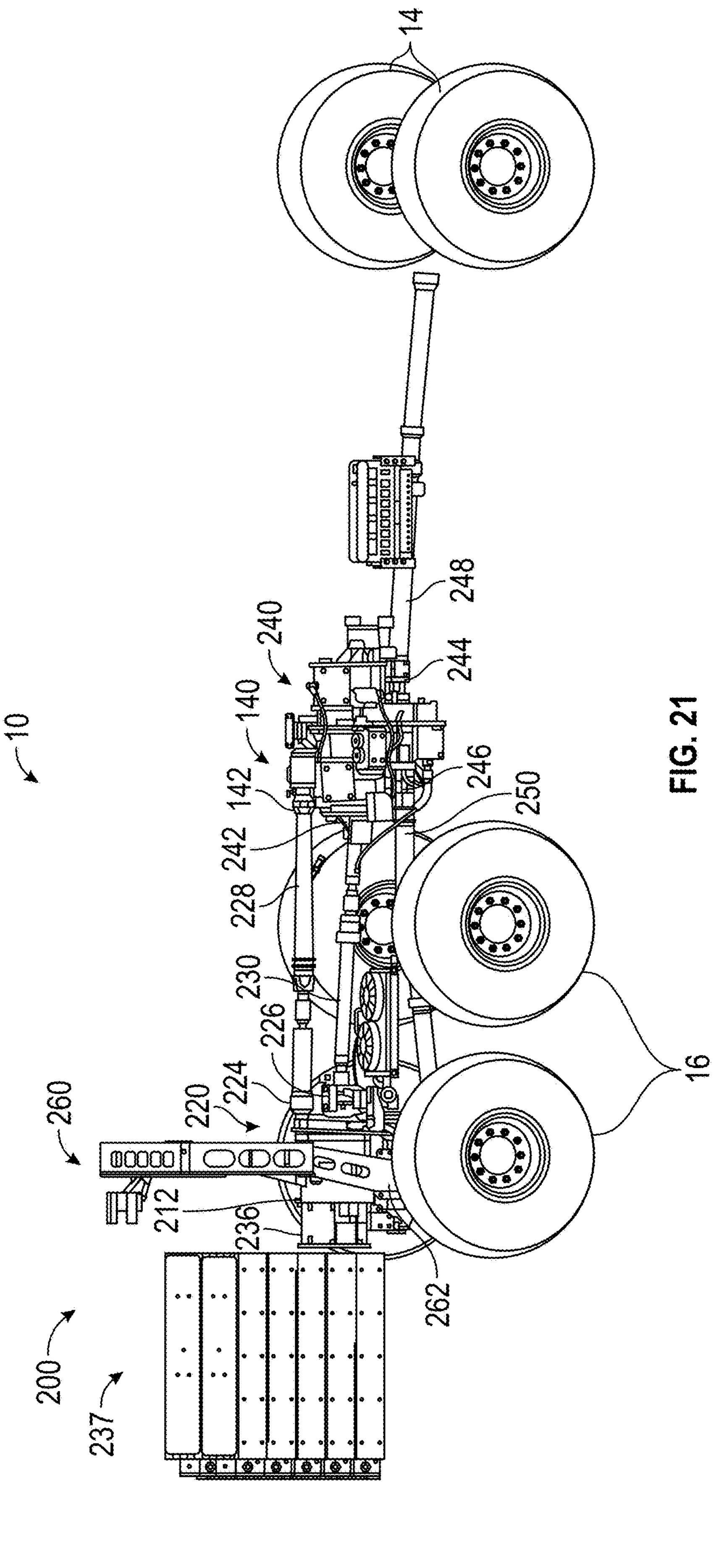
FIG. 21 is a perspective view of a full electric powertrain, according to an exemplary embodiment.
Figure 22:
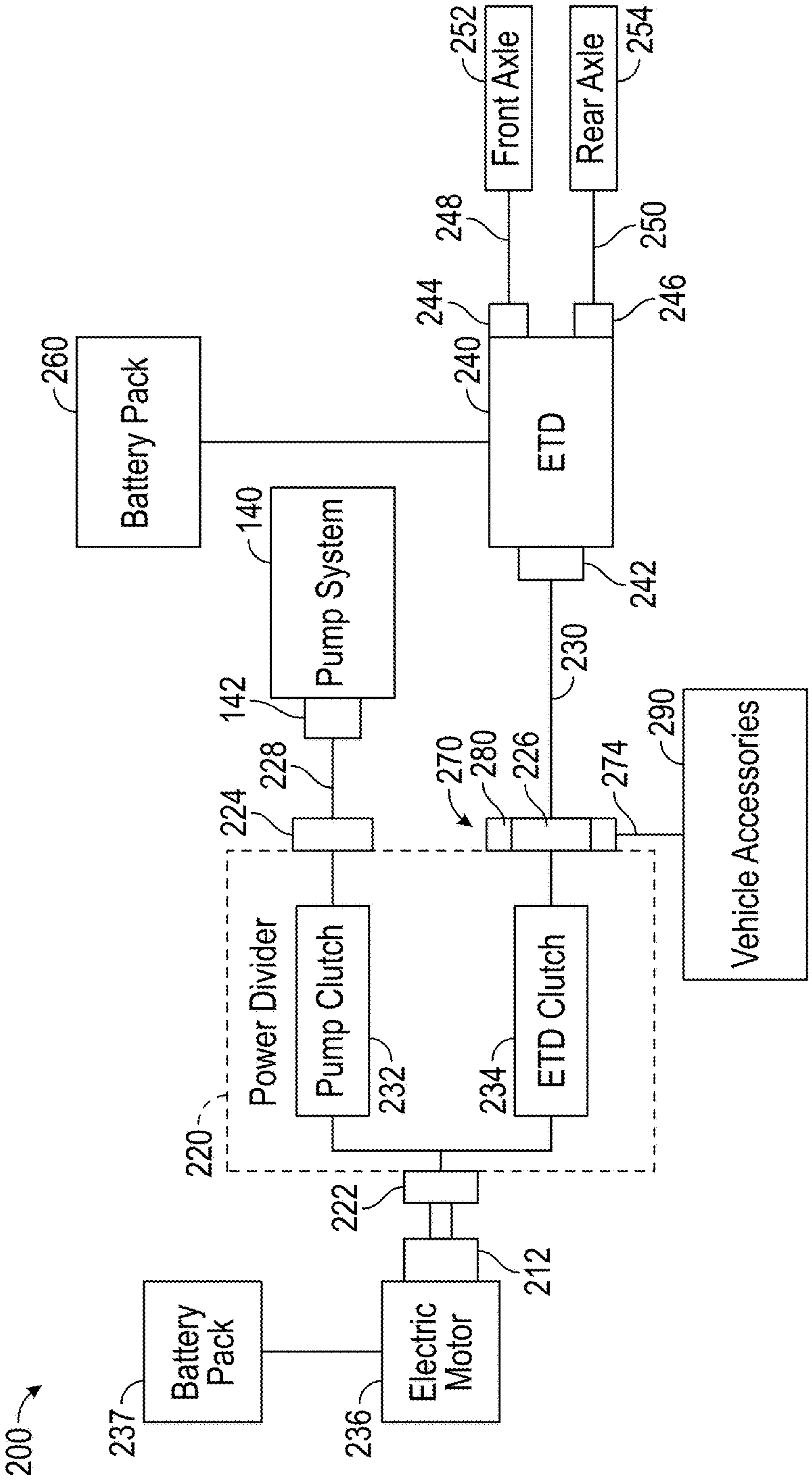
FIG. 22 is a schematic diagram of the full electric powertrain of FIG. 15, according to an exemplary embodiment.
Figure 23:
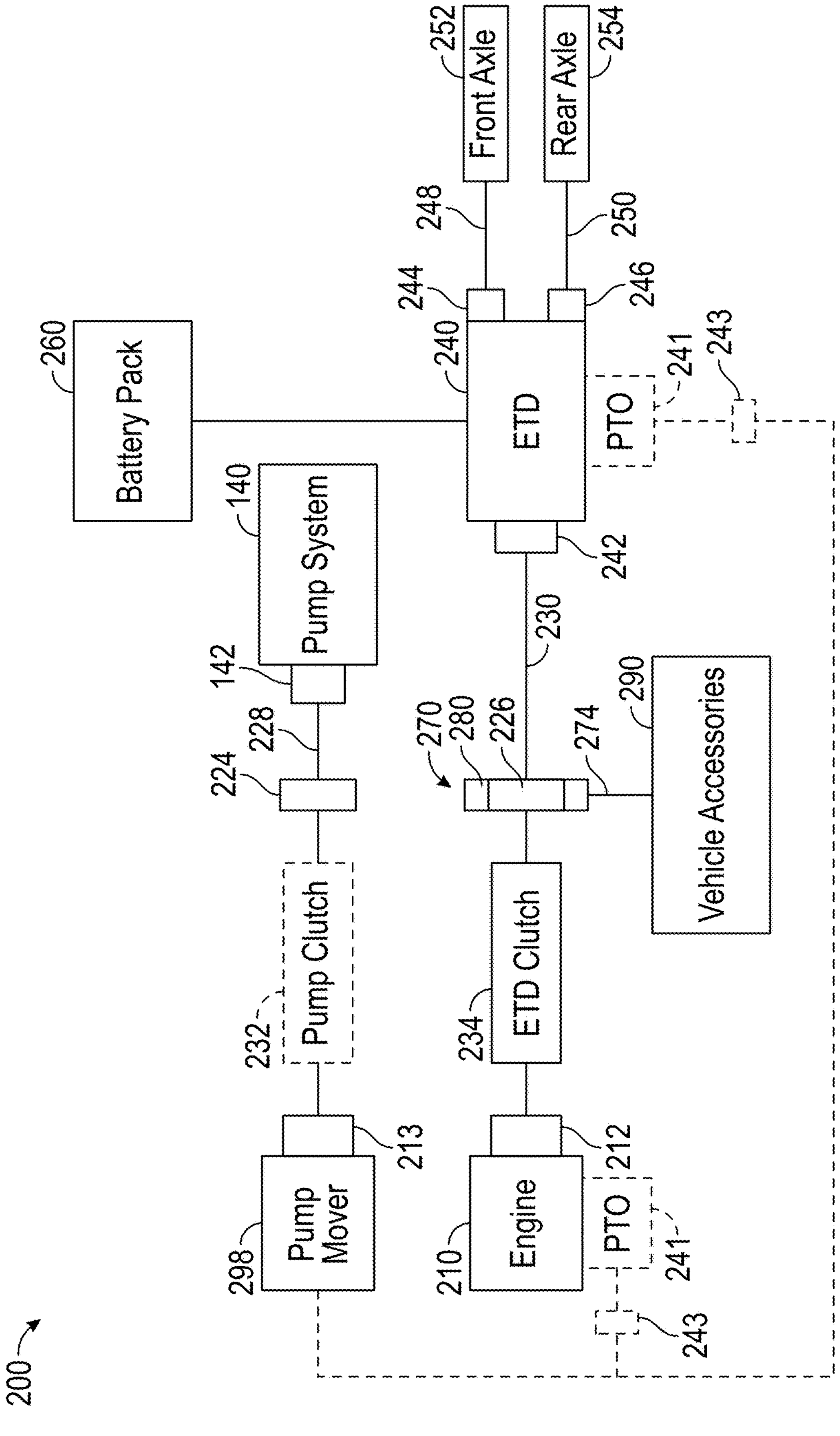
FIGS. 23 and 24 are schematic diagrams of the hybrid powertrain of FIG. 8, according to various other exemplary embodiments.
Figure 24:
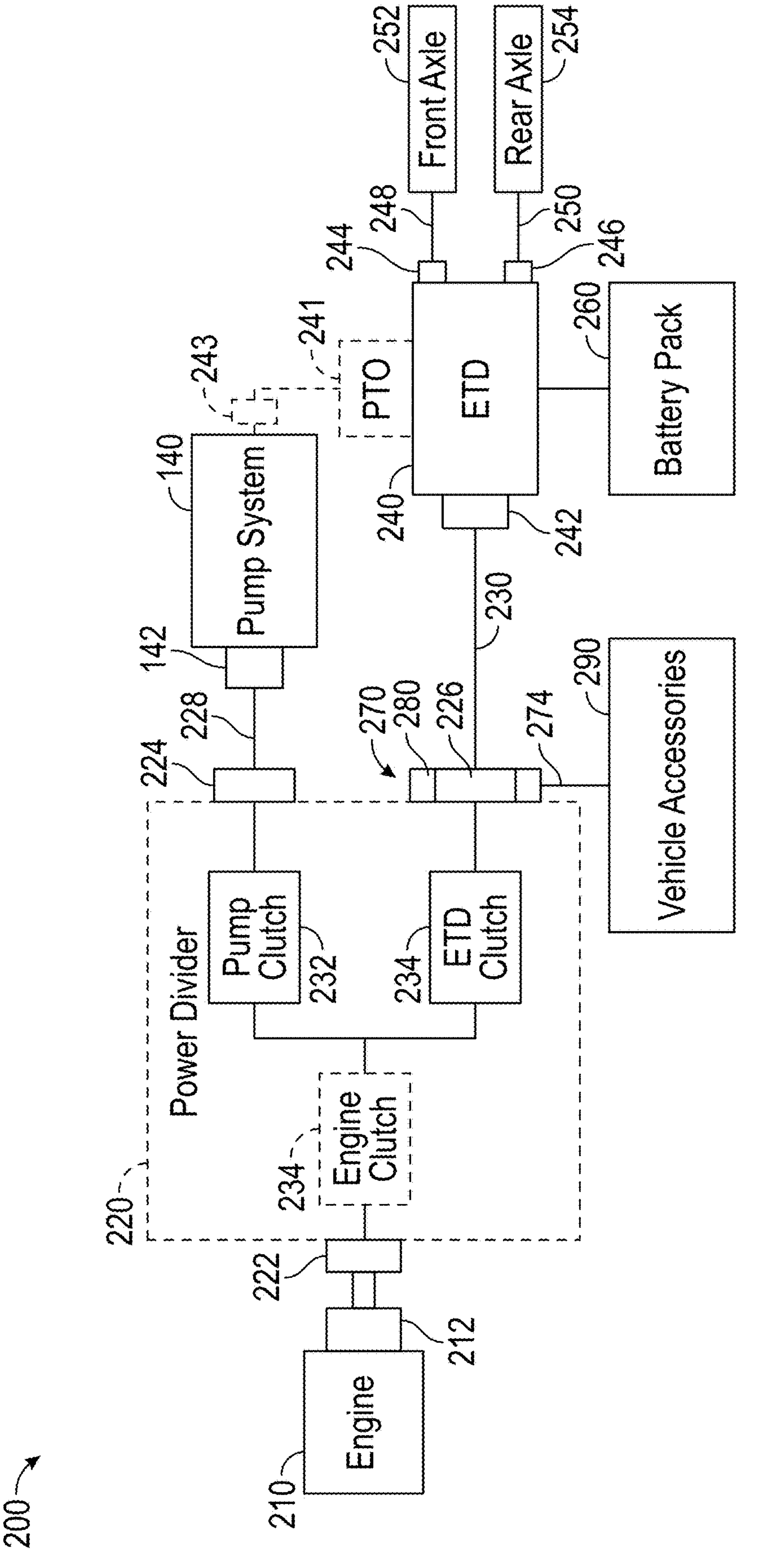
Figure 25:
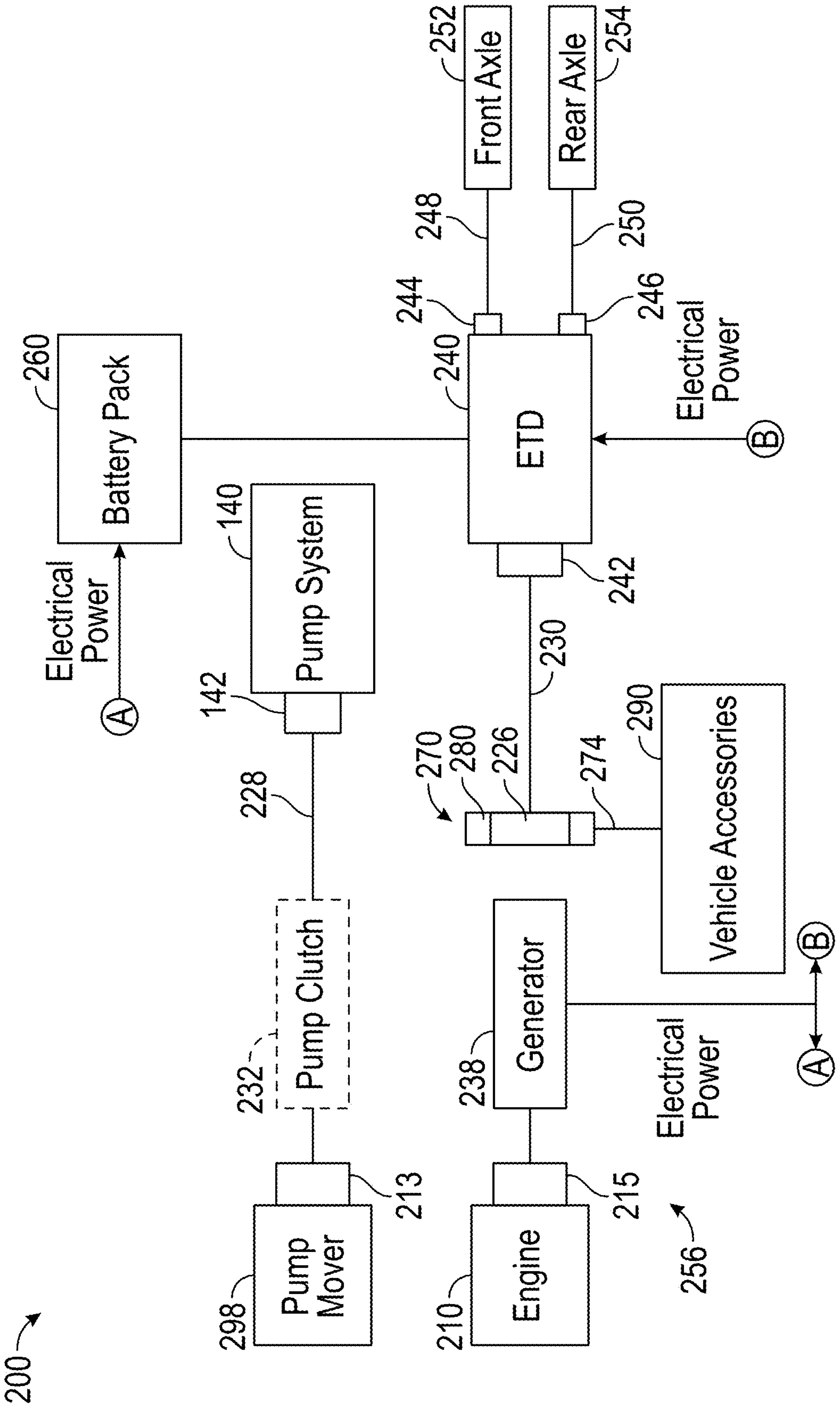
FIG. 25 is a schematic diagram of the hybrid powertrain of FIG. 8 including a generator, according to an exemplary embodiment.
Figure 26:
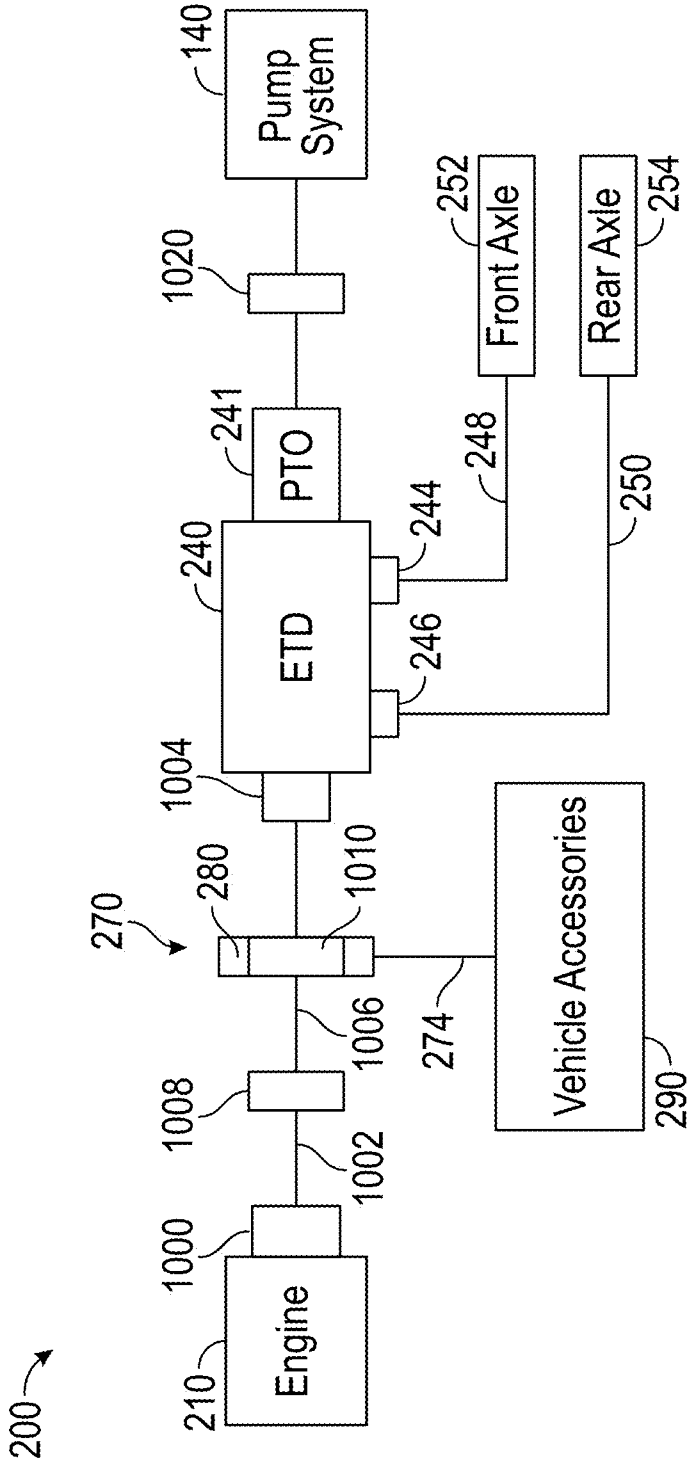
FIG. 26 is a schematic diagram of the hybrid powertrain of FIG. 8, according to another exemplary embodiment.
Figure 27:
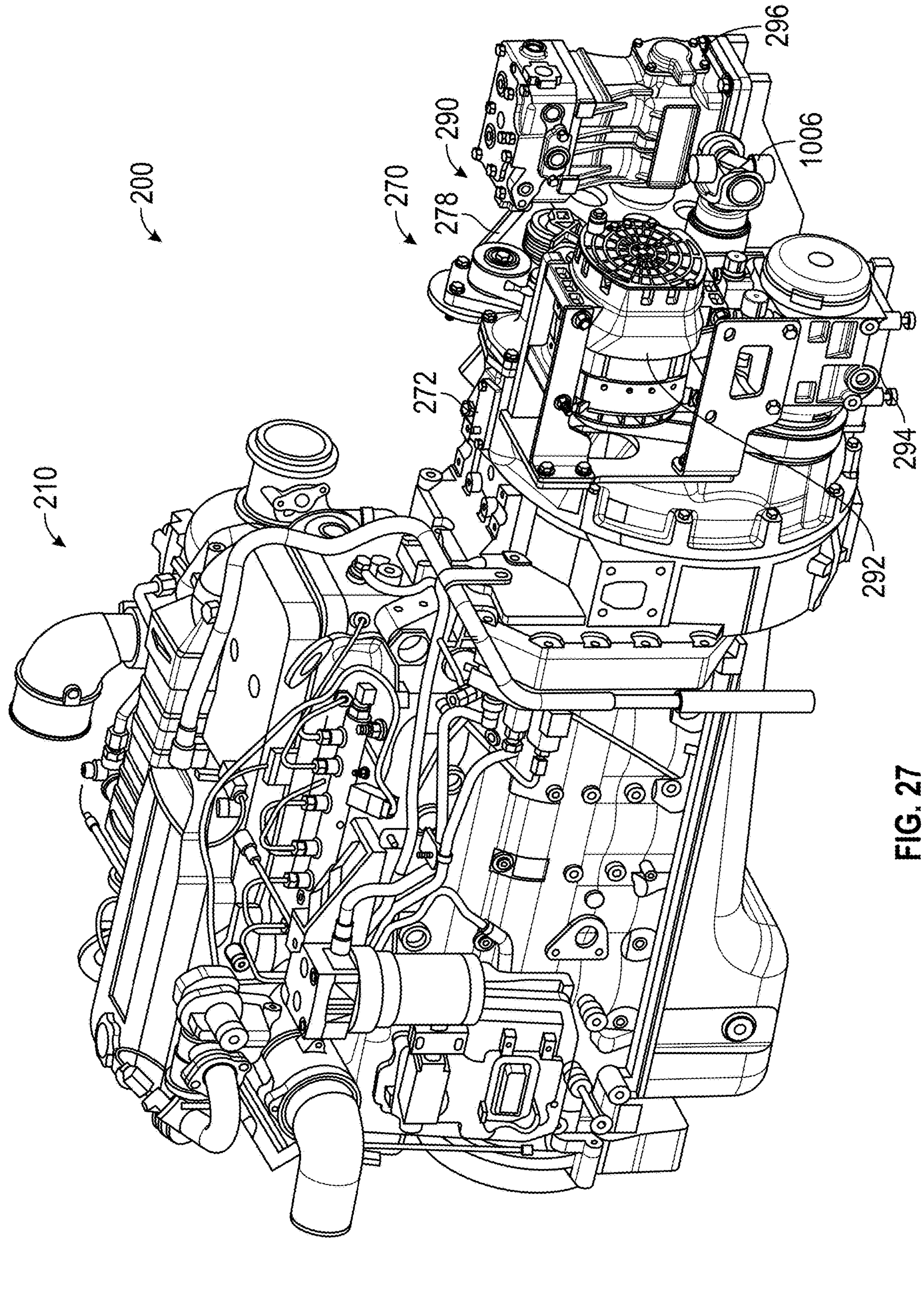
FIG. 27 is a perspective view of the hybrid powertrain of FIG. 26, according to an exemplary embodiment.
Figure 34:
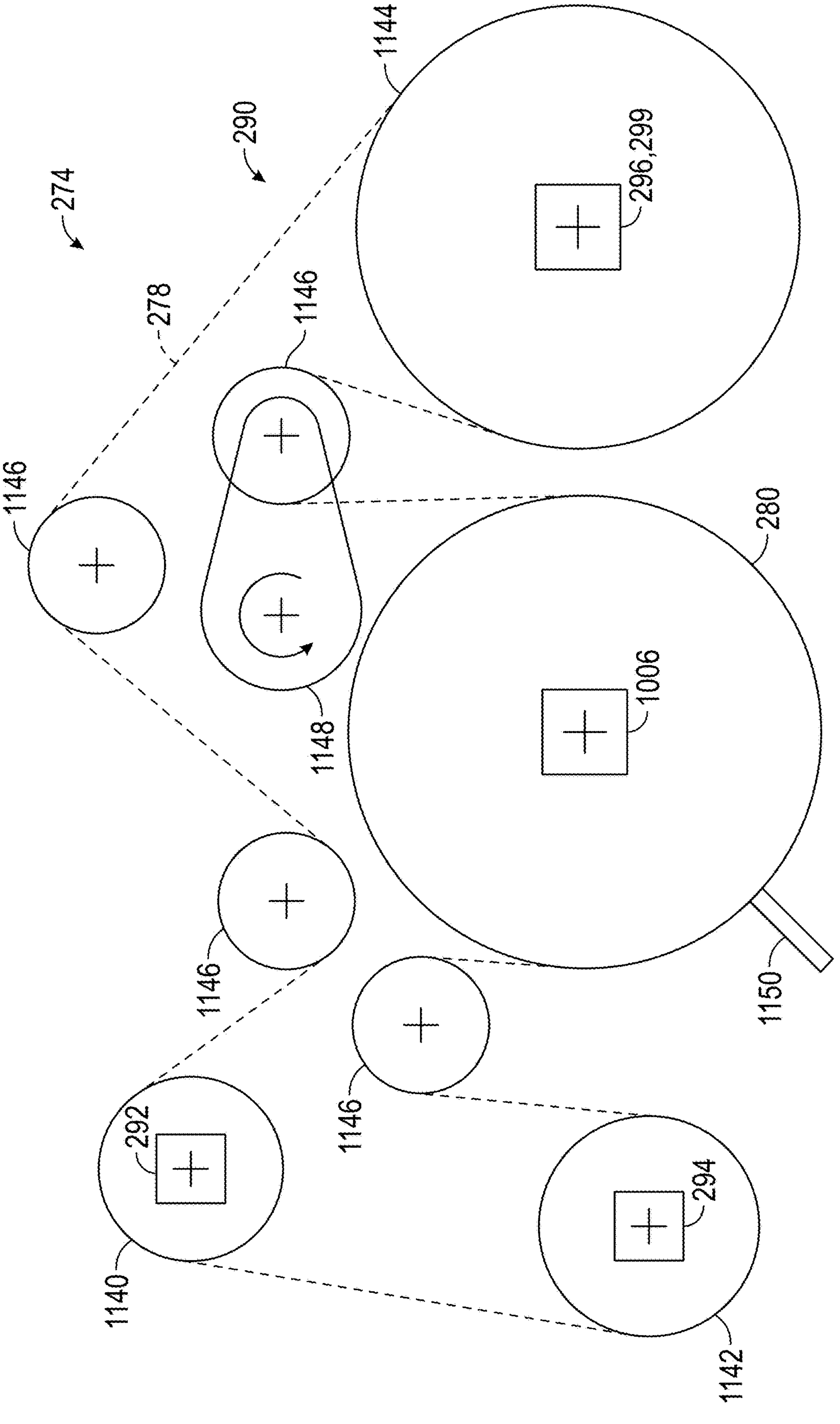
Figure 35:
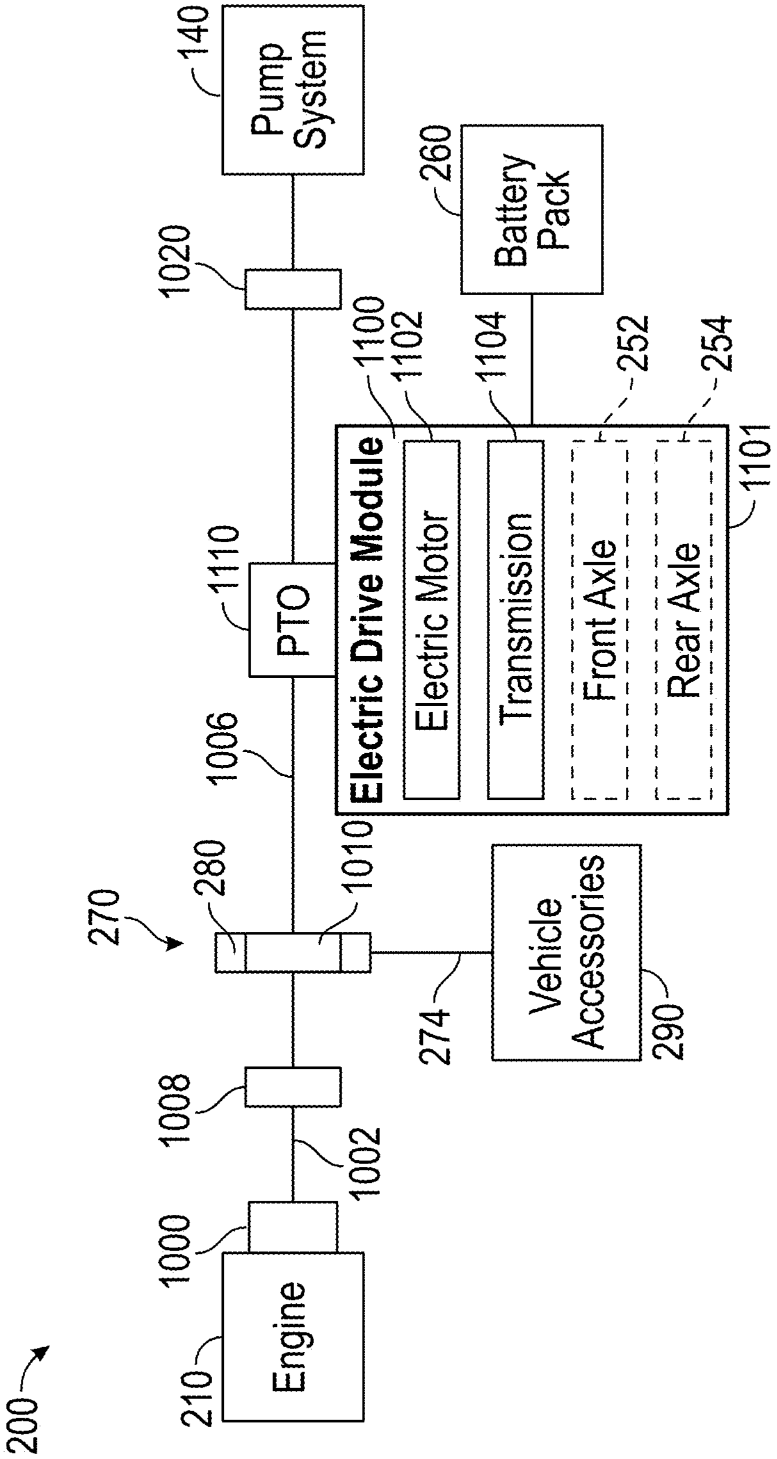
FIG. 35 is a schematic diagram of the hybrid powertrain of FIG. 8, according to another exemplary embodiment.

Referring particularly to FIGS. 21-35, alternative configurations of the hybrid powertrain 200 are shown, according to various embodiments. The hybrid powertrain 200 is capable of any of the configurations described herein or any combination of the various configurations described herein. FIGS. 21 and 22 show the hybrid powertrain 200 configured for use with an electric motor, according to an exemplary embodiment. FIG. 23 shows the hybrid powertrain 200 with another primary mover (e.g., a third primary mover) configured to drive the pump system 140. FIG. 24 shows a configuration where the pump system 140 is driven by the ETD 240, according to an exemplary embodiment. FIG. 25 shows a configuration of the hybrid powertrain 200 when the engine 210 is used to drive a generator 238 that can provide electrical energy to any of the battery pack(s) 260, the ETD 240, a pump drive system (e.g., pump mover 298), etc. FIG. 26 shows a configuration of the hybrid powertrain 200 where the engine 210, the ETD 240, and the pump system 140 are arranged in-line with one another. FIG. 35 shows a configuration similar to the configuration of FIG. 26, except the ETD 240 is replaced with an electric drive module 1100.

Fully Electric Vehicle

Referring particularly to FIGS. 21 and 22, the hybrid powertrain 200 of the fire fighting vehicle 10 is shown configured as a fully electric drive system. In particular, the engine 210 is replaced with an electric motor 236. The electric motor 236 can be configured to draw electrical energy or power from a battery pack 237. The battery pack 237 can be mounted or fixedly coupled with the frame 12. The battery pack 237 can be positioned rearward of the electric motor 236. The electric motor 236 can be positioned on the frame 12 and/or coupled with the frame 12 similarly to the engine 210.

The electric motor 236 can be configured to drive the power divider 220 similarly to the engine 210 (e.g., through the power divider interface 212 and the engine interface 222). The electric motor 236 can be configured to receive the electrical power from the battery pack(s) 237 and output mechanical energy (e.g., torque) to the power divider 220. In this way, the electric motor 236 can be configured to drive the pump system 140 through the pump clutch 232, and/or to drive the ETD 240 through the ETD clutch 234. In some embodiments, the ETD clutch 234 is optional for the fully-electric configuration of the hybrid powertrain 200 shown in FIGS. 21 and 22. The electric motor 236 can drive the ETD 240 through the ETD clutch 234, which can in turn drive the front axle 252 and/or the rear axle(s) 254. In this way, the electric motor 236 may drive the front axle 252 and/or the rear axle(s) 254 for transportation of the fire fighting vehicle 10.

The battery pack(s) 237 that are used to power the electric motor 236 can be the same as battery pack(s) 260. For example, both the ETD 240 and the electric motor 236 may draw electrical energy from the same battery pack (e.g., the battery pack 237 or the battery pack 260). In some embodiments, the battery pack(s) 237 are separate from the battery pack(s) 260. The battery pack(s) 237 can be integrated with the battery pack(s) 260 so that the same batteries are used both to drive the electric motor 236, and to drive the ETD 240, or are charged based on operation of the ETD 240.

According to an exemplary embodiment, the battery pack 237, which provides electrical power to the electric motor 236, is a 330 kWh battery pack. In other embodiments, the battery pack 237 has a larger or lesser capacity (e.g., at least 300 kWh, at least 350 kWh, 400 kWh, etc.). In some embodiments, a vehicle equipped with the full electric powertrain as shown in FIGS. 21 and 22 is capable of accelerating from 0 to 50 miles per hour in about 25 seconds or less. Advantageously, the electric motor 236 and ETD 240 combination can be capable of providing lower-speed torque when compared to the systems with the engine 210. The electric motor 236 and ETD 240 combination may facilitate a faster response/acceleration time of the fire fighting vehicle 10. Advantageously, the electric motor 236 and ETD 240 combination can reduce emissions that may be produced by the engine 210 and facilitates a cleaner, more efficient, fire fighting vehicle.

It should be understood that the electric motor 236 can be used in combination with the ETD 240 or may be used without the ETD 240. For example, the ETD clutch 234 can directly drive the front axle 252 and/or the rear axle(s) 254 directly without requiring the ETD 240.

In some embodiments, the full electric powertrain of FIGS. 21 and 22 does not include the electric motor 236 and all components of the powertrain (e.g., the pump system 140, the accessory drive 270, the front axle(s) 252, the rear axle(s) 244, etc.) are driven solely by the ETD 240. In such embodiments, the battery pack 237 may be directly coupled to the ETD 240 to replace or supplement the battery pack 260. The pump system 140 and/or the vehicle accessories 290 may still be driven through the power divider 220, however, but by the ETD 240 rather than by the electric motor 236. In some embodiments, the ETD clutch 234 is positioned between the accessory drive 270 and the ETD 240 (e.g., such that the ETD 240 can be selectively decoupled from the accessory drive 270, etc.). In some embodiments, the power divider 220 does not include the ETD clutch 234. In some embodiments, the full electric powertrain does not include the power divider 220, altogether. In such embodiments, the pump system 140 and/or the vehicle accessories 290 may be driven using one or more PTOs of the ETD 240 (e.g., PTO 241, etc.) and/or directly with the ETD shaft 230.

Independently Driven Pump System

Referring particularly to FIG. 23, the hybrid powertrain 200 is shown, according to another embodiment. The hybrid powertrain 200 can include an additional primary mover, primary driver, engine, electric motor, pneumatic motor, hydraulic motor, etc., shown as pump mover 298. Pump mover 298 may be mechanically coupled with the pump system 140 through a pump mover interface 213. The pump mover 298 can be configured to independently drive the pump system 140 without requiring input from the engine 210 and/or the electric motor 236 (e.g., if the electric motor 236 is used in place of the engine 210). The pump mover 298 can be configured to draw electrical energy from a power source (e.g., an electrical energy power source) if the pump mover 298 is an electric motor. For example, the pump mover 298 may be configured to draw power or electrical energy from the battery pack(s) 260, and/or the battery pack(s) 237. In some embodiments, an additional battery pack is included with the hybrid powertrain 200 (e.g., fixedly coupled with the frame 12) that is configured to provide the pump mover 298 with required electrical energy/power.

If the pump system 140 is driven by a hydraulic system, the pump mover 298 can be or include a fluid pump (e.g., a discharge pump) that is configured to receive hydraulic fluid from a fluid reservoir (e.g., a tank, a fluid storage device, a reservoir, a container, etc.) and provide pressurized fluid to a hydraulic motor. The hydraulic motor may receive the pressurized fluid and drive the pump system 140 to discharge the fluid (e.g., the water). The pump mover 298 may drive the pump clutch 232 and thereby drive the pump system 140. The pump clutch 232 can be selectably transitionable (e.g., reconfigurable) between an engaged state and a disengaged state to selectively couple the pump mover 298 with the pump system 140. The fluid pump used to pressurize the fluid can be independently driven by an electric motor, an internal combustion engine, etc. In other embodiments, the fluid pump (e.g., the pump mover 298) is driven by the engine 210 and/or the ETD 240 through PTOs 241.

If the pump system 140 is driven by a pump mover 298 that is a pneumatic motor (e.g., a rotary pneumatic motor, an air motor, etc.) the pump mover 298 can be configured to receive a pressurized gas (e.g., pressurized air) from a pressure vessel (e.g., a tank, an air storage device, a pressure vessel, etc.) that is coupled with the fire fighting vehicle 10 (e.g., fixedly coupled with the frame 12). The gas or air that is stored in the pressure vessel may be pressurized with a compressor that is fluidly coupled with the pump mover 298. The pump mover 298 may receive the pressurized air through one or more conduits, tubular members, pipes, etc., and outputs mechanical energy (e.g., rotational kinetic energy) through the power divider interface 212. The pump mover 298 can then independently drive the pump system 140 without requiring input or operation of the engine 210 and/or the electric motor 236.

Back-Driven Pump System

Referring particularly to FIG. 24, the pump system 140 can be driven by the ETD 240 (e.g., when the engine 210 is used in the hybrid powertrain 200 and/or when the electric motor 236 is used in the hybrid powertrain 200). The ETD 240 may be configured to drive the pump system 140 through the power divider 220. For example, the ETD 240 can draw electrical power or energy from the battery pack 260 and operate to drive the ETD clutch 234 and the pump clutch 232, thereby driving the pump system 140. In some embodiments, the power divider 220 and/or the engine 210 include an engine clutch 235. The engine clutch 235 can be selectively engaged to selectively de-couple the engine 210 (or the electric motor 236) from the power divider 220. When the ETD 240 is used to drive the pump system 140 through the power divider 220, the engine clutch 235 may be selectively de-coupled from the power divider 220 so that the pump system 140 can be driven without driving the engine 210.

In some embodiments, the pump system 140 is back-driven by the ETD 240 through the power divider 220 for lower power pump applications (e.g., for applications where a lower discharge rate of fluid is required). For example, if a lower discharge rate of the fluid is required by the pump system 140, the pump system 140 may require a lower power input. For applications which require a power input at or below a particular level, the ETD 240 can be used to drive the pump system 140 (e.g., through the power divider 220). Advantageously, this reduces the need to drive the pump system 140 with the engine 210, which may be less efficient than using the ETD 240. Additionally, using the ETD 240 to drive the pump system 140 can reduce emissions which may be produced by the engine 210. For higher hp applications of the pump system 140, the pump system 140 may be driven by the engine 210 (or the electric motor 236).

In other embodiments, the pump system 140 is driven by the ETD 240 through a PTO 241. The PTO 241 can be rotatably coupled with an input or an output shaft (e.g., ETD shaft 230) of the ETD 240. The ETD 240 may drive the pump system 140 through the PTO 241, without requiring driving of the power divider 220. For example, the PTO 241 may include or be rotatably fixedly coupled with a clutch 243 that is configured to selectively engage the ETD shaft 230 (e.g., in response to receiving a command from a controller) and thereby couple the pump shaft 228 with the ETD shaft 230 through the PTO 241.

Genset Configuration

Referring particularly to FIG. 25, the hybrid powertrain 200 may include a genset system, etc., shown as generator system 256. The generator system 256 can include a generator, a mechanical transducer, an energy conversion device, an electrical generator, etc., shown as generator 238. The generator 238 may be driven by the engine 210 through a generator interface 215. In some embodiments, the generator interface 215 is the same as or similar to the power divider interface 212. The generator 238 receives mechanical energy (e.g., torque, rotational kinetic energy, etc.) from the engine 210 and generates electrical energy (e.g., electrical power) using the mechanical energy. The generator 238 can output the electrical power to the battery pack(s) 260 and/or the ETD 240. For example, some or all of the electrical power generated by the generator 238 may be provided to the battery pack(s) 260, where it may be stored and later used by the ETD 240 to drive any of the front axle 252, the rear axle 254, or the accessory drive 270.

Some or all of the electrical power generated by the generator 238 may also be provided directly to the ETD 240 which uses the electrical power to drive any of the front axle 252, the rear axle 254, or the accessory drive 270. In some embodiments, the ETD 240 is configured to draw a required amount of electrical power from the generator 238, and excess electrical power that is generated by the generator 238 is provided to the battery pack(s) 260 where it is stored for later use. If the hybrid powertrain 200 includes the generator system 256, the pump system 140 may be driven by an independent mover or an independent drive system, shown as pump mover 298. The pump mover 298 may be an electric motor, an internal combustion engine, etc., or any other primary mover that is configured to output mechanical energy to drive pump system 140. In some embodiments, the pump mover 298 is configured to receive electrical power (e.g., electrical energy) from the generator 238 and/or the battery pack(s) 260.

In-Line Configuration with ETD

Referring to FIG. 26, the hybrid powertrain 200 is shown, according to another embodiment. In this embodiment, the engine 210, the ETD 240, and the pump system 140 are positioned in an in-line configuration. The engine 210, the ETD 240, and the pump system 140 are arranged in series with one another. Specifically, the ETD 240 is positioned between the engine 210 and the pump system 140 such that the engine 210 may drive the pump system 140 through the ETD 240.

As shown in FIG. 26, the engine 210 includes a first interface, shown as clutch interface 1000, coupled to a first shaft, shown as engine shaft 1002. The ETD 240 includes a second interface, shown as clutch interface 1004, coupled to a second shaft, shown as electric motor ("EM") shaft 1006. A first clutch or neutral clutch, shown as engine clutch 1008, is coupled to the engine shaft 1002 and the EM shaft 1006. The engine clutch 1008 may selectively couple the engine shaft 1002 to the EM shaft 1006 in response to a signal from a controller (e.g., the controller 510). When engaged, the engine clutch 1008 couples the engine 210 to the ETD 240, transferring rotational mechanical energy between the engine 210 and the ETD 240. The EM shaft 1006 has a third interface, shown as pulley interface 1010. The pulley interface 1010 couples the EM shaft 1006 to the accessory drive 270.

A second clutch or PTO clutch, shown as pump clutch 1020, is positioned between the ETD 240 and the pump system 140. The pump clutch 1020 may selectively couple the PTO 241 to the pump system 140 in response to a signal from a controller (e.g., the controller 510). When engaged, the pump clutch 1020 couples the ETD 240 to the pump system 140, transferring rotational mechanical energy between the ETD 240 and the pump system 140.

The hybrid powertrain 200 of FIG. 26 may be selectively reconfigured between different modes of operation by engaging or disengaging the engine clutch 1008 and/or the pump clutch 1020. In some embodiments, the EM shaft 1006 directly couples the accessory drive 270 to the ETD 240 such that the accessory drive 270 is coupled to the ETD 240 regardless of whether or not the engine clutch 1008 and the pump clutch 1020 are engaged (e.g., in all modes of operation). When the engine clutch 1008 is engaged, the engine 210 is coupled to the ETD 240. The engine 210 may provide rotational mechanical energy to drive the ETD 240 (e.g., to produce electrical energy, to drive the front axle 252 and/or the rear axle 254, to drive the accessory drive 270). The ETD 240 may provide rotational mechanical energy to the engine 210 (e.g., to start the engine 210). When the pump clutch 1020 is engaged, the ETD 240 is coupled to the pump system 140. The ETD 240 may provide rotational mechanical energy to drive the pump system 140. When both the engine clutch 1008 and the pump clutch 1020 are engaged, the ETD 240, the engine 210, and the pump system 140 are coupled to one another. The engine 210 may provide rotational mechanical energy to drive the pump system 140.

Referring to FIGS. 27-34, an arrangement of the hybrid powertrain 200 of FIG. 26 is shown according to an exemplary embodiment. As shown, the engine 210 is coupled to the accessory drive 270. Specifically, the engine 210 is directly coupled to an accessory base 272 that supports the vehicle accessories 290 and the accessory pulley assembly 274. The EM shaft 1006 extends through the accessory drive 270 (e.g., to couple to the ETD 240).

Figure 28:
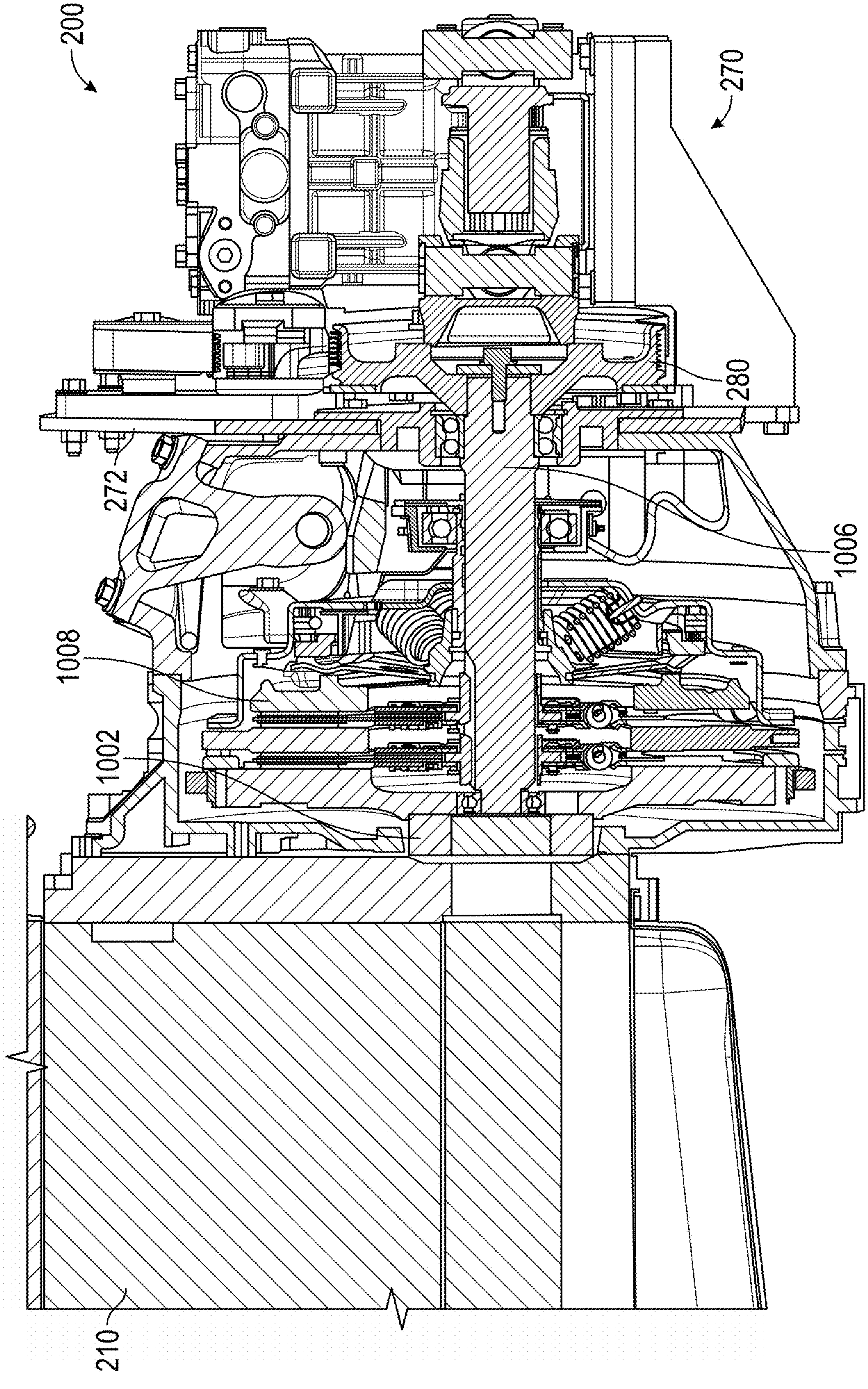
FIGS. 28 and 29 are section views of the hybrid powertrain of FIG. 27.
Figure 29:
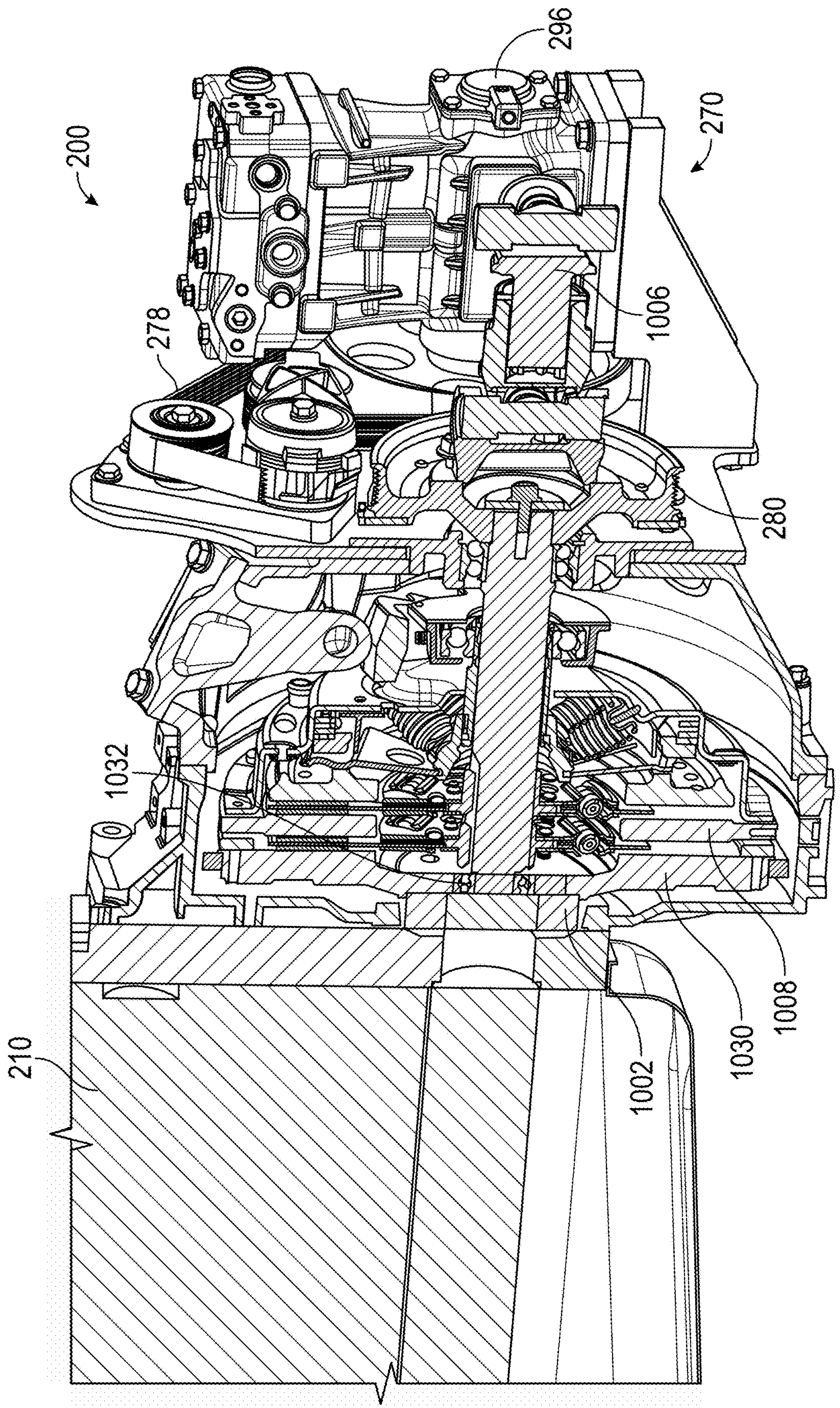
Figure 30:
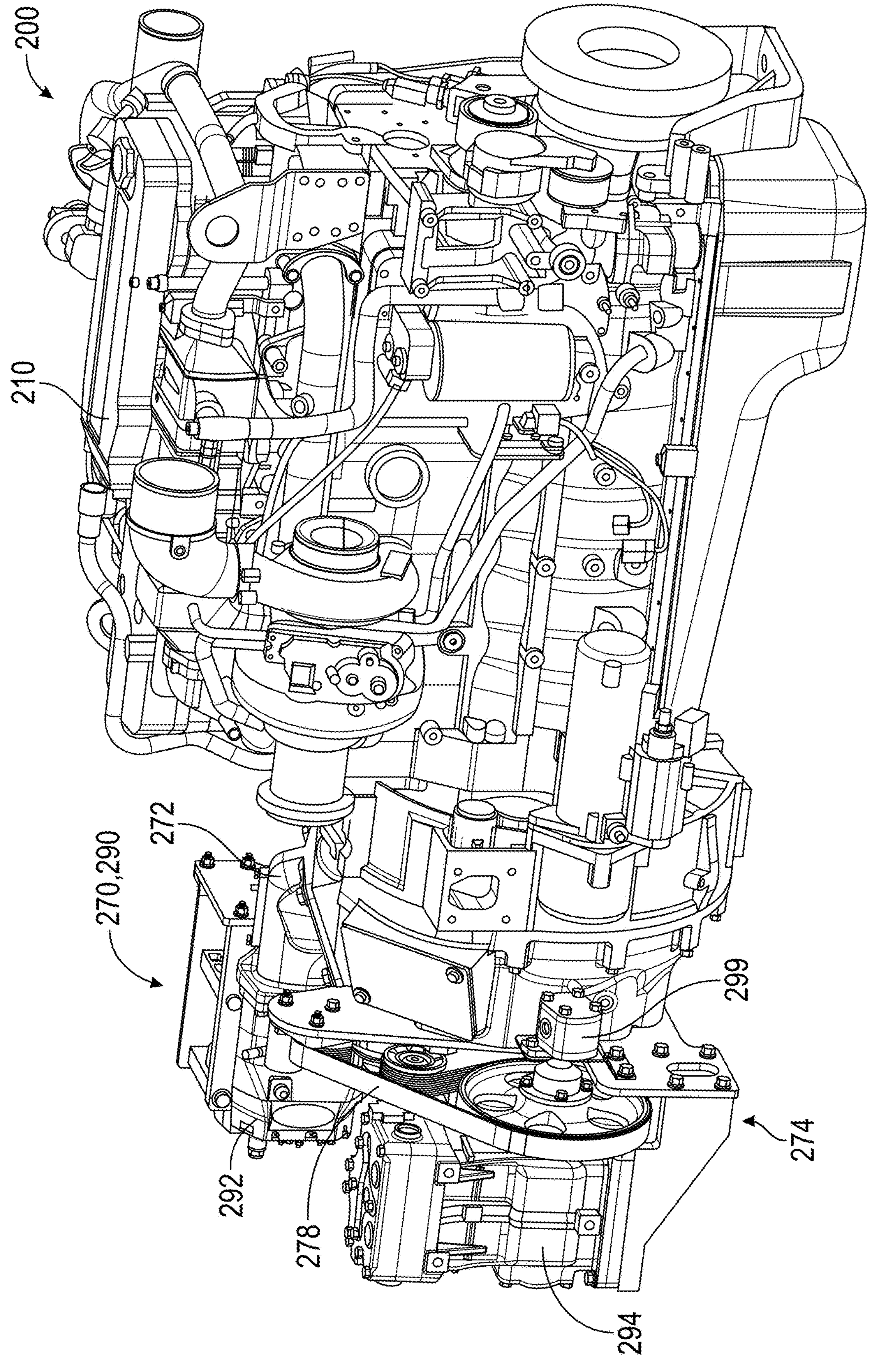
FIGS. 30-34 are perspective views of the hybrid powertrain of FIG. 27.
Figure 31:
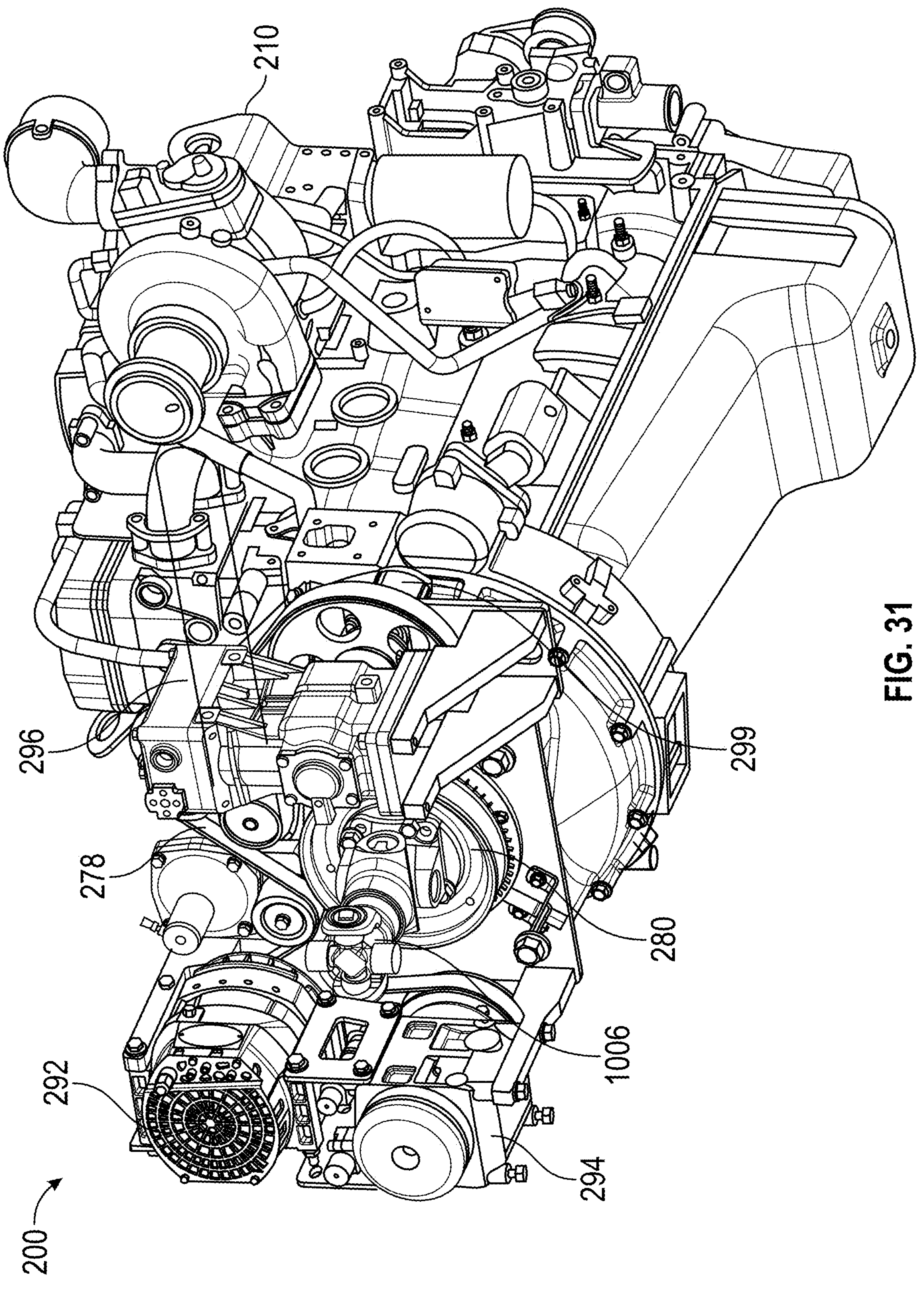
Figure 32:
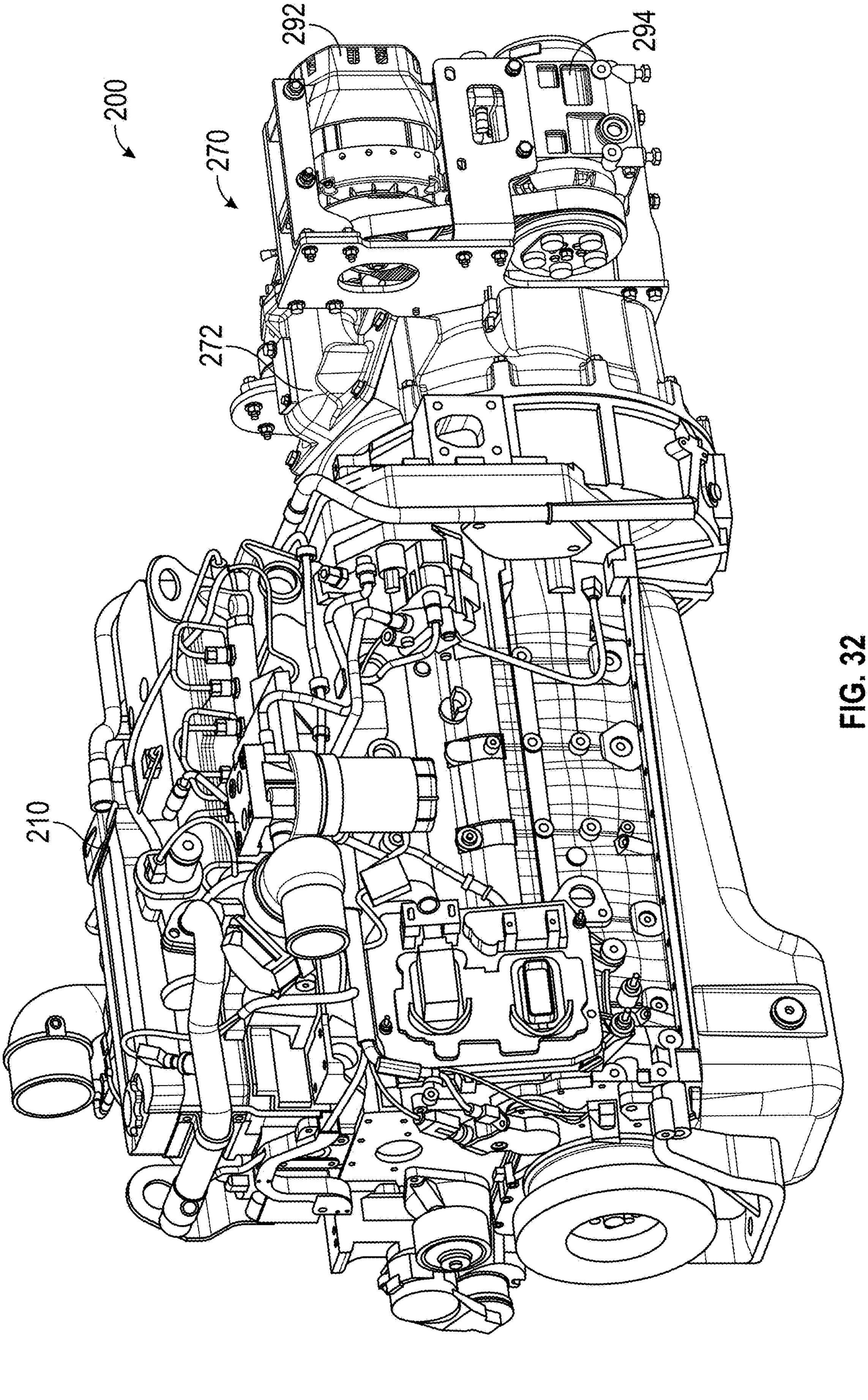
Figure 33:
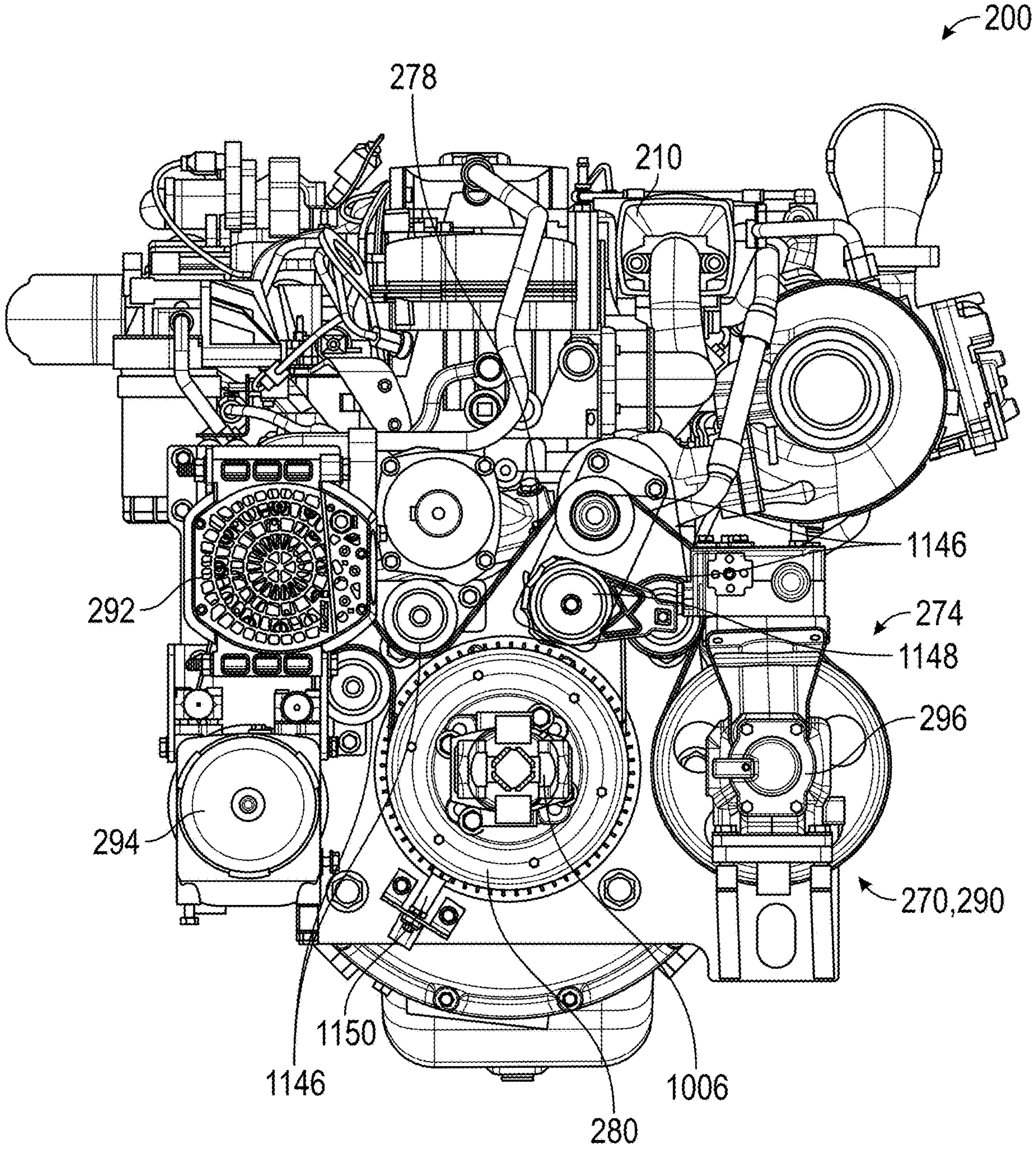

As shown in FIGS. 28 and 29, a distal end of the engine shaft 1002 includes a disc-shaped portion, shown as hub 1030. The hub 1030 is directly, fixedly coupled (e.g., fastened) to the engine clutch 1008. The EM shaft 1006 extends through the engine clutch 1008 such that a distal end of the EM shaft 1006 is positioned adjacent the hub 1030. A bearing 1032 pivotally couples the hub 1030 to the distal end of the EM shaft 1006. The bearing 1032 may support the EM shaft 1006 while maintaining alignment between the engine shaft 1002 and the EM shaft 1006. The EM shaft 1006 is fixedly coupled to the engine clutch 1008 (e.g., an outer surface of the EM shaft 1006 may be fixedly coupled to an inner surface of the engine clutch 1008). In some embodiments, the engine clutch 1008 includes a series of plates that are pressed against one another (e.g., by the application of pressurized hydraulic fluid) to engage the engine clutch 1008 and couple the engine shaft 1002 to the EM shaft 1006. The EM shaft 1006 extends through and is fixedly coupled to the drive pulley 280. A proximal end of the EM shaft 1006 is coupled to the ETD 240 (e.g., through a universal joint).

Referring to FIGS. 30-34, the accessory pulley assembly 274 is shown according to an exemplary embodiment. The accessory pulley assembly 274 couples the EM shaft 1006 to the vehicle accessories 290. Because the accessory drive 270 is coupled to the EM shaft 1006, all of the vehicle accessories 290 can be driven in any mode of operation of the fire fighting vehicle 10. By way of example, the vehicle accessories 290 may be driven by the engine 210 (e.g., when the engine clutch 1008 is engaged), even if the ETD 240 is not operating. By way of another example, the vehicle accessories 290 may be driven by the ETD 240, even if the engine 210 is turned off or the engine clutch 1008 is disengaged. This arrangement facilitates flexibility in operation without sacrificing the functionality of the vehicle accessories 290.

In the embodiment shown in FIGS. 30-34, the vehicle accessories 290 include an alternator 292 (e.g. an electrical energy generator), an air conditioning compressor 294, a chassis air compressor 296, and a pump, shown as oil pump 299, all of which are driven by the EM shaft 1006 through the accessory pulley assembly 274. The alternator 292 receives rotational mechanical energy and produces electrical energy (e.g., AC electrical energy, DC electrical energy). The produced electrical energy may power one or more electrical loads within the fire fighting vehicle 10 (e.g., lights, electric motors, the controller 510, batteries, capacitors, etc.) that are electrically coupled to the alternator 292. The air conditioning compressor 294 receives rotational mechanical energy and provides a flow of compressed refrigerant (i.e., a flow of pressurized fluid or fluid energy). The compressed refrigerant may be used within a heating, ventilation, and air conditioning ("HVAC") system of the fire fighting vehicle 10. Specifically, the compressed refrigerant may be used in a refrigeration circuit that provides cooled air to the front cabin 20 to improve the comfort of one or more operators. The chassis air compressor 296 receives rotational mechanical energy and provides a flow of compressed air (i.e., a flow of pressurized fluid or fluid energy). The compressed air may be used by one or more systems of the fire fighting vehicle 10 (e.g., air brakes, a suspension, etc.) that are fluidly coupled to the chassis air compressor 296. The oil pump 299 receives rotational mechanical energy and provides a flow of pressurized oil (i.e., a flow of pressurized fluid or fluid energy). The pressurized oil may be used to lubricate one or more components of the fire fighting vehicle 10 (e.g., the engine 210, the pump system 140, the ETD 240, etc.) that are fluidly coupled to the oil pump 299.

The vehicle accessories 290 are coupled to and supported by the accessory base 272. The accessory pulley assembly 274 includes a drive pulley 280 that is fixedly coupled to the EM shaft 1006. As shown in FIG. 28, the EM shaft 1006 extends through the center of the drive pulley 280. The alternator 292 is coupled to a first pulley, shown as alternator pulley 1140. The air conditioning compressor 294 is coupled to a second pulley, shown as air conditioning compressor pulley 1142. The chassis air compressor 296 and the oil pump 299 are aligned with one another and both coupled to a third pulley, shown as oil pump pulley 1144. A series of fourth pulleys, shown as idler pulleys 1146, are pivotally coupled to the accessory base 272. The idler pulleys 1146 are free to rotate relative to the accessory base 272 and facilitate routing of the accessory belt 278 to maintain sufficient wrap around each of the alternator pulley 1140, the air conditioning compressor pulley 1142, and the oil pump pulley 1144 to ensure effective power transfer. One of the idler pulleys 1146 is indirectly coupled to the accessory base 272 by an arm, shown as tensioner 1148. The tensioner 1148 is biased (e.g., by a torsion spring) to rotate in a direction (e.g., counter-clockwise as shown in FIG. 34) that forces the corresponding idler pulley 1146 against the accessory belt 278 to maintain tension on the accessory belt 278. The accessory belt 278 wraps in a serpentine pattern around the drive pulley 280, the alternator pulley 1140, the air conditioning compressor pulley 1142, the oil pump pulley 1144, and the idler pulleys 1146. During operation of the accessory drive 270, the accessory belt 278 transfers rotational mechanical energy from the drive pulley 280 to the alternator pulley 1140, the air conditioning compressor pulley 1142, and the oil pump pulley 1144 to drive each of the corresponding accessories. A sensor (e.g., a Hall effect sensor), shown as speed sensor 1150, is coupled to the accessory base 272 proximate the drive pulley 280. The speed sensor 1150 measures a rotational speed of the drive pulley 280. The speed sensor 1150 may provide the measured speed to a controller (e.g., the controller 510).

In-Line Configuration with Electric Drive Module

Referring to FIG. 35, the hybrid powertrain 200 is shown, according to another embodiment. The embodiment of FIG. 35 may be substantially similar to the embodiment of FIG. 26 except as otherwise specified. In this embodiment, the ETD 240 is replaced with an electric axle or electric drive assembly, shown as electric drive module 1100. The electric drive module 1100 is configured to propel the fire fighting vehicle 10. The electric drive module 1100 may include the front axle 252 and/or the rear axle 254. The electric drive module 1100 may be a self-contained subassembly including a housing 1101 that at least partially contains all of the components of the electric drive module 1100. In some embodiments, the fire fighting vehicle 10 includes multiple electric drive modules 1100, each containing a different axle.

The electric drive module 1100 includes a primary driver or electric motor/generator, shown as electric motor 1102. The electric motor 1102 is configured to receive electrical energy (e.g., from the battery pack 260, from the battery pack 237) and provides rotational mechanical energy. Operation of the electric motor 1102 may be controlled by a controller (e.g., the controller 510). As shown, the electric motor 1102 is electrically coupled to the battery pack 260.

The electric drive module 1100 further includes a power transmission device or gearbox, shown as transmission 1104. The transmission 1104 is coupled to the front axle 252 and/or the rear axle 254. The transmission 1104 is further coupled to the EM shaft 1106 by an interface, shown as PTO 1110. The transmission 1104 is configured to receive rotational mechanical energy and transfer the rotational mechanical energy to one or more outputs. (e.g., the front axle 252, the rear axle 254, the PTO 1110, etc.). The transmission 1104 may be configured to vary a ratio between an input speed (e.g., from the electric motor 1102, etc.) and an output speed (e.g., of the front axle, etc.). Operation of the transmission 1104 may be controlled by a controller (e.g., the controller 510). Further, the electric drive module 1100 may replace the ETD 240 in any of the embodiments disclosed herein.

Other Alternative Configurations

Referring generally to FIGS. 21-35, the hybrid powertrain 200 may also be configured as a diesel-hydraulic system, a diesel-pneumatic system, an electric-hydraulic, and/or an electric-pneumatic system. For example, a first or primary mover (e.g., the engine 210) that is configured to drive the hybrid powertrain 200 may be an electric motor (e.g., the electric motor 236), or may be a diesel engine (e.g., the engine 210). The pump system 140 can be a hydraulic system and/or a pneumatic system. In this way, the hybrid powertrain 200 may be configured as any combination of the first mover and the pump system 140 such as a diesel-hydraulic powertrain, a diesel-pneumatic powertrain, an electric-hydraulic powertrain, and/or an electric-pneumatic powertrain.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire fighting vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An electrified fire fighting vehicle comprising:
- a chassis;
- a cab;
- a body;
- a front axle;
- a rear axle;
- an engine;
- a battery pack;
- a pump system including a water pump;
- an electromagnetic device electrically coupled to the battery pack, the electromagnetic device having (a) an output coupled to at least one of the front axle or the rear axle and (b) a power take-off coupled to the pump system; and
- a power divider coupling the engine to the pump system and the electromagnetic device.

2. The electrified fire fighting vehicle of claim 1, further comprising a water tank having a capacity of at least 200 gallons.

3. The electrified fire fighting vehicle of claim 2, wherein the capacity is at least 1,500 gallons.

4. The electrified fire fighting vehicle of claim 1, wherein the engine is configured to drive the pump system and the electromagnetic device through the power divider.

5. The electrified fire fighting vehicle of claim 1, further comprising a clutch positioned between the engine and the power divider.

6. An electrified fire fighting vehicle comprising:
- a chassis;
- a cab;
- a body;
- a front axle;
- a rear axle;
- an engine;
- a battery pack;
- a pump system including a water pump;
- an electromagnetic device electrically coupled to the battery pack, the electromagnetic device having (a) an output coupled to at least one of the front axle or the rear axle and (b) a power take-off coupled to the pump system; and
- a power divider coupling the engine to the pump system and the electromagnetic device, wherein the power divider includes a first clutch configured to facilitate disconnecting the engine from the electromagnetic device and a second clutch configured to facilitate disconnecting the engine from the pump system.

7. The electrified fire fighting vehicle of claim 1, wherein the pump system includes one or more intermediate components positioned between the power take-off and the water pump.

8. The electrified fire fighting vehicle of claim 1, wherein the electromagnetic device includes an electric motor.

9. The electrified fire fighting vehicle of claim 8, wherein the electric motor is a first electric motor, and wherein the electromagnetic device includes a second electric motor.

10. An electrified driveline of a fire fighting vehicle, the electrified driveline comprising:
- an engine;
- an electromagnetic device configured to electrically couple to a battery pack of the fire fighting vehicle, the electromagnetic device having (a) an output configured to couple to an axle of the fire fighting vehicle and (b) a power take-off configured to couple to a pump system of the fire fighting vehicle; and a power divider coupling the engine to the pump system and the electromagnetic device.

11. The electrified driveline of claim 10, wherein the engine is configured to drive the pump system and the electromagnetic device through the power divider.

12. The electrified driveline of claim 10, wherein the pump system includes a water pump and one or more intermediate components positioned between the power take-off and the water pump.

13. The electrified driveline of claim 10, wherein the electromagnetic device includes an electric motor.

14. The electrified driveline of claim 13, wherein the electric motor is a first electric motor, and wherein the electromagnetic device includes a second electric motor.

15. The electrified driveline of claim 10, wherein the power divider includes a first clutch configured to facilitate disconnecting the engine from the electromagnetic device and a second clutch configured to facilitate disconnecting the engine from the pump system.

16. An electrified airport rescue fire fighting vehicle comprising:

a chassis;

a cab;

a body;

an axle;

a battery pack;

a water tank having a capacity of at least 1,500 gallons;

a pump system including a water pump; and an electromagnetic device including an electromechanical transmission electrically coupled to the battery pack, the electromagnetic device having (a) an output coupled to the axle and (b) a power take-off coupled to the pump system.

17. The electrified airport rescue fire fighting vehicle of claim 16, further comprising:

an engine; and a power divider coupling the engine to the pump system and the electromagnetic device, wherein the power divider includes a first clutch configured to facilitate disconnecting the engine from the electromagnetic device and a second clutch configured to facilitate disconnecting the engine from the pump system.

18. The electrified airport rescue fire fighting vehicle of claim 16, wherein the electromagnetic device includes an electric motor.

19. The electrified airport rescue fire fighting vehicle of claim 18, wherein the electric motor is a first electric motor, and wherein the electromagnetic device includes a second electric motor.

20. The electrified airport rescue fire fighting vehicle of claim 16, wherein the pump system includes one or more intermediate components positioned between the power take-off and the water pump.

* * * * *